(12) United States Patent
Teraoka et al.

(10) Patent No.: US 6,966,863 B2
(45) Date of Patent: Nov. 22, 2005

(54) ACTUATOR

(75) Inventors: Masao Teraoka, Tochigi-ken (JP);
Noriyuki Sudou, Tochigi-ken (JP);
Giichirou Takahashi, Tochigi-ken (JP);
Masaaki Fusegi, Tochigi-ken (JP);
Masashi Aikawa, Tochigi-ken (JP);
Tetsushi Tomita, Tochigi-ken (JP)

(73) Assignee: Tochigi Fuji Sangyo Kabushiki Kaisha, Tochigi (JP)

( * ) Notice: Subject to any disclaimer, the term of this patent is extended or adjusted under 35 U.S.C. 154(b) by 0 days.

(21) Appl. No.: 10/396,607

(22) Filed: Mar. 25, 2003

(65) Prior Publication Data

US 2003/0184171 A1 Oct. 2, 2003

(30) Foreign Application Priority Data

Mar. 27, 2002 (JP) ............................. 2002-089670
Mar. 29, 2002 (JP) ............................. 2002-097827
Mar. 29, 2002 (JP) ............................. 2002-097894

(51) Int. Cl.[7] ........................................... F16H 48/06
(52) U.S. Cl. ..................................................... 475/154
(58) Field of Search ............................... 475/150, 154; 192/20, 94; 74/55

(56) References Cited

U.S. PATENT DOCUMENTS

| | | | | |
|---|---|---|---|---|
| 4,805,486 A | * | 2/1989 | Hagiwara et al. | 475/150 |
| 4,950,214 A | * | 8/1990 | Botterill | 475/231 |
| 5,080,640 A | * | 1/1992 | Botterill | 475/231 |
| 6,715,375 B2 | * | 4/2004 | Nestler | 74/340 |
| 2002/0155913 A1 | * | 10/2002 | Fusegi et al. | 475/150 |

FOREIGN PATENT DOCUMENTS

JP 61130646 6/1986

* cited by examiner

*Primary Examiner*—Dirk Wright
(74) *Attorney, Agent, or Firm*—Morrison & Foerster LLP

(57) ABSTRACT

An actuator 1 is disclosed including a stationary member 15, a rotational member 17 disposed for rotating capability with respect to the stationary member 15, a movable member 19 disposed for movements with respect to the rotational member 17, a drive power source 25 rotating the rotational member 17, and a converting mechanism disposed between the rotational member 17 and the movable member 19 to convert rotation of the rotational member to an operating force for an operative unit.

32 Claims, 33 Drawing Sheets

ACTUATOR

BACKGROUND OF THE INVENTION

The present invention relates to actuators that operate operative units such as clutches and, more particularly, to an actuator having a cam converting mechanism or a gear converting mechanism using an electric motor as a drive power source.

FIG. 1 shows a differential unit 2001 disclosed in Japanese Patent Application Publication No. 5-54574. This differential unit 2001 has a drive power connecting and disconnecting mechanism mounted at an input side of a differential mechanism.

The differential unit 2001 is accommodated in a differential carrier 2003. And, the differential unit 2001 is comprised of an outer differential case 2005, an inner differential case 2007, a differential mechanism 2009 having a bevel gear, a meshing clutch 2011 and an actuator 2013 using a fluid pressure.

The meshing clutch 2011 is disposed between a clutch ring 2015 connected to the inner differential case 2007 for free movements and the outer differential case 2005.

The actuator 2013 is comprised of a cylinder 2017 fixedly secured to the differential carrier 2003, a piston 2019, and a shift fork 2021. The actuator 2013 is supplied with air pressure from an air pump driven by an engine and operates in response thereto. And, the actuator 2013 operatively moves the clutch ring 2015 through the shift fork 2021, thereby causing the meshing clutch 2011 to be brought into meshing engagement. Also, when interrupting supply of air pressure, the meshing clutch 2011 is brought out of meshing engagement.

The outer differential case 2005 is rotationally driven by a drive power of the engine inputted through a drive pinion gear 2023 and a ring gear 2025.

Upon meshing engagement of the meshing clutch 2011, rotation of the outer differential case 2005 is distributed to left and right wheels through wheel axles 2027, 2029 by means of an inner differential case 2007 and the differential mechanism. This results in a vehicle being brought into a four-wheel drive condition, with resultant improvement in a rough-road running capability, a rough-road escaping capability and a stability.

Upon meshing disengagement of the meshing clutch 2011, further, the drive power of the engine in a drive power transmission system between the inner differential case 2007 and the left and right wheels is disconnected. As a result, the vehicle is brought into a two-wheel drive condition, improving fuel consumption.

SUMMARY OF THE INVENTION

In such a manner, the differential unit 2001 uses the air pump to actuate the actuator 2013 and transmits a resulting operating force to the clutch 2011 through the shift fork 2021.

However, since the actuator 2013 needs a large number of component parts such as the air pump, the piston 2019, the cylinder 2017 and a shift mechanism involving the shift fork 2021, an increased number of assembling steps result in the differential unit 2001, causing a complicated construction. Further, such defects also similarly arise in assembly between the actuator 2013 and the differential carrier 2003. Additionally, costs remarkably increase (especially, the air pump sharing a cost of approximately 30% of these costs).

Further, with the actuator using the fluid pressure such as the actuator 2013 utilizing air pressure, it is hard to avoid a pressure leakage in a pressure line. This pressure leakage results in degraded response in coupling and uncoupling of the meshing clutch 2011 and, as a result, it becomes hard to rapidly change over between the four-wheel drive condition and the two-wheel drive condition in dependence on variations in traveling conditions.

Furthermore, this pressure leakage results in degradation in a reliability. In order for such a pressure leakage to be avoided, there is a need for sealing at various parts of the pressure line to be strengthened and it becomes hard to avoid such accompanying cost increase.

Moreover, the actuator 2013 using the air pressure is apt to be adversely affected by an internal pressure or an external pressure, with a resultant degraded performance to cause an instability.

Also, the use of the actuator 2013 using the fluid pressure requires widened location spaces involving a space for delivery conduits of the pressure line and its distribution space, and the differential unit 2001 becomes large in structure to lower an on-vehicle installation capability. In addition, there is a need for modifying a casing (particularly, the differential carrier 2003) that accommodates the differential unit 2001, thereby causing a remarkable increase in modification costs with a further resultant decrease in the on-vehicle installation capability.

Further, the differential unit 2001 is arranged such that, when failures occur in the air pump, the actuator 2013 and the shift mechanism involving the shift fork 2021, the meshing clutch 2011 is undesirably brought out of meshing engagement to cause the vehicle to return to the two-wheel drive condition.

Thus, with such an operating unit having the actuator employing the fluid pressure to operate the clutch, if a failure occurs in the operating system, in general, since the operating unit tends to return to its other condition (in particular, if the clutch is coupled by the actuator, the clutch is uncoupled by the return spring), it becomes hard to retain the operating unit in the same condition as that obtained when the operating system is in a normal state.

On the other hand, since it is hard for the actuator employing the electric motor to have the same magnitude of operating force as that of the actuator employing the fluid pressure, the shift spring is required for the purpose of smoothly coupling the meshing clutch.

By the way, in the related art practice, since the shift spring is disposed separately from the actuator, the number of component parts increases in that extent, resulting in an increase in costs. In addition, considerations are needed for both a specific structure for positioning the shift spring and an assembly of the component parts, resulting in increases in the number of assembling steps and costs.

Further, the meshing clutch needs, in addition to the shift spring, the return spring for uncoupling the meshing clutch.

The shift spring is for operating the coupling of the meshing clutch against the force of the return spring and its spring force is required to be sufficiently larger than that of the return spring.

Accordingly, in the actuator employing the electric moor in which a difficulty is encountered in obtaining the operating force similar in extent to that of the actuator employing the fluid pressure, the shift spring should have the spring force as small as possible.

In view of the above issues, the present invention has an object to provide an actuator that is structured to obtain extremely easy assemblies of the actuator per se and an operating unit to be actuated (hereinafter referred to as an operative unit) and a capability of converting a source of a drive power source to an operating force without the need for an actuator using a fluid pressure composed of a piston and a cylinder while having a status retaining mechanism to provide a simplified construction, a low cost and a high reliability.

A first aspect of the present invention provides an actuator comprising a stationary member, a rotational member disposed on the stationary member for rotating movement with respect thereto, a movable member disposed on the rotational member to be axially movable between first and second positions, a drive source rotating the rotational member, and a converting mechanism disposed between the rotational member and the movable member to convert a rotational force of the rotational member to an operating force of an operative unit.

A second aspect of the present invention provides actuator comprising a stationary member, a rotational member disposed on the stationary member for rotating movement with respect thereto, and a drive source rotating the rotational member, and a converting mechanism disposed between the rotational member and the movable member to convert a rotational force of the rotational member to an operating force of an operative unit.

A third aspect of the present invention, related to the actuator of the first aspect, features that the converting mechanism comprises a cam mechanism.

A fourth aspect of the present invention, related to the actuator of the second aspect, features that the converting mechanism comprises a cam mechanism.

A fifth aspect of the present invention, related to the actuator of the first aspect, features that the movable member comprises an operating portion for operating the operative unit, and a guide portion guiding the converting mechanism to move in the operating portion, and the operating portion of the movable member, the stationary member, the rotational member, the converting mechanism and the guide portion of the movable member being located in an order from an area closer to the operative unit along an axial direction of the rotational member.

A sixth aspect of the present invention, related to the actuator of the third aspect, features that the cam mechanism comprises a first cam mechanism creating a first thrust force to axially move the operative unit from the first position to the second position depending on rotation of the rotational member, and a second cam mechanism bearing a rotational torque occurring when the operative unit is coupled in either one of the first and second positions and creating a second thrust force to retain the operative unit in the one position.

A seventh aspect of the present invention, related to the actuator of the second aspect, features that the converting mechanism comprises a screw mechanism.

An eighth aspect of the present invention, related to the actuator of the seventh aspect, features that the rotational member is movable between the first and second positions along the axial direction by a screwing action of the screw mechanism.

A ninth aspect of the present invention, related to the actuator of the second aspect, features that the rotational member and the stationary member are disposed in an order from an area closer to the operative unit in the axial direction of the rotational member, and the stationary member, the screw mechanism and the rotational member are disposed in an order from an area closer to an inner side of the rotational member in a radial direction thereof.

A tenth aspect of the present invention, related to the actuator of the first aspect, features a further provision of an urging member disposed between the movable member and the stationary member to exert an urging force to operate the operative unit through the movable member in either one of the first and second positions.

An eleventh aspect of the present invention, related to the actuator of the tenth aspect, features a further provision of an operating force transmitting member to transmit an operating force of the converting mechanism to the operative unit, wherein the urging member has an urging force to operate the operative unit through the operating force transmitting member.

A twelfth aspect of the present invention, related to the actuator of the first aspect, features a further provision of a worm gear mechanism including a worm wheel closer to the rotational member and a worm closer to the drive source and transmitting rotational force of the drive source to the rotational member.

A thirteenth aspect of the present invention, related to the actuator of the first aspect, features a further provision of a worm gear mechanism including a gear set located at a side of the drive source and a worm wheel closer to the rotational member, and wherein the drive source is disposed in area closer to the worm gear mechanism as a basis of the gear set and supported to the stationary member.

A fourteenth aspect of the present invention, related to the actuator of the first aspect, features that the operative unit comprises a clutch included in a differential unit, including an outer differential case rotating in response to a drive power of a prime mover, an inner differential case disposed in the outer differential case for a relative rotation capability and a differential mechanism connected to the inner differential case, to connect and disconnect the outer differential case and the inner differential case with respect to one another, and wherein the actuator is operative to couple and uncouple the clutch to connect and disconnect a torque between the outer differential case and the inner differential case.

A fifteenth aspect of the present invention, related to the actuator of the first aspect, features that the operative unit comprises a clutch included in a differential unit, including a differential case rotating in response to a drive power of a prime mover and a differential mechanism distributing rotation of the differential case to wheels through a pair of output members, and disposed between either one of the output members and one of the wheels, and wherein the actuator is operative to couple and uncouple the clutch to connect and disconnect a torque between the output member and the wheel.

A sixteenth aspect of the present invention, related to the actuator of the fourteenth or fifteenth aspects, features that the differential unit further comprises a 2–4 shift mechanism adapted to interrupt the drive power of the prime mover in a drive power transmission system closer to the wheel that is disconnected during a two-wheel drive condition in a four-wheel drive vehicle, and wherein the actuator is operative to be concurrently changed over with the 2–4 shift mechanism.

A seventeenth aspect of the present invention, related to the actuator of the first aspect, features that the operative unit comprises a clutch included in a differential unit, including an input-side torque transmitting member rotating in response to a drive power of a prime mover and a differential mechanism distributing rotation of the input-side torque transmitting member to wheels through a pair of output-side torque transmitting members, and disposed in either one of the input-side torque transmitting member and the output-side torque transmitting members to limit a differential movement of the differential mechanism, and wherein the actuator is operative to couple or uncouple the clutch to limit the differential movement of the differential mechanism.

An eighteenth aspect of the present invention provides an actuator comprising an annular support plate, a cam plate disposed on one side of the support plate in an axial direction for clockwise and counterclockwise rotating capabilities, a movable plate disposed on the other side of the support plate in the axial direction to be axially movable to operatively move the operative unit, a gear set having a gear unitarily rotating with the cam plate, an electric motor rotating the cam plate through the gear set in clockwise and counterclockwise direction, and a cam mechanism disposed between the cam plate and the movable plate and converting a rotational force of the cam plate to an operating shift force of the movable plate.

A nineteenth aspect of the present invention, related to the actuator of the eighteenth aspect, features that the movable plate comprises an operating portion operating the operative unit and a guide portion guiding the cam mechanism to move in the operating portion, and the operating portion of the movable plate, the support plate, the cam plate, the cam mechanism and the guide portion of the movable plate being located in an order from an area closer to the operative unit along an axial direction of the cam plate.

A twentieth aspect of the present invention, related to the actuator of the eighteenth aspect, features that the cam mechanism comprises a first cam mechanism creating a first thrust force to axially move the operative unit from the first position to the second position depending on rotation of the rotational member, and a second cam mechanism bearing a rotational torque occurring when the operative unit is coupled in either one of the first and second positions and creating a second thrust force to retain the operative unit in the one position.

A twenty-first aspect of the present invention, related to the actuator of the eighteenth aspect, features that the support plate comprises a support-plate-side insertion bore portion, the cam plate comprises a cam-plate-side insertion bore portion and a cam-plate-side protrusion adapted to be inserted through the support-plate-side insertion bore portion to engage the support plate at a circumferential position displaced from the support-plate-side insertion bore portion, the movable plate comprises a movable-plate-side protrusion adapted to be inserted through the respective insertion bore portions of the support plate and the cam plate to engage the cam plate at a circumferential position displaced from the respective insertion bore portions of the support plate and the cam plate, and wherein under a condition where the support plate, the cam plate and the movable plate are assembled, the cam plate engages the support plate by means of the cam-plate-side protrusion inserting through the support-plate-side insertion bore portion and the movable plate engages the cam plate by means of the movable-plate-side protrusion inserting through the respective insertion bore portions of the support plate and the cam plate.

A twenty-second aspect of the present invention, related to the actuator of the eighteenth aspect, features that the cam mechanism comprises the movable-plate-side protrusion, and a cam surface formed on the cam plate, and wherein the cam surface comprises a slanted cam surface adapted to axially move the movable plate through the movable-plate-side protrusion with rotation of the cam plate, and a retainer surface with no cam angle and retaining the movable-plate-side protrusion, that has traveled on the slanted cam surface, in a traveled position.

A twenty-third aspect of the present invention, related to the actuator of the twenty-second aspect, features that a retainer protrusion is disposed between the slanted cam surface of the cam surface and the retainer surface, and wherein during inoperative condition of the electric motor, the retainer protrusion and the movable-plate-side protrusion are brought into abutting engagement to prevent the movable-plate-side protrusion from moving to the retainer surface from the slanted cam surface and to the slanted cam surface from the retainer surface.

A twenty-fourth aspect of the present invention, related to the actuator of the twenty-second aspect, features that the movable-plate-side protrusion comprises an axial portion formed at a base portion, and a radial portion formed at an end of the axial portion, and wherein the cam mechanism comprises the radial portion and the cam surface of the cam plate.

A twenty-fifth aspect of the present invention, related to the actuator of the twenty-first aspect, features that the support-plate-side insertion bore portion has a plurality of insertion bores formed at circumferentially and equidistantly spaced position, the cam-plate-side insertion bore portion has a plurality of insertion bores formed at circumferentially and equidistantly spaced position, the movable-plate-side protrusion has a plurality of protrusions formed at circumferentially and equidistantly spaced position, and the cam-plate-side protrusion has a plurality of protrusions formed at circumferentially and equidistantly spaced position, A twenty-sixth aspect of the present invention, related to the actuator of the twenty-first aspect, features that the support plate, the cam plate and the movable plate have annular shapes, respectively, and wherein the support-plate-side insertion bore portion is formed at an inner periphery of the support plate in a concave portion, and the cam-plate-side insertion bore portion is formed at an inner periphery of the cam plate in a concave portion, which concave portions are concentrically disposed around a periphery of the operative unit.

A twenty-seventh aspect of the present invention, related to the actuator of the eighteenth aspect, features that a return spring urging the operative unit in an inoperative condition, and a shift spring rendering the operative unit operative against a force of the return spring; and wherein the cam mechanism has a thrust force acting in a direction in which the shift spring is compressed.

A twenty-eighth aspect of the present invention, related to the actuator of the twenty-seventh aspect, features a further provision of the support plate and the movable plate further comprise recessed portions which end of the shift spring engage to preclude drop-out of the shift spring.

A twenty-ninth aspect of the present invention, related to the actuator of the eighteenth aspect, features a further provision of a position sensor disposed between the support plate and the movable plate to detect a position of the movable plate.

A thirtieth aspect of the present invention, related to the actuator of the eighteenth aspect, features that a portion of the cam plate is integrally formed with a gear portion.

A thirty-first aspect of the present invention, related to the actuator of the eighteenth aspect, features a further provision of urging means for transmitting the operating shift force to the operative unit, the urging means being integrally formed with the movable plate or the support plate.

A thirty-second aspect of the present invention, related to the actuator of the eighteenth aspect, features that the urging means comprises a circumferential spring segment formed in the movable plate or the support plate.

A thirty-third aspect of the present invention, related to the actuator of the thirty-first aspect, features that the urging means is formed in the movable plate, and the cam mechanism creates the operating shift force in one and the other directions depending on rotations of the cam plate in one and the other directions, the movable plate being operative to transmit the operating shift force to the operative unit in the one and the other directions through the urging means.

A thirty-fourth aspect of the present invention, related to the actuator of the thirty-first aspect, features that the operative unit comprises a clutch disposed between a pair of torque transmitting members, and wherein the actuator is operative to connect and disconnect the clutch for thereby connecting and disconnecting a torque between the torque transmitting members.

A thirty-fifth aspect of the present invention, related to the actuator of the eighteenth aspect, features that the operative unit comprises a clutch, included in a differential unit including an outer differential case rotating due to a drive power of a prime mover, an inner differential case disposed internally of the outer differential case for relative rotation capability thereto, and a differential mechanism connected to the inner differential case, for connecting and disconnecting a coupling between the outer differential case and the inner differential case, and wherein the actuator is operative to connect and disconnect the clutch for connecting and disconnecting a torque between the outer differential case and the inner differential case.

A thirty-sixth aspect of the present invention, related to the actuator of the eighteenth aspect, features that the operative unit comprises a clutch included in a differential unit, including a differential case rotating in response to a drive power of a prime mover and a differential mechanism distributing rotation of the differential case to wheels through a pair of output members, and disposed between either one of the output members and one of the wheels, and wherein the actuator is operative to couple and uncouple the clutch to connect and disconnect a torque between the output member and the wheel.

A thirty-seventh aspect of the present invention, related to the actuator of the eighteenth aspect, features that the operative unit comprises a clutch included in a differential unit, including a differential case rotating in response to a drive power of a prime mover and a differential mechanism distributing rotation of the differential case to wheels through a pair of output members, and disposed between either one of the differential case and the output members to limit differential movement of the differential mechanism, and wherein the actuator is operative to couple and uncouple the clutch to limit the differential movement of the differential mechanism.

A thirty-eighth aspect of the present invention, related to the actuator of the thirty-fourth aspect, features that the torque transmitting members, the outer differential case or the differential case are supported on a stationary member through a thrust bearing and a bearing cap, and wherein the bearing cap is screwed into the stationary member by means of a screw portion, the bearing cap is formed with an abutting engagement portion with which the cam plate, the movable plate or the support plate are brought into abutting engagement whereby when rotating the bearing cap by means of the screw portion to adjust a preload of the thrust bearing, the cam plate, the movable plate or the support plate are pushed by the abutting engagement portion of the bearing cap to move in the same stroke as that of the bearing cap.

DETAILED DESCRIPTION OF THE PREFERRED EMBODIMENTS

An actuator 1 of a first embodiment and a front differential 3 (deferential unit) using this actuator are described below with reference to FIGS. 2 and 3.

Figure 1:
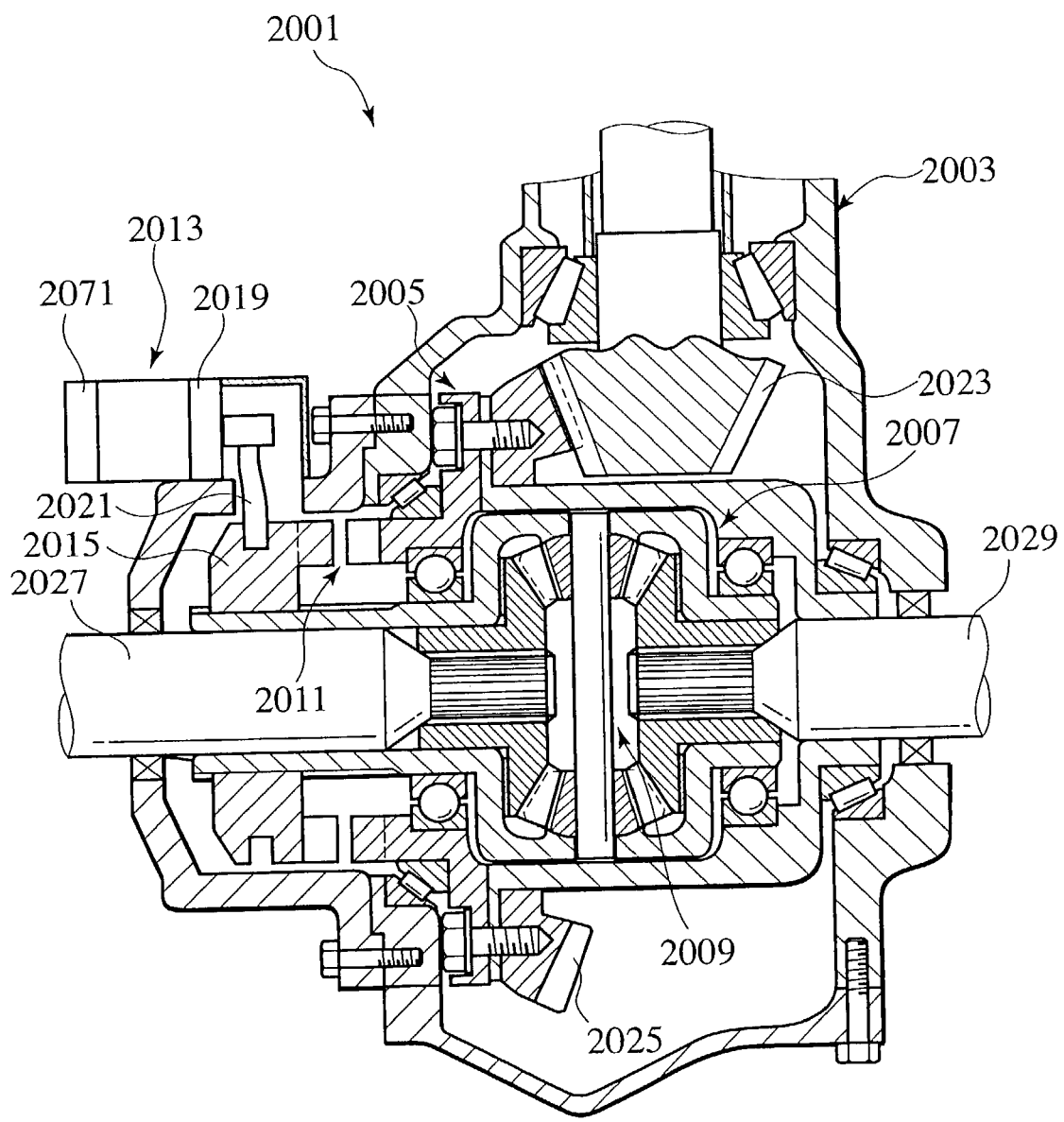
FIG. 1 is a cross sectional view illustrating a related art.
Figure 2:
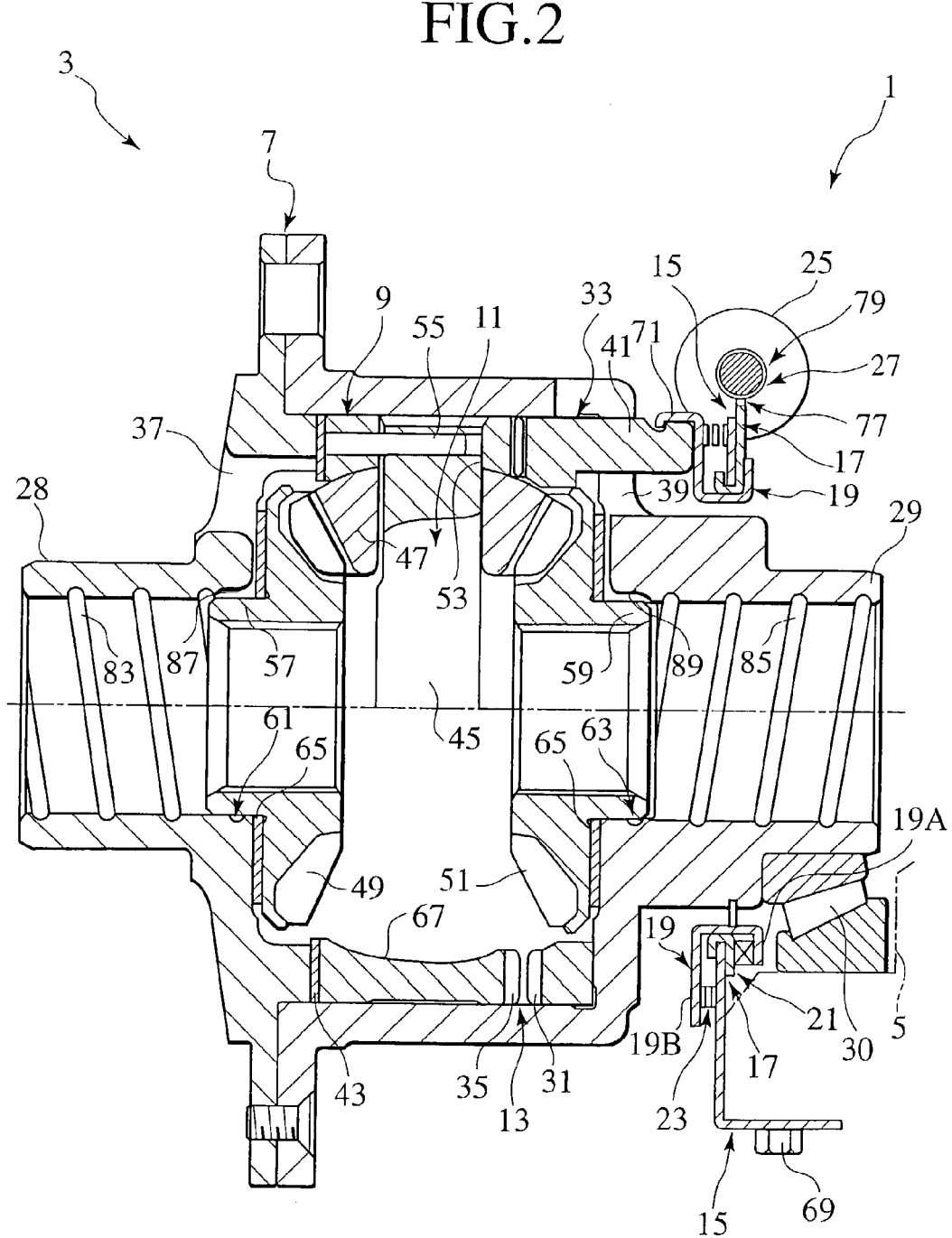
FIG. 2 is a cross sectional view illustrating an actuator of a first embodiment and a front differential using such an actuator.

FIG. 2 shows a longitudinal cross section of the front differential 3, with its left and right directions corresponding to associated left and right directions of a four-wheel-drive vehicle in which the front differential 3 is employed.

The front differential 3 is located internally of a differential carrier 5, which is internally formed with an oil sump.

The front differential 3 is comprised of an actuator 1, an outer differential case 7, an inner differential case 9, a differential mechanism using a bevel gear 11 and a dog clutch 13 (an operative unit).

Further, the actuator 1 is comprised of a support plate 15 (a stationary member), a cam plate 17 (a rotational member), a thrust plate 19 (a movable member), a cam 21 (a converting mechanism), a shift spring (an urging member), an electric motor 25 (a drive source), a worm gear mechanism 27 (a power transmitting mechanism) and a controller (not shown).

As shown in FIG. 2, the thrust plate 19 includes an operating portion 19A for operating the dog clutch 13, and a guide portion 19B that allows movement of the cam 21 to be guided in the operating portion 19A. The above-described component parts of the actuator 1 are arranged such that in an order from an area closer to the dog clutch 13 along a rotational axis of the cam plate 17, the guide portion 19B of the thrust plate 19, the operating portion 19A of the thrust plate 19, the support plate 15, the cam plate 17, the cam 21, and the operating portion 19A of the thrust plate 19.

The front differential 3 takes the form of a double casing structure that is comprised of the outer differential case 7 and the inner differential case 9 internally disposed therein for rotating and sliding movements. Also, left and right boss portions 28, 29 formed on the outer differential case 7 are supported by the differential carrier 5 by means of a bearing 30.

Inside the outer differential case 7, a clutch ring 33 is disposed in the outer differential case 7 for axially sliding movements at an inner peripheral surface thereof and has a left distal end formed with meshing teeth 31.

Further, the inner differential case 9 has a right distal end formed with meshing teeth 35. Thus, the dog clutch 13 is structured by the meshing teeth 31 of the clutch ring 33 and the meshing teeth 35.

Openings 37, 39 are formed on left and right sides of the outer differential case 7 at circumferentially and equidistantly spaced positions thereof to permit oil to be flown into or out of the outer differential case 7. Also, formed on a right end of the clutch ring 33 at circumferentially and equidistantly spaced positions thereof are three pieces of leg portions 41. These leg portions 41 are brought into meshing engagement with the right openings 39, respectively, so as to protrude outward. Also, the leg portions 41 may be provided in four pieces.

As described below, the clutch ring 33 is operatively moved leftward or rightward by the actuator 1. As the clutch ring 33 is moved leftward, the dog clutch 13 is brought into meshing engagement to allow the outer differential case 7 and the inner differential case 9 to be connected to one another. On the contrary, if the clutch ring 33 is moved rightward, the dog clutch 33 is uncoupled, and the outer differential case 7 and the inner differential case 9 are disconnected from one another.

Disposed between a left distal end of the inner differential case 9 and the outer differential case 7 is a thrust washer 43 that bears an operating force of the actuator 1. And, the inner differential case 9 is positioned leftward along an axial direction by means of the thrust washer 43.

The differential mechanism 11 having the bevel gear is comprised of a plurality of pinion shafts 45, pinion gears 47, and left and right output side gears 49, 51.

The respective pinion shaft 45 have distal ends that engage a plurality of through-bores 53 formed in the inner differential case 9 at circumferentially equidistantly spaced positions thereof and are prevented from dropping out from the through-bores 53 by means of spring pins 55.

The pinion gears 47 are rotationally mounted on the respective pinion shafts 45. And, the side gears 49, 51 are held at left and right sides thereof in meshing engagement with the respective pinion gears 47.

The side gears 49, 51 have respective boss portions 57, 59 that are accommodated in respective journal portions 61, 63 formed in the outer differential case 7. And, left and right front wheel axles are disposed in the respective boss portions 57, 59 through respective splined connections.

Further, thrust washers 65 are disposed between the side gears 49, 51 and the outer differential case 7, respectively. These thrust washers 65 bear thrust forces exerted by the side gears 49, 51 during meshing engagements thereof.

Formed in the inner differential case 9 at an inner circumferential periphery thereof are spherical washer portions 67 in opposition to the respective pinion gears 47. The spherical washer portions 67 bear centrifugal forces of the pinion gears 47 and reaction forces of the respective pinion gears 47 occurring during meshing engagements thereof with the respective side gears 49, 51.

The support plate 15 of the actuator 1 is fixedly secured to the differential carrier 5 by means of bolts 69, 69. The cam plate 17 is disposed on the support plate 15 for sliding and rotating movements. The thrust plate 19 is connected to the clutch ring 33 by means of arm portions 71 formed at a left distal end of the thrust plate 19 for leftward and rightward sliding movements together with the clutch ring 33. Also, as shown in FIG. 3, formed on the support plate 15 at two circumferentially spaced positions are protruding portions 73 that engage the thrust plate 19 to prevent the same from being rotated. The cam plate 17 is formed at its circumferentially spaced positions with two cutouts 75 by which the cam plate 17 is prevented from interfering the respective protruding portions 73.

The cams 21 are formed between the cam plate 17 and the thrust plate 19 at three circumferentially and equidistantly spaced positions by sheet metal works, respectively.

As shown in FIG. 2, the shift spring 23 is disposed between the support plate 15 and the thrust plate 19 to urge the thrust plate 19 and the clutch ring 33 in a direction (leftward) to cause the dog clutch 13 to be brought into meshing engagement.

The electric motor 25 is fixedly secured to the differential carrier 5 and is electrically connected to an on-vehicle battery through the controller.

The worm gear mechanism 27 is comprised of a worm wheel 77 and a worm 79 that are mutually held in meshing engagement. The worm wheel 77 is formed at a portion of an outer circumferential periphery of the cam plate 17. The worm 79 is connected to an output shaft 81 (see FIG. 3).

Figure 3:
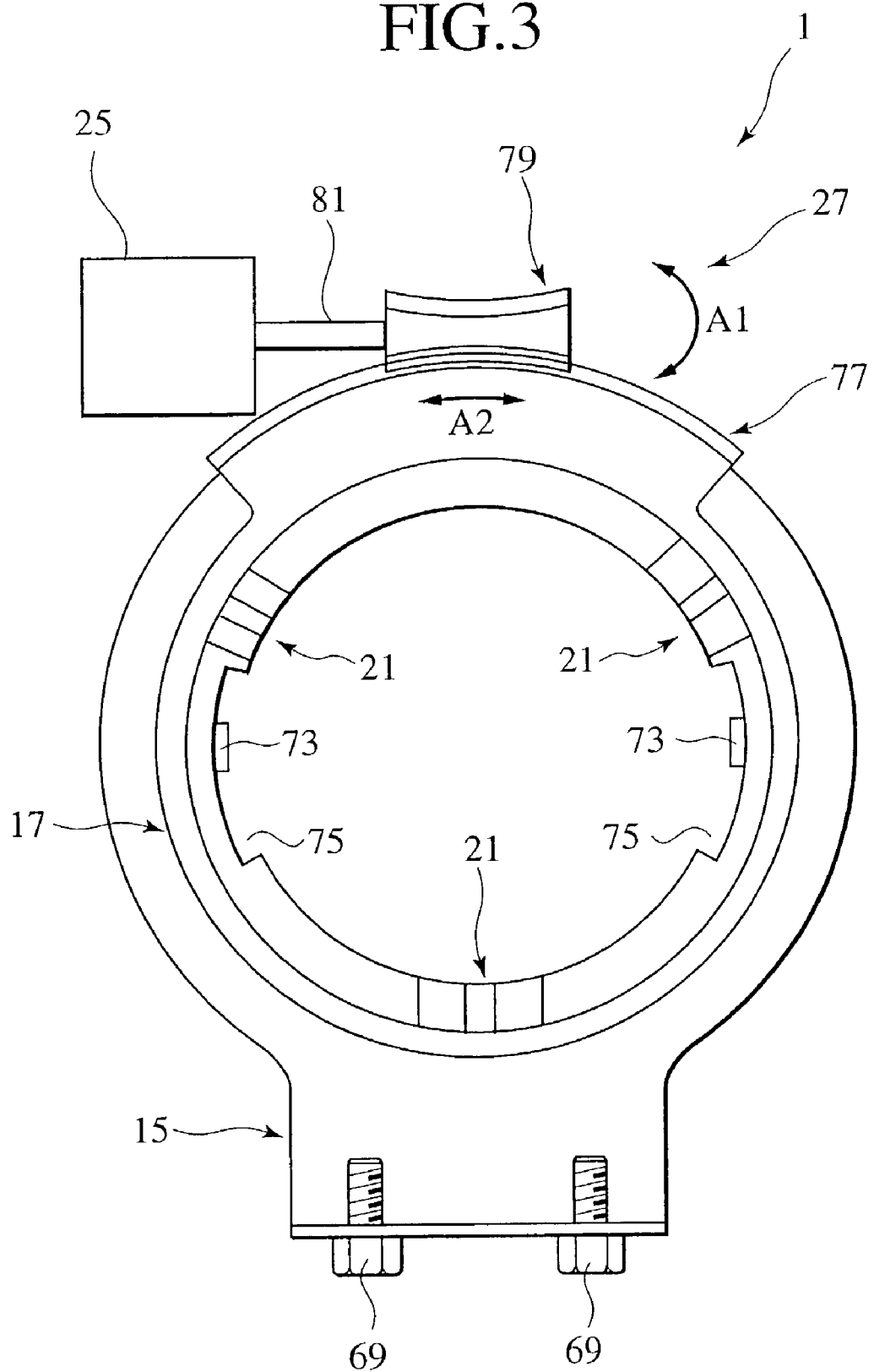
FIG. 3 is a front view illustrating an actuator of the first embodiment.

As shown by arrows A1, A2 in FIG. 3, the worm gear mechanism 27 is operative to rotate the cam plate 17 in shifted directions while amplifying a rotational torque.

The controller is operative to perform time controls for respective given time intervals to rotate the electric motor 25 in both directions (in one and the other directions). Due to such time controls, if the controller operates to rotate the electric motor 25 in one direction for the given time interval, then the cam plate 17 is rotated at a given rotational angle in a given direction by means of the worm gear mechanism 27.

An upper half section of FIG. 2 shows a state under which the cam 21 remains in an inoperative condition. Under such a condition, since the thrust plate 19 (together with the clutch ring 33) is shifted leftward by the action of the shift spring 23, the dog clutch 13 remains in meshing engagement.

Upon meshing engagement of the dog clutch 13, if the clutch rotates, a rotational torque is created. Though a detailed description is described hereinafter, the converting mechanism of the presently filed embodiment is comprised of, in addition to the cams 21 (that is, a first cam mechanism adapted to create a first thrust force to cause the dog clutch 13 to move along the rotational axis between a clutch engaging position and a clutch disengaging position due to rotation of the cam plate 17), and a second cam mechanism adapted to create a second thrust force to cause the clutch to be retained in meshing engagement bearing the rotational torque created by the dog clutch 13 remaining in meshing engagement. The second thrust force created by this second cam mechanism is effective, in addition to the urging force of the shift spring 23, to ensure the clutch to be retained in its meshing engagement.

Under such a situation, if the controller operates to rotate the electric motor 25 in one direction for the given time interval, this causes the cam plate 17 to be rotated at the given rotational angle and allows the cam 21 to be actuated. Then, the resulting cam thrust force shifts the thrust plate 19 (together with the clutch ring 33) rightward against the urging force of the shift spring 23. As a result of this movement, as shown in a lower half section of FIG. 2, the dog clutch 13 is disengaged.

Under such a condition, if the controller operates to rotate the electric motor 25 in the opposite direction for the given time interval, this causes the cam plate 17 to be rotated in the opposite direction at the given rotational angle and interrupts the cam 21 from being actuated. Then, the dog clutch 13 is brought into meshing engagement due to the urging force of the shift spring 23.

When this takes place, the shift spring 23 remains in a waiting mechanism, and the dog clutch 13 is brought into meshing engagement when the meshing teeth 31, 35 are matched in phase.

As set forth above, the connecting and disconnecting mechanism (dog clutch 13) of the front differential 3 and a related 2–4 shift mechanism are simultaneously operated in an interlocked relationship when implementing a shift from a four-wheel drive condition to a two-wheel drive condition.

During the four-wheel drive condition, as noted above, a drive power of the engine is transmitted from the 2–4 shift mechanism to the outer differential case 7 through a front-wheel-drive power train and, subsequently, converted into a rotational drive of the inner differential case 9 through the drug clutch 13. This rotation is distributed from the pinion shafts 45 to the associated side gears 49, 51 through the pinion gears 47 and delivered to the left and right front wheels through the respective front wheel axles.

When the vehicle assumes the four-wheel drive condition, the vehicle has an improvement in a rough-road covering capability, a rough-road escaping capability and a driving stability.

Further, in particular, if the vehicle encounters a drive-resistance difference between the front wheels during traveling on rough roads, the drive power of the engine is differentially distributed to the left and right front wheels due to rotations of the respective pinion gears 47.

During the two-wheel drive condition, the dog clutch 13 disconnects the drive power of the engine to be transferred through the power train between the inner differential case 9 and the front wheels, and the front wheels are rendered to assume freely rotating conditions. Additionally, the power train between 2–4 shift mechanism and the outer differential case 7 is disconnected from both the drive power of the engine and the accompanied rotations of the front wheels, and rotation of the same is interrupted.

In such a manner, during the two-wheel drive condition, rotation of the front-wheel-drive power train between the 2–4 shift mechanism and the outer differential case 7 is interrupted, resulting in reduction in vibrations to provide an improved comfortable riding capability. Moreover, minimized wears result in various component parts of the front-wheel-drive power train to provide durability. In addition, the load of the engine is reduced in an extent in which rotational resistance is decreased, resulting in an improvement in fuel consumption.

The outer differential case 7 is formed with, in addition to the openings 37, 39, oil recessed portions 83, 85, each in a spiral form, at inner circumferential peripheries of the boss portions 28, 29, respectively. Moreover, oil recessed portions 87, 89 are formed on the outer differential case 7 at respective positions opposed to the thrust washers 65, 65 in communication with the oil recessed portions 83, 85, respectively.

Since the openings 37, 39 are formed in the outer differential case 7 at the radially outward areas and immersed in oil in the oil sump formed in the differential carrier 5 at all times, thereby allowing oil from entering the outer differential case 7 during rotation of the outer differential case 7.

Further, oil in the oil sump is splashed up due to the rotation of the outer differential case 7 (together with the ring gear). Resulting splashed oil undergoes a screwed pumping action caused by the oil recessed portions 83, 85 to enter an interior of the outer differential case 7 passing through gaps such as the oil recessed portions 87, 89 and the thrust washers 65, 65.

Oil entering the interior of the outer differential case 7 in such a manner is supplied to the meshing portions of respective gears 47, 49, 51 forming the differential gear with the bevel gear, sliding areas between the pinion shafts 45 and the pinion gears 47, sliding areas between the outer differential case 7 and the inner differential case 9, sliding areas between the outer differential case 7 and the clutch ring 33, and the dog clutch (at the meshing teeth 31, 35 thereof) to lubricate and cool these component parts.

Further, a lower area of the actuator 1 is also immersed in the oil sump, thereby lubricating and cooling associated area between the support plate 15 and the cam plate 17, sliding areas of the thrust plate 19 and the cams 21.

Furthermore, the worm gear mechanism 27 is also lubricated and cooled by the above-described splashed oil.

Thus, minimized wears result in the above-described respective lubricated and cooled areas to which oil is supplied, providing an improved durability. Moreover, reduced wear resistances result in the respective sliding areas, resulting in an improvement in fuel consumption.

In such a manner, the actuator 1 and the front differential 3 are structured.

As set forth above, the actuator 1 and the front differential 3, that converts the rotational force of the electric motor 25 to the operating force of the dog clutch 13 by means of the cams 21, differs from the related art structure that needs an actuator utilizing fluid pressure and make it possible to allow a high cost pump, the actuator utilizing fluid pressure (for a piston and a cylinder) and an associated converting mechanism to be dispensed with. As a consequence, the structure becomes simple in that extent and can be realized at a low cost.

Further, the actuator 1 and the front differential 3 does not need to prepare a wide application space to install a pressure line, resulting in a light weight and compact in structure to improve an on-vehicle installation capability. Accordingly, there is no need for altering the differential carrier 5, thereby preventing a remarkable cost increase that would otherwise be caused because of alteration.

Furthermore, the actuator 1 and front differential 3 become free from adverse affects caused by functional degradation and pressure fluctuation resulting from a pressure leakage, resulting in a remarkable improvement in a performance, a stability and a reliability in operation. In addition, strengthening of the sealing properties at various part of the pressure line and accompanying cost increase can also be avoided.

Moreover, the actuator 1 and front differential 3 are different from the related art structure and have no limitation in a kind of drive power sources to be applied, providing a great freedom in structuring the whole system.

Also, the cams 21 can be fabricated by sheet metal works and, thus, can be formed at low costs.

In addition, as described above, the actuator 1 takes the form of a structure that is actuated in a negative way such that, if the cams 21 are actuated, the dog clutch 13 is uncoupled and, if the operations of the cams 21 are interrupted, the dog clutch 13 is brought into meshing engagement due to the action of the shift spring 23. Under such a structure, by changing the urging force of the shift spring 23, the operating force and the amount of operation (stroke) of the dog clutch 13 can be freely adjusted.

Further, since the shift spring 23 permits the dog clutch 13 to take the form of the waiting mechanism, ratcheting of the dog clutch 13 and accompanying ratchet noise can be minimized, with a resultant remarkable increase in a durability.

Furthermore, in the actuator 1, no rotational force is exerted to the cam plate 17 under a situation in which the cams 21 remain in operative conditions (when the dog clutch 13 remains in meshing engagement). Consequently, even when the electric motor 25 is interrupted or even in a failure of the electric motor 25, the coupling condition of the front differential 3 is retained, thereby permitting the vehicle to remain in the four-wheel drive condition.

Moreover, under a condition where the cams 21 are actuated, the rotational force exerted to the cam plate 17 due to the reacting thrust forces of the cams 21 is absorbed by a large frictional resistance caused by the worm gear mechanism 27. Accordingly, if the electric motor 25 is interrupted or if the electric motor 25 falls in failure, the front differential 3 is retained in the disconnected condition and the vehicle is retained in the two-wheel drive condition.

In such a way, supply of electric power to the electric motor 25 is interrupted either in a case where the dog clutch 13 is brought into meshing engagement (in the four-wheel drive condition) or in a case where the dog clutch is disconnected (in the two-wheel drive condition). Accordingly, load of the battery is eliminated in that extent, improving fuel consumption. In addition, a durability of the electric motor 25 is improved.

[Second Embodiment]

An actuator 101 of a second embodiment and a front differential 103 (differential unit) using the same are described below with reference to FIG. 4.

The front differential 103 is replaced with the front differential 3 of the four-wheel-drive vehicle used in the first embodiment. Hereinafter, the same component parts as those of the actuator 1 and the front differential 3 bear the same reference numerals and are referred to for description on different points.

The front differential 103 is comprised of an actuator 101, the outer differential case 7, the inner differential case 9, the differential mechanism 11 having the bevel gear, and the dog clutch 13.

Further, the actuator 101 is comprised of a support plate 105 (a stationary member), a screw mechanism 107 (a converting mechanism), a rotational plate 109 (a rotational member: a movable member), an intermediate plate 111 (an operating force transmitting member), a shift spring 113 (an urging member), a return spring 115, a gear set 117 (a power transmitting mechanism), the electric motor 25 (the drive power source) and the controller (not shown).

Figure 4:
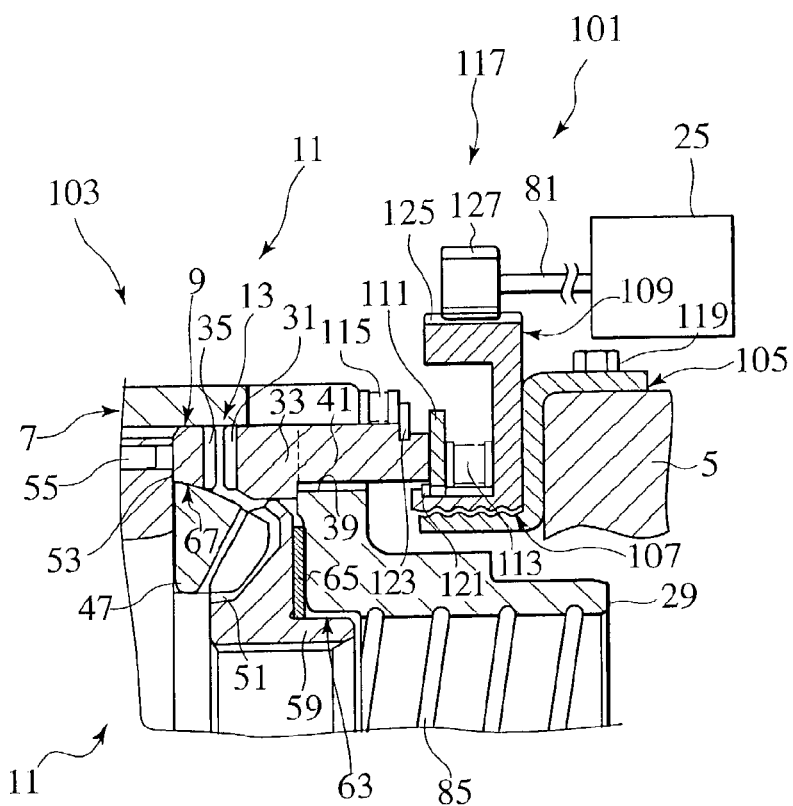
FIG. 4 is a cross sectional view illustrating an actuator of a second embodiment and a front differential using such an actuator.

As shown in FIG. 4, the above component parts forming the actuator 1 are arranged in a direction along the rotational axis of the rotational plate 109 such that, in an order closer to the dog clutch 13, the rotational plate 109 and the support plate 105 are disposed. Also, the support plate 105, the screw mechanism 107 and the rotational plate 109 are disposed in an order from a position closer to an inner area of the rotational plate 109 with respect to a radial direction thereof.

The support plate 105 is fixedly secured to the differential carrier 5 by means of bolts 119. The screw mechanism 107 is located between the support plate 105 and the rotational plate 109.

The intermediate plate 111 is coupled to the rotational plate 109 through a splined connection and positioned leftward by a snap ring 121. Also, the intermediate plate 111 plays a role as a washer that slides with respect to the clutch ring 33.

The shift spring 113 is disposed between the rotational plate 109 and the intermediate plate 111 and urges the clutch ring 33 in a direction (leftward) to cause the dog clutch 13 to be brought into meshing engagement.

The return spring 115 is disposed between a snap ring 123, mounted to the clutch ring 33, and the outer differential case 7, thereby urging the clutch ring 33 in a direction (rightward) to cause the dog clutch 13 to be disengaged.

The gear set 117 is comprised of a large diameter spur gear 125 and a small diameter spur gear 127 that are mutually in meshing engagement with one another. The large diameter spur gear 125 is formed on the rotational plate 109 at an outer circumferential periphery thereof. The small diameter spur gear 127 is connected to the output shaft 81 of the electric motor 25. The gear set 117 is operative to amplify the rotational torque of the electric motor 25, thereby rotating the rotational plate 109 in an amplified torque.

The controller performs the time control to rotate the electric motor 25 in both directions for respective given time intervals. By this time control, if the controller rotates the electric motor 25 for the given time interval, the rotational plate 109 is rotated in the given direction at a given rotational angle by means of the gear set 117.

FIG. 4 shows a state where the rotational plate 109 (together with the clutch ring 33) is shifted rightward by the screw thrust force of the screw mechanism 107 and the urging force of the return spring 115, with the dog clutch 13 remaining in a uncoupled condition.

Under such a condition, if the controller rotates the electric motor 25 in one direction for the given time interval, the intermediate plate 111 is moved leftward by the screw thrust force of the screw mechanism 107 and the urging force of the shift spring 113 against the urging force of the return spring 115, thereby causing the dog clutch 13 to be brought into meshing engagement.

When this occurs, the shift spring 113 remains as the waiting mechanism, and the dog clutch 13 is brought into meshing engagement when the meshing teeth 31, 35 are matched in phase.

Upon meshing engagement of the dog clutch 13, if the clutch ring 33 rotates, a rotational torque is created. The converting mechanism of the presently filed embodiment is comprised of, in addition to the screw mechanism 107 (that is, the screw mechanism adapted to create a first thrust force to cause the dog clutch 13 to move along the rotational axis between a clutch engaging position and a clutch disengaging position due to rotation of the rotational plate 109), and a cam mechanism adapted to create a second thrust force to cause the clutch to be retained in meshing engagement bearing the rotational torque created by the dog clutch 13 remaining in meshing engagement. The second thrust force created by this cam mechanism is effective, in addition to the urging force of the shift spring 113, to ensure the clutch to be retained in its meshing engagement.

Upon meshing engagement of the dog clutch 13, the vehicle assumes the four-wheel drive condition and has an improvement in a rough-road covering capability, a rough-road escaping capability and a driving stability.

Further, if the vehicle encounters a drive-resistance difference between the front wheels during traveling of the vehicle on rough-roads, the drive power of the engine is differentially distributed to the left and right front wheels due to rotations of the respective pinion gears 47.

Under such a condition, if the controller rotates the electric motor in the opposite direction for the given time interval, the dog clutch 13 is disengaged by the screw thrust force caused by the screw mechanism 107 in the opposite direction and the urging force of the return spring 115.

Upon disengagement of the dog clutch 13, the vehicle assumes the two-wheel drive condition to interrupt the front-wheel-drive power train from being rotated, resulting in reduction in vibrations to improve a comfortable riding capability. In addition, reductions in wear result in various parts of the front-wheel-drive power train, with a resultant increase in a durability. Also, load of the engine is decreased to the extent corresponding to reduction in the rotational resistance, thereby improving fuel consumption.

In such a manner, the actuator 101 and the front differential 103 are structured.

As set forth above, the actuator 101 and the front differential 103, that converts the rotational force of the electric motor 25 to the operating force of the dog clutch 13 by means of the screw mechanism 107, make it possible to allow the high cost pump, the actuator utilizing fluid pressure (for the piston and the cylinder) and the associated converting mechanism to be dispensed with. As a consequence, the structure becomes simple in that extent and can be realized at a low cost.

Further, the actuator 101 and the front differential 103 may be configured to have the screw mechanism 107 with a reduced lead in a screw thread, thereby providing an ease of precisely adjusting the operating force. Additionally, the operating force of the dog clutch 13 can be strengthened by miniaturizing the electric motor 25 while reducing the load of the battery.

Furthermore, with the structure wherein the meshing engagement of the dog clutch 13 is effectuated by the shift spring 113, by varying the urging force of the shift spring 113, it becomes possible to freely adjust the operating force of and the amount of operation (stroke) of the dog clutch 13.

Further, due to the shift spring 113 taking the form of the waiting mechanism, ratcheting and accompanying ratchet noise of the dog clutch 13 can be minimized, with a resultant remarkable increase in a durability.

Furthermore, in the actuator 101, even when the thrust force is imparted to the clutch ring 33, erroneous rotation of the rotational plate 109 can be prevented due to a large frictional resistance occurring in the screw mechanism 107. This causes the dog clutch 13 and the front differential 103 to be continuously retained in their engagement and disengagement conditions as they are.

Accordingly, even when the electric motor 25 is stopped or in a failure of the electric motor 25, the vehicle still remains in the four-wheel drive condition or in the two-wheel drive condition.

In addition, the actuator 101 and the front differential 103 have the same advantages as those of the actuator 1 and the front differential 3 with exception of the advantages of the actuator 1 and the front differential 3 owing to the use of the converting mechanism composed of the cam mechanism 21 and the use of the transmitting mechanism composed of the worm gear mechanism 27.

[Third Embodiment]

Figure 5:
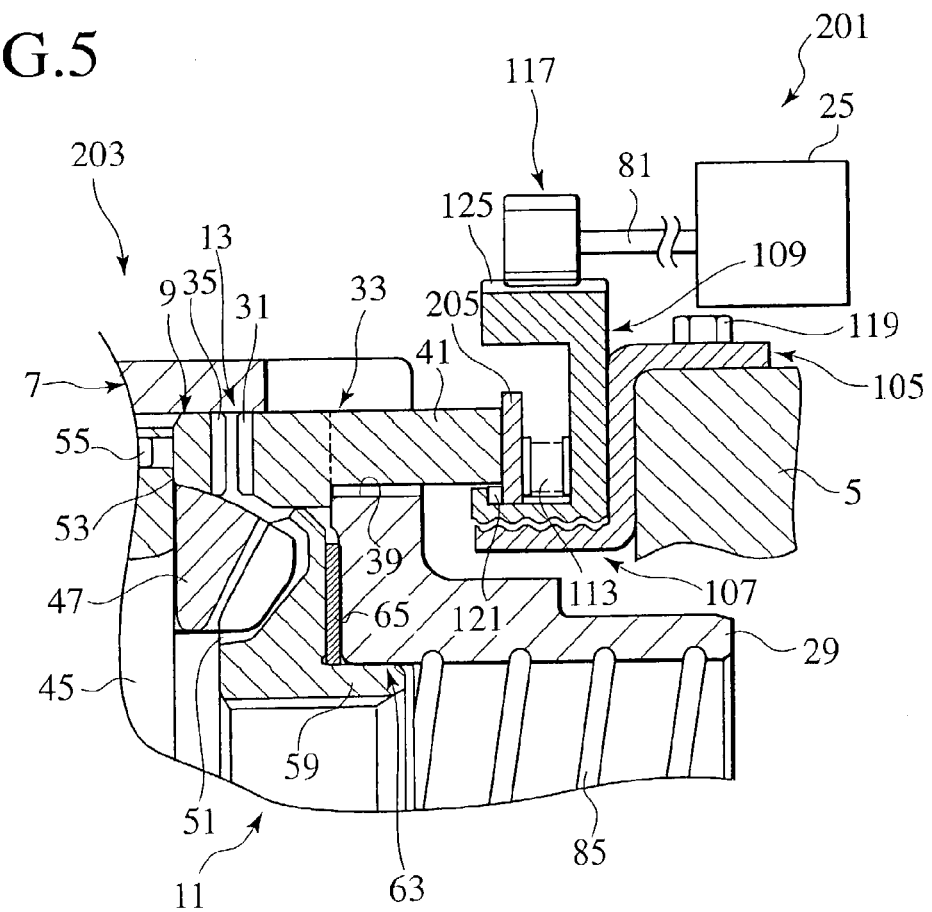
FIG. 5 is a cross sectional view illustrating an actuator of a third embodiment and a front differential using such an actuator.

An actuator 201 and a front differential 203 (a differential unit) using the same are described below with reference to FIG. 5.

The actuator 201 is a modified form of the actuator 101 of the second embodiment. Hereinafter, the same component parts as those of the actuator 101 and the front differential 103 bear the same reference numerals and are referred to herein for description of the parts on different points.

The front differential 203 is comprised of an actuator 201, the outer differential case 7, the inner differential case 9, the differential mechanism 11 having the bevel gear, and the dog clutch 13.

Further, the actuator 201 is comprised of the support plate 105 (the stationary member), the screw mechanism 107 (the converting mechanism), the rotational plate 109 (the rotational member: the movable member), a magnet plate 205 (an operating force transmitting member), the shift spring 113 (the urging member), the gear set 117 (the power transmitting mechanism), the electric motor 25 (the drive power source) and the controller (not shown).

The magnet plate 205 includes a permanent magnet plate that attracts the clutch ring 33 (the arms 41) of the dog clutch 13 to be unitarily moveable with the clutch ring 33.

As a consequence, with the dog clutch 13 remaining in the uncoupled condition, even in the absence of the return spring 115, the clutch ring 33 is moved rightward accompanying the rotational plate 109 due to the attraction force of the magnet plate 205.

In such a manner, the actuator 201 and the front differential 203 are structured.

As set forth above, due to the presence of the magnet plate 205, none of the return spring 115 and the associated positioning snap ring 123 is required in the actuator 201 and the front differential 203. As a consequence, the number of component parts are eliminated in that extent, resulting in reduction in costs.

In addition, the actuator 201 and the front differential 203 have the same advantages as those of the actuator 101 and the front differential 103.

[Fourth Embodiment]

An actuator 301 of a fourth embodiment and a front differential 303 (a differential unit) using the same are described below with reference to FIG. 6 to FIGS. 8A, 8B.

The front differential 303 is replaced with the front differential 3 of the first embodiment. Hereinafter, the same component parts as those of the actuator 1 and the front differential 3 bear the same reference numerals and are referred to herein for description of the parts on different points.

The front differential 303 is comprised of an actuator 301, the outer differential case 7, the inner differential case 9, the differential mechanism 11 having the bevel gear, and the dog clutch 13.

Further, the actuator 301 is comprised of a fixing metal fixture 305, a support plate 305 (a stationary member), a rotational plate 309 (a rotational member: a movable member), four cams 311 (a converting mechanism), respective four pieces of large and small retainers 313, 315, four coil springs 317 (urging members), a spring plate 319, an operating mechanism 321 (a power transmitting mechanism: a drive power source) for operating the dog clutch 13 in meshing engagement and disengagement conditions, and the controller (not shown).

Figure 8A:
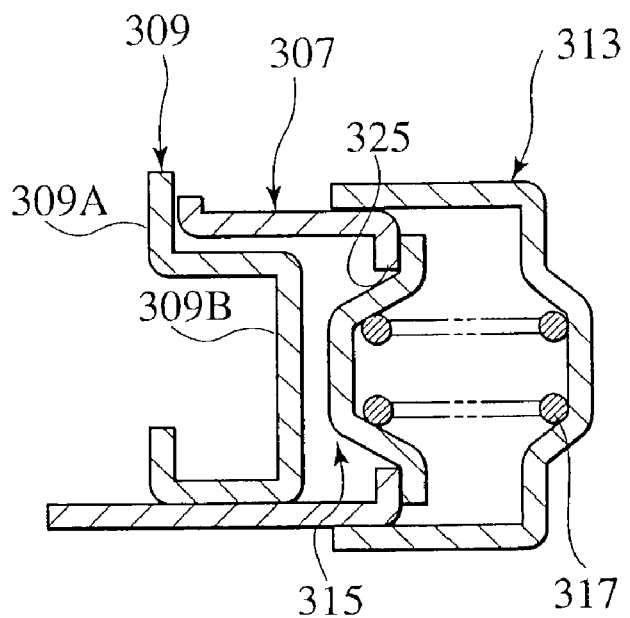
FIG. 8A is a cross sectional view taken on line VIII—VIII of FIG. 7 under a condition in which the actuator of the fourth embodiment is rendered inoperative.
Figure 8B:
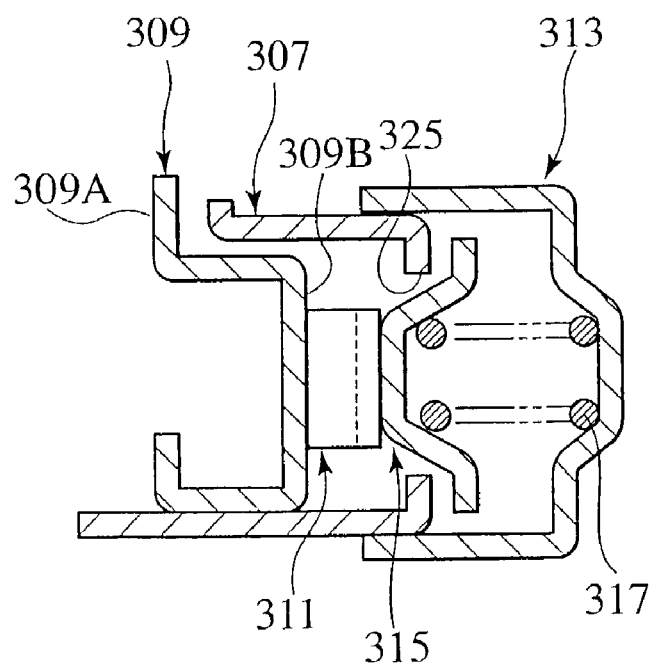
FIG. 8B is a cross sectional view taken on line VIII—VIII of FIG. 7 under a condition in which the actuator of the fourth embodiment is rendered operative.

As shown in FIGS. 8A, 8B, the rotational plate 309 includes an operating portion 309A for operating the dog clutch 13, and a guide portion 309B that guide movements of the cams 311 in the operating portion 309A. And, the above-described component parts forming the actuator 301 are arranged in a direction along the rotational axis of the rotational plate 309 such that, in an order closer to the dog clutch 13, the operating portion 309A of the rotational plate 309, the guide portion 309B of the rotational plate 309, the cams 311 and the support plate 307 are disposed.

Figure 6:
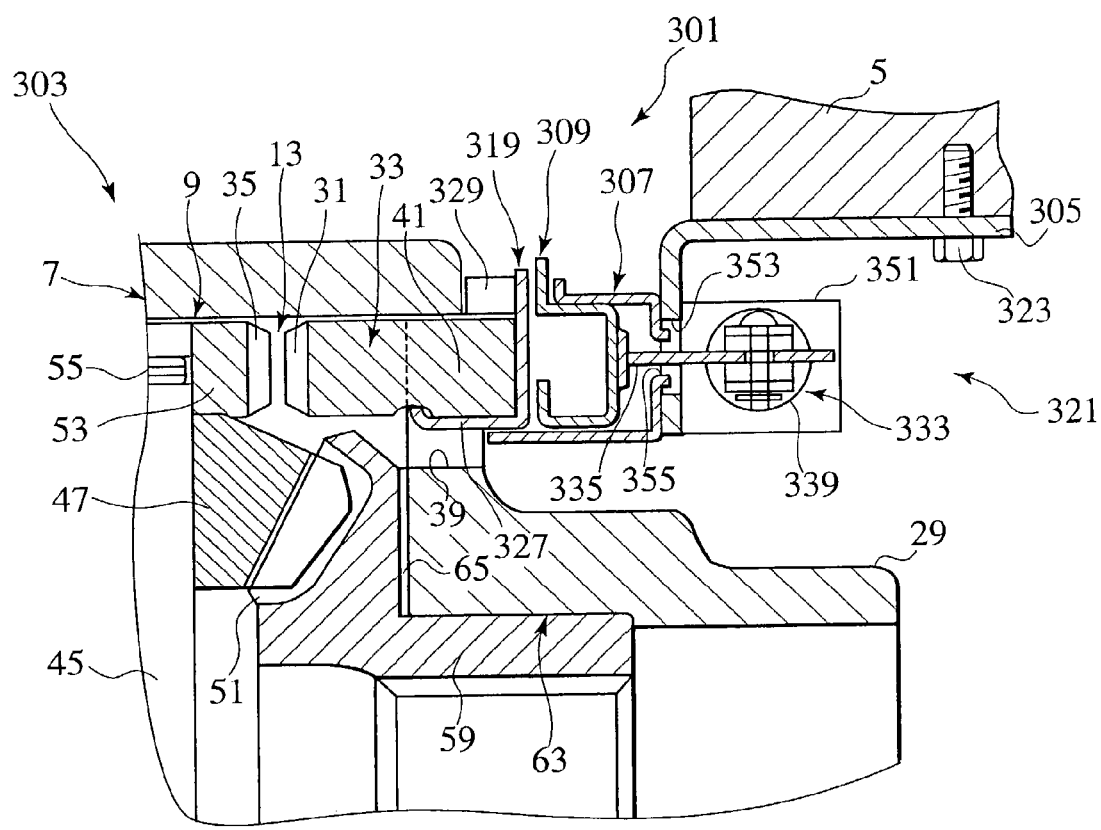
FIG. 6 is a cross sectional view illustrating an actuator of a fourth embodiment and a front differential using such an actuator.
Figure 7:
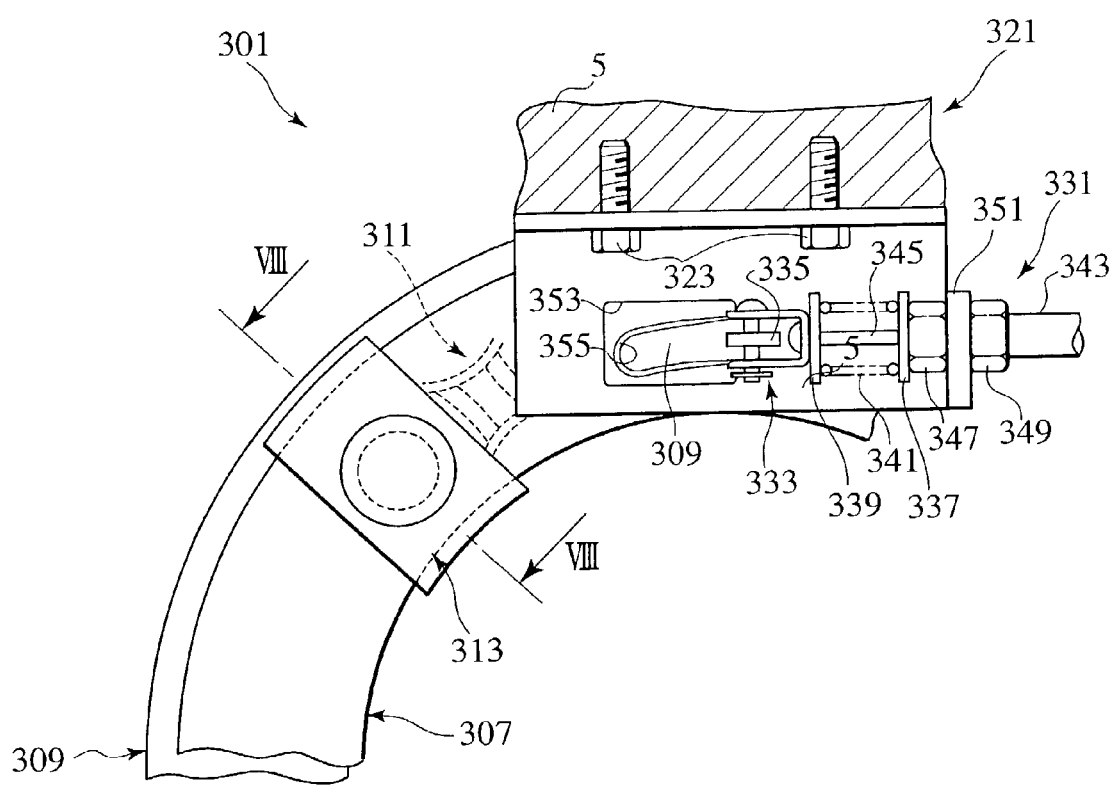
FIG. 7 is a front view illustrating the actuator of the fourth embodiment.

As shown in FIGS. 6, 7, the fixing metal fixture 305 is fixedly secured to the differential carrier 5 by means of bolts 323, 323. As sown in FIG. 6, further, the support plate 307 is welded to the fixing metal fixture 305.

The rotational plate 309 is disposed at a left side of the support plate 307 for rotating movements. Also, the cams 311 are disposed on the rotational plate 309 at four, circumferentially and equidistantly spaced positions.

The retainers 313 are disposed on the support plate 307 at four, circumferentially and equidistantly spaced positions. Also, the retainers 315 are detachably held in engagement with associated through-bores 325, formed in the support plate 307, in opposition to the respective retainers 313.

The respective coil springs 317 are retained between the retainers 313, 315, respectively.

As shown in FIGS. 8A, 8B, further, the cams 311 are operative between the retainers 315 that are available for engagement and disengagement (in association with the respective coil springs 317).

As shown in FIG. 6, the spring plate 319 is disposed in opposition to the rotational plate 309. The spring plate 319 is integrally formed with arm portions 327 and spring portions 329. And, the spring plate 319 is connected to the clutch ring 33 of the dog clutch 13 through the arm portions 327.

Further, each spring portion 329 has a return spring function by which the spring plate 319 and the clutch ring 33 are urged in a direction (rightward) to cause the outer differential case 7 to be disengaged.

As shown in FIG. 7, the operating mechanism 321 is comprised of a co-axial push-pull cable 331, a joint 333, a connecting member 335, retainers 337,339 and a shift spring 341.

The co-axial cable 331 is flexible and comprised of an outer pipe 343, and a wire 345 extending through this pipe 343.

The pipe 343 is secured to a bracket portion 351 formed on the support plate 307 by means of nuts 347, 349. Also, the wire 345 is connected to the connecting member 335 through the joint 333.

Further, the connecting member 335 extends through through-bores 353, 355, formed in the fixing metal fixture 305 and the support plate 307, respectively, and is welded to the rotational plate 309.

The retainer 337 is disposed at a side closer to the nut 347 (closer to the pipe 343). Also, the retainer 339 is disposed at a side closer to the joint 333 (for the wire 345).

The shift spring 341 is disposed between the retainers 337, 339 to urge the rotational plate 309 toward a side to actuate the cams 311.

Furthermore, respective urging forces of the above-described coil springs 317 and the shift spring 341 are selected to be larger than those of the spring portions 329 (of the spring plate 319).

Moreover, the meshing engagement and disengagement of the dog clutch 13 and the 2–4 shift mechanism are simultaneously operated by the operating mechanism 321 through the drive mechanism controlled by the controller such that, during a shift from the two-wheel drive condition to the four-wheel drive condition, the dog clutch is coupled and, during the shift from the four-wheel drive condition to the two-wheel drive condition, the dog clutch is uncoupled.

Further, such a simultaneous operation for the operating mechanism 321 and the 2–4 shift mechanism may be so structured as to be manually performed in an interlocked relationship.

When pulling the wire 345 of the operating mechanism 321 and moving (rotating) the joint 333 and the rotational plate 309 rightward in FIG. 7 against the force of the shift spring 341, the actuations of the cams 311 are interrupted as shown in FIG. 8A.

Under such a condition, as shown in FIG. 6, the clutch ring 33 is moved rightward by the force of the spring portion 329 of the spring plate 319, thereby rendering the dog clutch 13 to be disengaged.

Upon disengagement of the dog clutch 13, the vehicle assumes the two-wheel drive condition and rotation of the front-wheel-drive power train is interrupted, resulting in reduced vibrations to improve a comfortable riding property. In addition, the engine load is decreased in the extent equivalent to the reduction in the rotational resistance, resulting in am improvement in fuel consumption.

Under such a condition, if the wire 345 is pushed out to cause the joint 333 and the rotational plate 309 to move (rotate) leftward in FIG. 7, as shown in FIG. 8B, the cam 311 slips over the retainer 315 to be actuated while compressing the coil spring 317. Then, the cam 311 operates to move the rotational plate 309 and the clutch ring 33 leftward against the urging force of the spring portion 329, thereby causing the dog clutch 13 to be brought into meshing engagement.

When this takes place, the respective coil springs 317 assume the waiting position and cause the dog clutch 13 to be brought into meshing engagement when the meshing teeth 31, 35 are matched in phase.

Upon meshing engagement of the dog clutch 13, if the clutch ring 33 rotates, the rotational torque occurs. The cam mechanism of the presently filed embodiment is comprised of, in addition to the cams 311 (that is, a first cam mechanism adapted to create a first thrust force to cause the dog clutch 13 to move about the rotational axis between a clutch engaging position and a clutch disengaging position due to rotation of the rotational plate 109), and a second cam mechanism adapted to create a second thrust force to cause the clutch to be retained in meshing engagement bearing the rotational torque created by the dog clutch 13 remaining in meshing engagement. The second thrust force created by this cam mechanism is effective, in addition to the urging force of the shift spring 341, to ensure the clutch to be retained in its meshing engagement.

Upon meshing engagement of the dog clutch 13, the vehicle assumes the four-wheel drive condition and has an improvement in a rough-road covering capability, a rough-road escaping capability and a driving stability.

Further, under the condition in which the dog clutch 13 remains in the meshing engagement, if the operation of the wire 345 is interrupted or even in a failure of the wire 345 to apply the operating force, the meshing engagement of the dog clutch 13 is maintained by the urging force of the shift spring 341, rendering the vehicle to remain in the four-wheel drive condition.

In such a way, the actuator 301 and the front differential 303 are structured.

As set forth above, the actuator 301 and the front differential 303, with the structure in that the operating force of the operating mechanism 321 (the wire 345) is converted to the operating force of the dog clutch 13 by the cams 311, make it possible to allow the high cost pump, the actuator utilizing fluid pressure (for the piston and the cylinder) and the associated converting mechanism to be dispensed with. As a consequence, the structure becomes simple in that extent and can be realized at a low cost.

Further, the actuator 301 and the front differential 303, even if a failure occurs in the operating mechanism 321 (the wire 345) under the meshing engagement condition (during the four-wheel drive condition) of the dog clutch 13, the vehicle is able to remain in the four-wheel drive condition owing to the shift spring 341 in a manner described above, resulting in a preferable failure mode.

Furthermore, after meshing engagement of the dog clutch 13, the shift spring 341 is operative to maintain the vehicle in the four-wheel drive condition, and it becomes possible for interrupting the operation of the dog clutch 13 using the wire 345. Accordingly, the load of the power source for operating the wire 345 is minimized in that extent, resulting in an improvement in fuel consumption.

Moreover, with such a structure that enables the actuator 301, for connecting and disconnecting the drive power, and the 2–4 shift mechanism to be simultaneously changed over, since the actuator 301 and the 2–4 shift mechanism can be operated by a common operating system, the operating system can be formed in a simple structure, resulting in reduction in costs.

In addition, the actuator 301 and the front differential 303 have the same advantages as those of the actuator 1 and the front differential 3 except for the advantages of the actuator 1 and the front differential 3 provided through the use of the drive power source, composed of the electric motor, and the transmitting mechanism composed of the worm gear mechanism.

Also, the actuator 301 may be altered such that, in contrast to the above-described structure, the shift spring 341 of the operating mechanism 321 may be located and used as the return spring so as to urge the rotational plate 309 in a direction to cause the cams 311 to be disengaged.

[Fifth Embodiment]

An actuator 401 of a fifth embodiment is described with reference to FIGS. 9A, 9B.

The actuator 401 is used in place of the actuator 1 associated with the front differential 3 of the first embodiment. Hereinafter, the same component parts as those of the actuator 1 and the front differential 3 bear the same reference numerals and are referred to herein for description of the parts on different points.

The actuator 401 is comprised of a support plate 403 (a stationary member), a cam plate 405 (a rotational member: a movable member), cams 407 (a converting mechanism), a shift spring 409 (an urging member), the electric motor 25 (the drive power source), a gear set 411 (a power transmitting mechanism) and the controller (not shown).

Figure 9A:
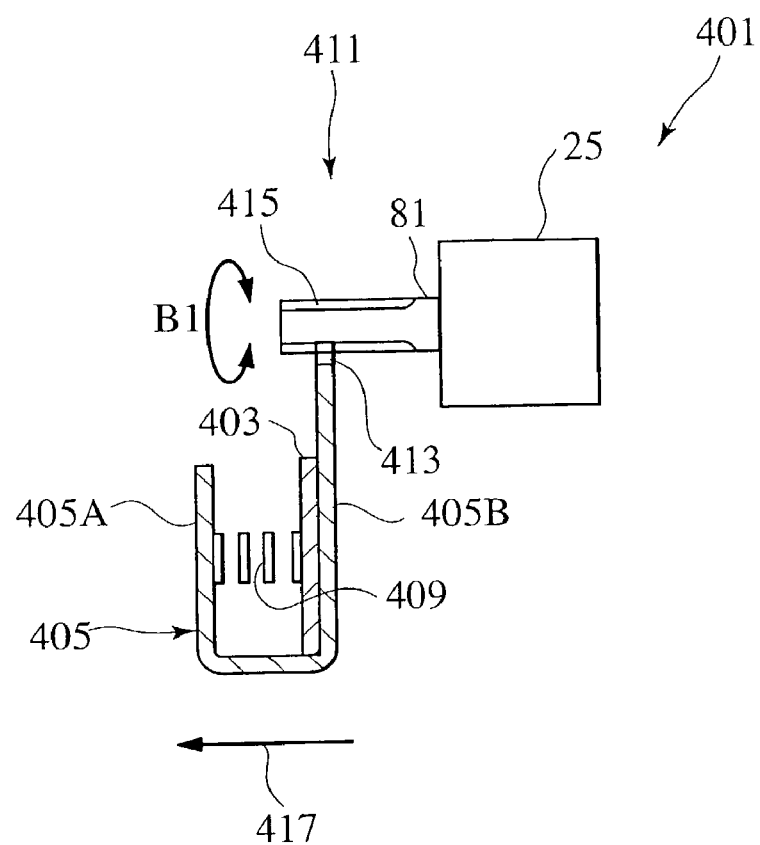
FIG. 9A is a cross sectional view of an actuator of a fifth embodiment that assumes a four-wheel drive condition.

As shown in FIGS. 9A, 89B, the cam plate 405 includes an operating portion 405A for operating the dog clutch 13, and a guide portion 405B that guide movements of the cams 407 within the operating portion 405A. And, the above-described component parts forming the actuator 301 are arranged in a direction along the rotational axis of the cam plate 405 such that, in an order closer to the dog clutch 13, the operating portion 405A of the cam plate 405, the guide portion 405B of the cam plate 405, a support plate 403, the cams 407 and the guide portion 405B of the cam plate 405 are disposed.

The support plate 403 is fixedly secured to the differential carrier 5 by means of bolts 69.

The cam plate 405 is disposed on the support plate 403 for sliding and rotating capabilities with respect thereto in an opposed relationship with the clutch ring 33 of the dog clutch 3.

The cams 407 are formed between the support plate 403 and the cam plate 405 at a plurality of circumferentially and equidistantly spaced positions by metal works, respectively.

The shift spring 409 is disposed between the support plate 403 and the cam plate 405 and urges the clutch ring 33 via the cam plate 405 in a direction to cause the dog clutch 13 to be brought into meshing engagement.

The gear set 411 is comprised of a large diameter spur gear 413 and a small diameter spur gear 415 that mutually mesh with one another. The large diameter spur gear 413 is formed on the cam plate 405 at an outer circumferential periphery thereof. The small diameter spur gear 415 is formed on the output shaft 81 of the electric motor 25.

As shown by an arrow B1 in FIG. 9A, the gear set 411 is operative to amplify the rotational torque of the electric motor 25, thereby rotating the cam plate 405.

The controller performs the time controls for rotating the electric motor 25 in both directions for respective given time intervals. This causes the controller to rotate the cam plate 405 in the given direction at a given rotational angle.

FIG. 9A shows a situation in which the cam plate 405 and the clutch ring 33 are shifted leftward as shown by an arrow B2 by the urging force of the shift spring 409 and the dog clutch 13 is brought into meshing engagement to cause the vehicle to remain in the four-wheel drive condition.

When this takes place, the shift spring 409 remains as the waiting mechanism, and the dog clutch 13 is brought into meshing engagement when the meshing teeth 31, 35 are matched in phase.

After the dog clutch 13 has been brought into meshing engagement, if the clutch ring 33 rotates, the rotational torque is created. The converting mechanism of the presently filed embodiment is comprised of, in addition to the cams 407 (that is, a first cam mechanism adapted to create a first thrust force to cause the dog clutch 13 to move along the rotational axis between a clutch coupling position and a clutch uncoupling position due to rotation of the rotational plate 405), and a second cam mechanism adapted to create a second thrust force to cause the clutch to be retained in meshing engagement bearing the rotational torque created by the dog clutch 13 remaining in meshing engagement. The second thrust force created by this second cam mechanism is effective, in addition to the urging force of the shift spring 405, to ensure the clutch to be retained in its meshing engagement.

Figure 9B:
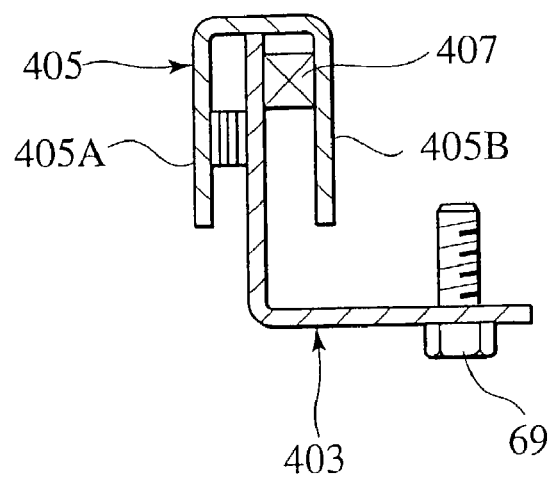
FIG. 9B is a cross sectional view of the actuator of the fifth embodiment that assumes a two-wheel drive condition.

Under such a condition, if the electric motor 25 is rotated in one direction for the given time interval, rotation of the cam plate 405 allows the cams 407 to be actuated as shown in FIG. 9B. Then, the resulting cam thrust force causes the cam plate 405 to move rightward as shown by an arrow B3, while compressing the shift spring 409, and the dog clutch 13 is uncoupled. This results in the two-wheel drive condition of the vehicle.

In such a way, the actuator 401 is structured.

As set forth above, the actuator 401 with such a structure in that the rotation of the electric motor 25 is converted to the operating force of the dog clutch 13 by the cams 407, makes it possible to allow the high cost pump, the actuator utilizing fluid pressure (for the piston and the cylinder) and the associated converting mechanism to be dispensed with. As a consequence, the structure becomes simple in that extent and can be realized at a low cost.

Further, under a condition in which the dog clutch 13 remains in meshing engagement (under the four-wheel drive condition), even if the electric motor 25 is stopped or even if a failure occurs in the operating system involving the electric motor 25, the vehicle is able to remain in the four-wheel drive condition owing to the shift spring 409, resulting in a preferable failure mode.

Furthermore, upon meshing engagement of the dog clutch 13, since the shift spring 409 is operative to maintain the vehicle in the four-wheel drive condition, stoppage of the electric motor 25 enables the load of the battery to be reduced in that extent, resulting in an improvement in fuel consumption.

In addition, the actuator 401 has the same advantages as those of the actuator 1 except for those obtained through the use of the transmitting mechanism composed of the worm gear mechanism 27.

[Sixth Embodiment]

Figure 10:
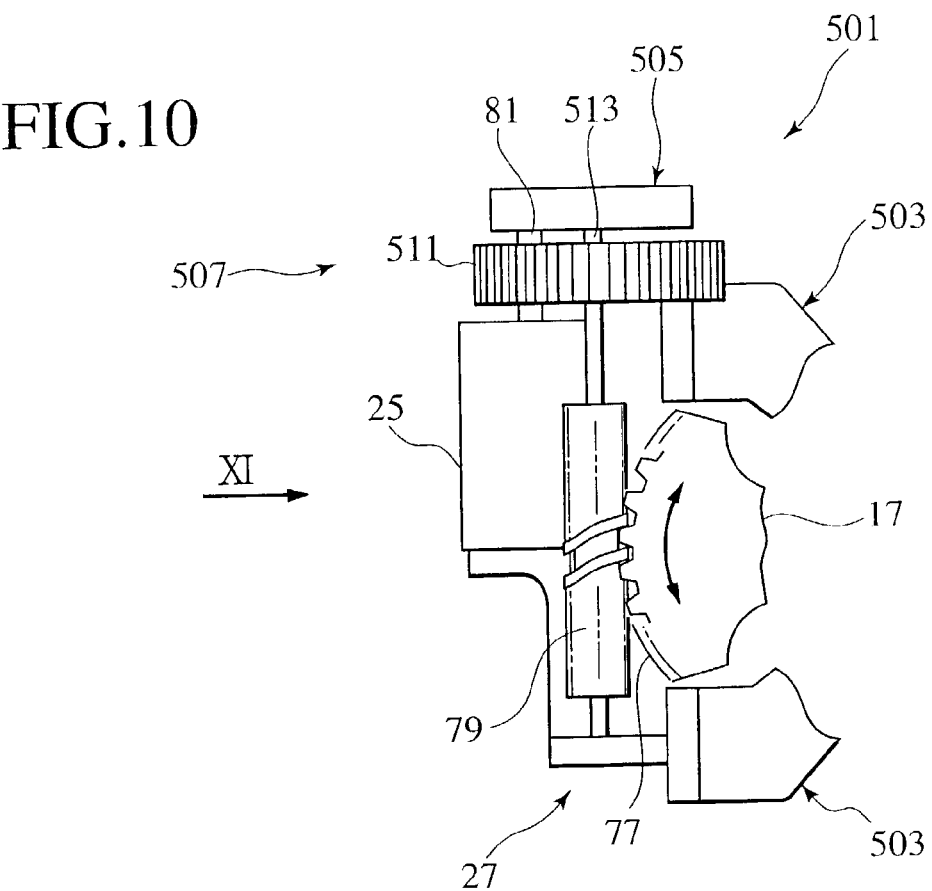
FIG. 10 is a front view illustrating an actuator of a sixth embodiment.
Figure 11:
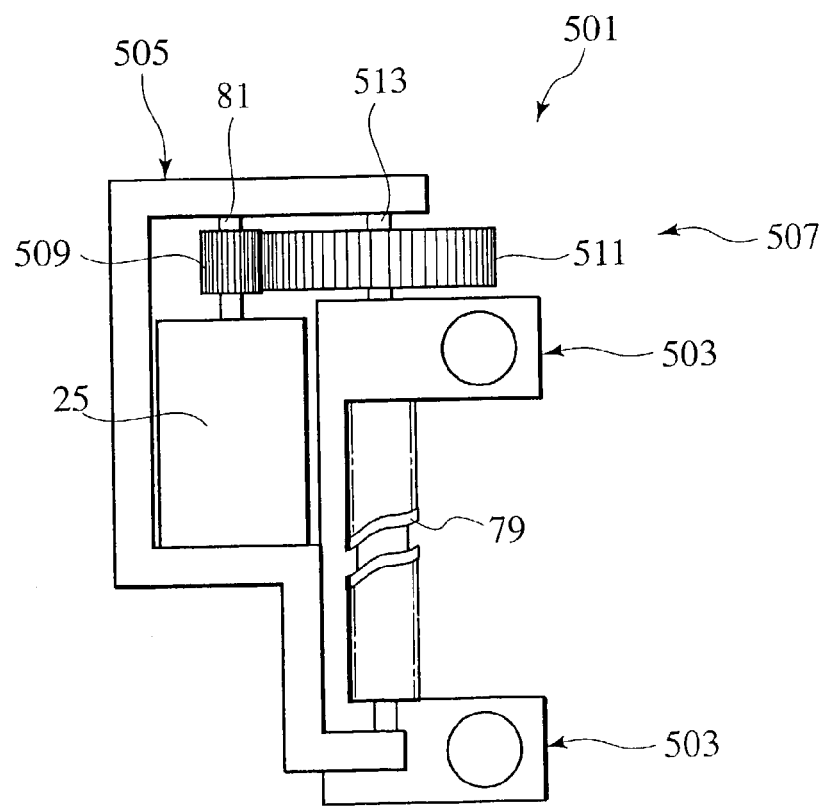
FIG. 11 is a view of the actuator when viewed in an arrow XIII of FIG. 10.

An actuator 501 of a sixth embodiment is described with reference to FIGS. 10, 11.

The actuator 501 is used in place of the actuator 1 associated with the front differential 3 of the first embodiment. Hereinafter, the same component parts as those of the actuator 1 and the front differential 3 bear the same reference numerals and are referred to herein for description of the parts on different points.

The actuator 501 is comprised of a support plate 503 (a stationary member), a support member 505, the cam plate 17 (the rotational member), the thrust plate 19 (a movable member: not shown), the cams 21 (the converting mechanism: not shown), the shift spring 23 (the urging member: not shown), the electric motor 25 (the drive power source), a gear set 507 of a spur gear type (a power transmitting mechanism: a gear reduction mechanism) and the controller (not shown).

The support plate 503 is fixedly secured to the differential carrier 5 by means of bolts. The cam plate 17 is supported on the support plate 503 for sliding and rotating capabilities. Also, the thrust plate 19 is supported on the support plate 503 for axial movements.

The support member 505 is fixedly secured to the support plate 503. Also, the electric motor 25 is supported on the support plate 503 through the support member 505.

The gear set 507 is comprised of a small diameter spur gear 509 and a large diameter spur gear 511 (a final stage gear) that mutually mesh with one another. The small diameter spur gear 509 is connected to the output shaft 81 of the electric motor 25. The large diameter spur gear 511 is connected to the worm 79 of the worm gear mechanism 27 through a connecting shaft 513. And, the connecting shaft 513 has both ends supported by the support member 505.

Further, the output shaft 81 and the connecting shaft 513 are placed in parallel with respect to one another. The electric motor 25 is located at a position closer to the worm gear mechanism 27 as viewed from the gear set 507.

The rotational torque of the electric motor 25 is amplified and transmitted to the worm 79 whereupon the rotational torque is further amplified by the worm gear mechanism 27 with a rotational direction being converted, thereby rotating the cam plate 17. And, as set forth above, the dog clutch 13 is actuated in meshing engagement or disengagement.

With the actuator 501 thus arranged, the gear 507 is located between the electric motor 25 and the worm gear 27 and, thus, the electric motor 25 can be placed at the side closer to the worm gear mechanism 27. Such a location compels an arrangement between the electric motor 25 and the power transmitting mechanism (the gear set 507 and the worm gear mechanism 27) to be compact.

Accordingly, by supporting such an assembly not on the differential carrier 5 but on the support plate 503, the actuator 501 (involving the support plate 503, the support member 505, the cam plate 17, the thrust plate 19 and the electric motor 25) can be formed in a compact unit and, hence, the actuator 501 is enabled to be disposed inside the differential carrier. Consequently, a remarkable improvement results in ease of assembly and an on-vehicle installation capability.

Further, the presence of the worm gear mechanism 27 newly added with the gear set 507 to form the gear reduction mechanism 2 allows the electric motor 25 and the front differential 3 to be further miniaturized owing to the resulting amplified torque function, resulting in an improvement in the on-vehicle installation capability. Furthermore, loads of the battery and an alternator for charging the battery are decreased, with a resultant improvement in fuel consumption of the engine for driving the alternator.

Also, the number of the gears forming the gear set 507 may be selected to be more than two pieces.

Further, the gear set 507 is not limited to the spur gear type but may include a helical gear and a screw gear and, further, the shafts of respective gears may not be comprised of parallel shafts but may be comprised of crossing shafts.

[Seventh Embodiment]

An actuator of a seventh embodiment is described with reference to FIG. 12.

Figure 12:
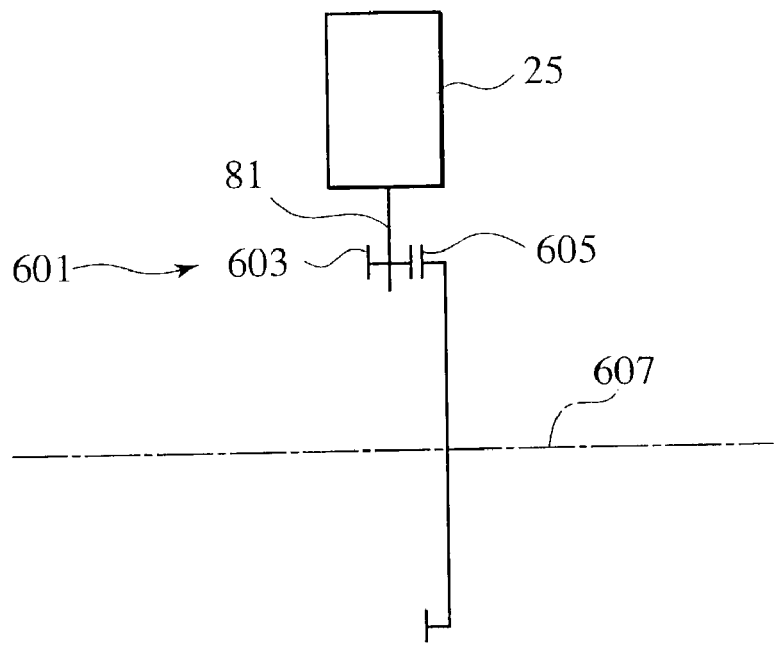
FIG. 12 is a view illustrating a drive source and a power transmitting mechanism forming a part of an actuator of a seventh embodiment.

FIG. 12 shows the electric motor 25 and an associated power transmitting mechanism 601 forming a part of the actuator of the seventh embodiment. Hereinafter, the same component parts as those of the actuator 1 and the front differential 3 bear the same reference numerals and are referred to herein for description of the parts on different points.

The power transmitting mechanism 601 (a gear reduction mechanism) includes a face gear set that is comprised of a small diameter gear 603 and a large diameter gear 605.

The gear 603 is fixedly secured to the output shaft 81 of the electric motor 25. The gear 605 is connected to the cam plate 17.

The electric motor 25 (at the output shaft 81 thereof) intersects an axis 607 of the gear 605.

The rotational torque of the electric motor 25 is amplified by the transmitting mechanism 601 for thereby rotating the cam plate 17 and, as set forth above, the dog clutch 13 is actuated for meshing engagement or disengagement.

With the actuator of the seventh embodiment thus arranged, the presence of the transmitting mechanism 601 composed of the face gear set allows the electric motor 25 to intersect the axis 607 at a position outside an outward area of the electric motor 25 in a radial direction thereof, with the electric motor 25 being shown in another layout pattern in addition to various layout patterns of the electric motor 25 of the above-described various embodiments.

Thus, the electric motor 25 comes to have an increased freedom in a mounting capability (such as an orientation of a relevant location and a mounting position) and, therefore, an assembling capability and an on-vehicle installation capability of the actuator is improved in that extent.

Further, the electric motor 25 (the output shaft 81 thereof) and the axis 607 of the gear 605 may not be comprised of intersecting shafts but may be comprised of crossing shafts. In this case, the electric motor 25 may have a further improved mounting capability.

[Eighth Embodiment]

An actuator of an eighth embodiment is described with reference to FIG. 13.

Figure 13:
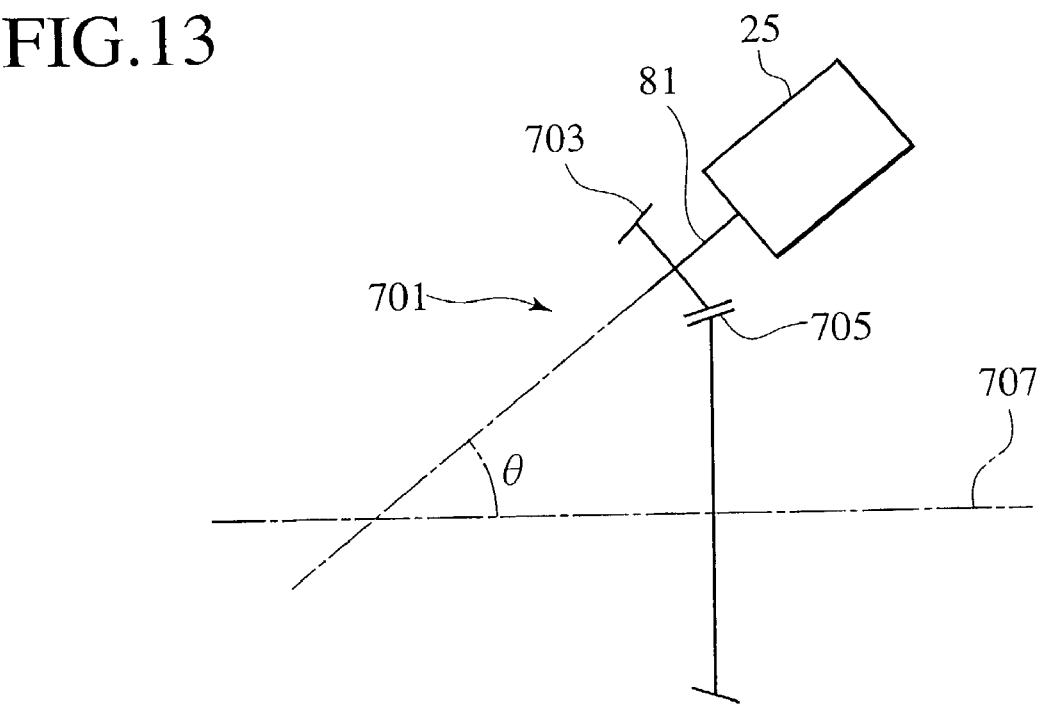
FIG. 13 is a view illustrating a drive source and a power transmitting mechanism forming a part of an actuator of an eighth embodiment.

FIG. 13 shows the electric motor 25 and an associated power transmitting mechanism 701 forming a part of the actuator of the eighth embodiment. Hereinafter, the same component parts as those of the actuator 1 and the front differential 3 bear the same reference numerals and are referred to herein for description of the parts on different points.

The power transmitting mechanism 701 (a gear reduction mechanism) includes a bevel gear set that is comprised of a small diameter bevel gear 703 and a large diameter bevel gear 705.

The bevel gear 703 is fixedly secured to the output shaft 81 of the electric motor 25. Also, the bevel gear 705 is connected to the cam plate 17.

Further, the electric motor 25 (at the output shaft 81 thereof) intersects an axis 707 of the bevel gear 705 at an angle (θ).

With the actuator of the eighth embodiment thus arranged, the presence of the power transmitting mechanism 701 composed of the bevel gear set allows the electric motor 25 to intersect the axis 707 of the bevel gear, with the electric motor 25 being shown in another layout pattern in addition to various layout patterns of the electric motor 25 of the above-described various embodiments.

Thus, the electric motor 25 comes to have an increased freedom in a mounting capability (such as an orientation of a relevant location, and a mounting position). Therefore, an assembling capability and an on-vehicle installation capability of the actuator are improved in that extent.

Also, with the power transmitting mechanism 701 having the bevel gears, the electric motor 25 may be selected in a range such that an angle (θ) at which the electric motor 25 (the output shaft 81) intersects the axis 707 of the gear 705 is expressed by 0<θ<90°. Or, the output shaft 81 and the axis 707 may include crossing shafts.

By so doing, the electric motor 25 may have a further improved mounting capability.

[Ninth Embodiment]

An actuator of a ninth embodiment is described with reference to FIG. 14.

Figure 14:
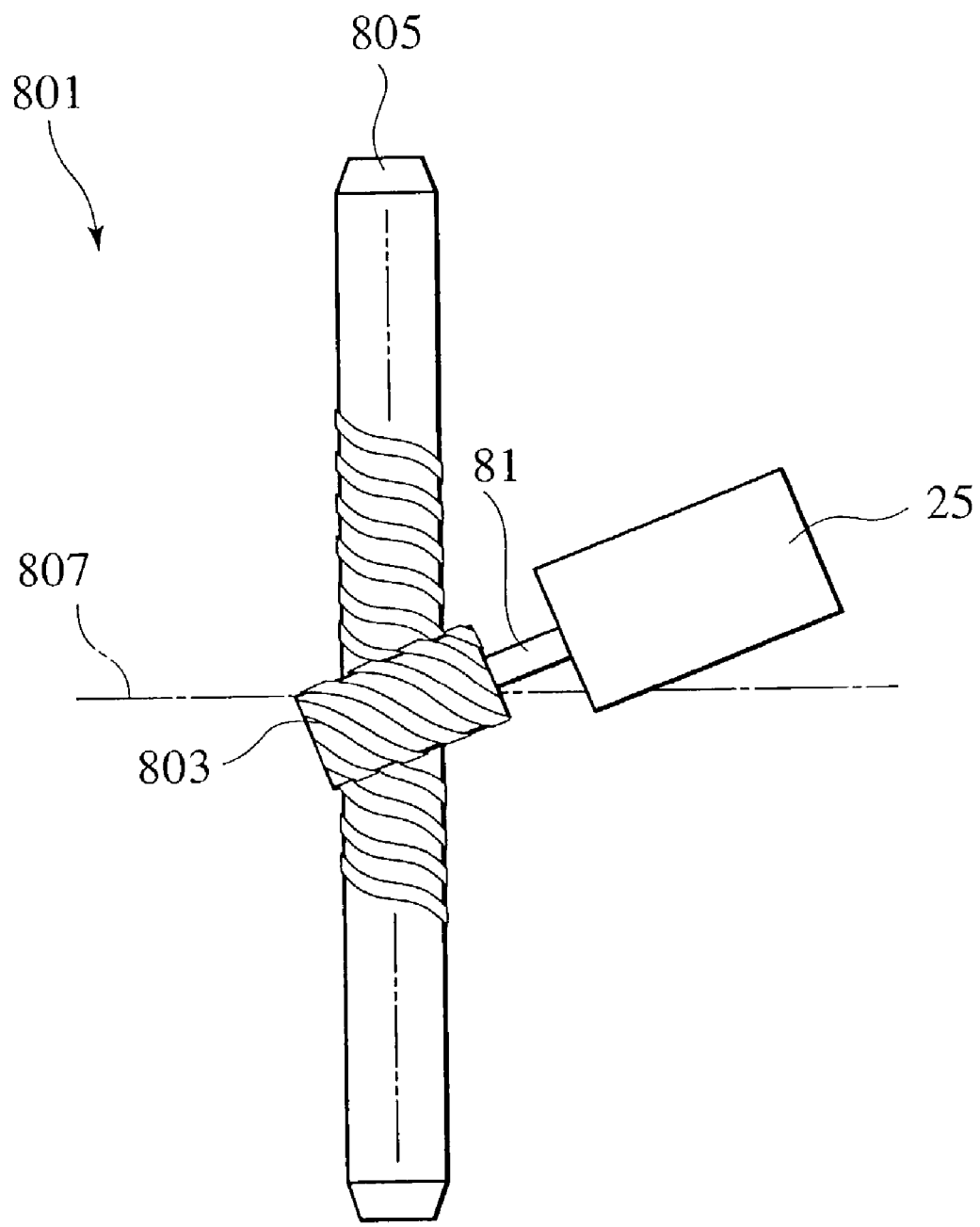
FIG. 14 is a view illustrating a drive source and a power transmitting mechanism forming a part of an actuator of a ninth embodiment.

FIG. 14 shows the electric motor 25 and an associated power transmitting mechanism 801 forming a part of the actuator of the ninth embodiment. Hereinafter, the same component parts as those of the actuator 1 and the front differential 3 bear the same reference numerals and are referred to for description of the parts on different points.

The power transmitting mechanism 801 (a gear reduction mechanism) includes a screw gear set (a threaded gear set) that is comprised of a small diameter screw gear 803 and a large diameter screw gear 805.

The screw gear 803 is fixedly secured to the output shaft 81 of the electric motor 25. Also, the screw gear 805 is connected to the cam plate 17.

The electric motor 25 (at the output shaft 81 thereof) and an axis 807 of the screw gear 805 forms the crossing shafts on respective planes parallel to one another.

The rotational torque of the electric motor 25 is amplified to rotate the cam plate 17, thereby operating the dog clutch 13 in meshing engagement and disengagement.

With the actuator of the ninth embodiment thus arranged, the presence of the power transmitting mechanism 801 composed of the screw gear set allows the electric motor 25 to be arranged in another layout pattern in addition to various layout patterns of the electric motor 25 of the above-described various embodiments.

Thus, the electric motor 25 may have a further increased freedom in a mounting capability (such as an orientation of a relevant location, and a mounting position). Therefore, an assembling capability and an on-vehicle installation capability of the actuator are improved in that extent.

Also, with the power transmitting mechanism 801 having the bevel gears, it becomes possible to select an angle at which the electric motor 25 (the output shaft 81) intersects the axis 807 of the screw gear 805. Or, the output shaft 81 and the axis 807 may include crossing shafts on planes which are not parallel.

By so doing, the electric motor 25 may have a further improved mounting capability.

[Tenth Embodiment]

An actuator 901, having a gear plate, of a tenth embodiment and a rear differential 903 using the same are described with reference to FIG. 15 to FIGS. 24A, 24B.

Figure 15:
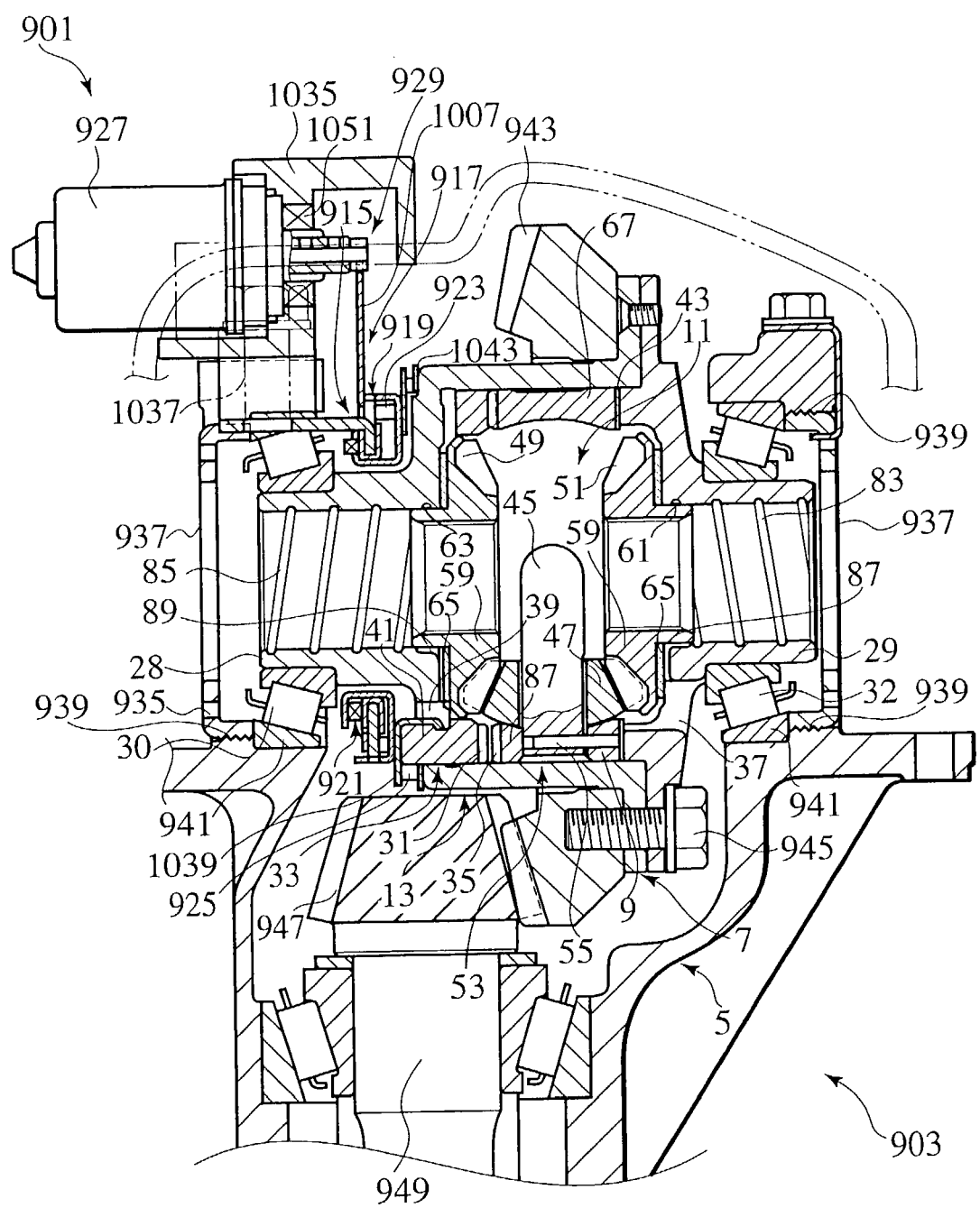
FIG. 15 is a cross sectional view illustrating an actuator of a tenth embodiment and a front differential using such an actuator.

FIG. 15 shows the rear differential 903, whose left and right orientations correspond to left and right orientations of the four-wheel-drive vehicle to which the rear differential 903 is applied.

Further, unlike the previous embodiments 1 to 9 set forth above, while subsequent embodiments features that the differential unit is used as the rear differential, the rear differential has the substantially same mechanism as the front differential. Accordingly, the same component parts as those of the front differential 3 shown in FIG. 2 bear the same reference numerals and are referred to herein for description on different points.

The rear differential 903 is disposed inside the differential carrier 5, that is internally formed with the oil sump.

The rear differential 903 is comprised of an actuator 901, the outer differential case 7, the inner differential case 9, the differential mechanism using the bevel gear 11 and the dog clutch 13 (a driven unit: a clutch).

Further, the actuator 901 is comprised of a support plate 915 (a stationary member), a cam plate 917 (a rotational member), a movable thrust plate 919 (a movable member), a cam 921 (a converting mechanism), a return spring 925, a shift spring 923 (an urging member), an electric motor 927 (a drive power source), a gear mechanism 929 (a transmitting mechanism) and a controller (not shown).

The rear differential 903 takes the form of a double-casing structure comprised of the outer differential case 7 and the inner differential case 9, with the inner differential case 9 being supported at an inner periphery of the outer differential case 7 for sliding and rotating movements. Also, the left and right boss portions 28, 29 formed on the outer differential case 7 are supported by the differential carrier 5 by means of the thrust bearings 30, 32, respectively.

Screwed to the differential carrier 5 via screw portions 939 are bearing caps 937, 937 and rotating the bearing cap 937 by means of the screw portion 939 allows an outer race 941 to be axially moved for thereby achieving preload adjustments of respective thrust bearings 935.

A ring gear 943 is fixedly secured to the outer differential case 7 by means of bolts 945. The ring gear 943 is held in meshing engagement with a drive pinion gear 947, that is integrally formed with the drive pinion shaft 949. The drive pinion shaft 949 is connected through a joint and a propeller shaft of rear wheels to the 2–4 shift mechanism of a transfer, with the drive power of the engine being transferred from the transfer and the 2–4 shift mechanism to the outer differential case 7 through this rear-wheel-drive power transmission system for rotation of the outer differential case 7.

Disposed inside the outer differential case 7 is the clutch ring 33, that is supported at the inner periphery of the outer differential case 7 for an axially moving capability.

The dog clutch 13 is comprised of the meshing teeth 31 and the meshing teeth 35, with a meshing teeth 931 being formed at a left distal end of the clutch ring 33 while the meshing teeth 35 is formed at the right distal end of the inner differential case 9.

Further, the openings 39, 37 are formed at left and right sides of the outer differential case 7 on circumferentially and equidistantly spaced positions thereof. Also, formed at a left distal end of the clutch ring 33 on circumferentially and equidistantly spaced positions thereof are three pieces of leg portions 41, that are brought into meshing engagement with the left openings 39, respectively, so as to protrude outward. Also, the leg portions 41 may be provided in four pieces.

As described below, the clutch ring 33 is operatively moved leftward or rightward by the actuator 901. If the clutch ring 33 is moved rightward, as shown in an upper half area of FIG. 16, the dog clutch 13 is brought into a meshing engagement to allow the outer differential case 7 and the inner differential case 9 to be connected to one another, whereas, if the clutch ring 33 is returned leftward, as shown in a lower half area of FIG. 16, the dog clutch 33 is uncoupled, and the outer differential case 7 and the inner differential case 9 are disconnected from one another.

Disposed between the right distal end of the inner differential case 9 and the outer differential case 7 is the thrust washer 43 that bears an operating force of the actuator 901, and the inner differential case 9 is positioned rightward along an axial direction by means of the thrust washer 43.

The differential mechanism 11 having the bevel gear is comprised of a plurality of the pinion shafts 45, the pinion gears 47, and the left and right output side gears 49, 51.

The respective pinion shaft 45 have distal ends that engage a plurality of the through-bores 53 formed in the inner differential case 9 at circumferentially equidistantly spaced positions thereof and are prevented from coming off from the through-bores 53 by means of the spring pins 55.

The pinion gears 47 are rotationally mounted on the respective pinion shafts 45 and the side gears 49, 51 are held at left and right sides thereof in meshing engagement with the respective pinion gears 47.

The side gears 49, 51 have the respective boss portions 59, 57 that are accommodated in respective journal portions 61, 63 formed in the outer differential case 7, and disposed in the respective boss portions 57, 59 through splined connections are left and right rear wheel shafts.

Further, the thrust washers 65 are disposed between the side gears 49, 51 and the outer differential case 7, respectively, and these thrust washers 65 bear the meshing-engagement thrust forces of the side gears 49, 51.

Formed in the inner differential case 9 at the inner circumferential periphery thereof in opposition to rear faces of the respective pinion gears 47 are spherical washer portions 67 that bear the centrifugal forces of the pinion gears 47 and the meshing reaction exerted to the pinion gears 47 due to the meshing engagements with the respective side gears 49, 51.

Figure 16A:
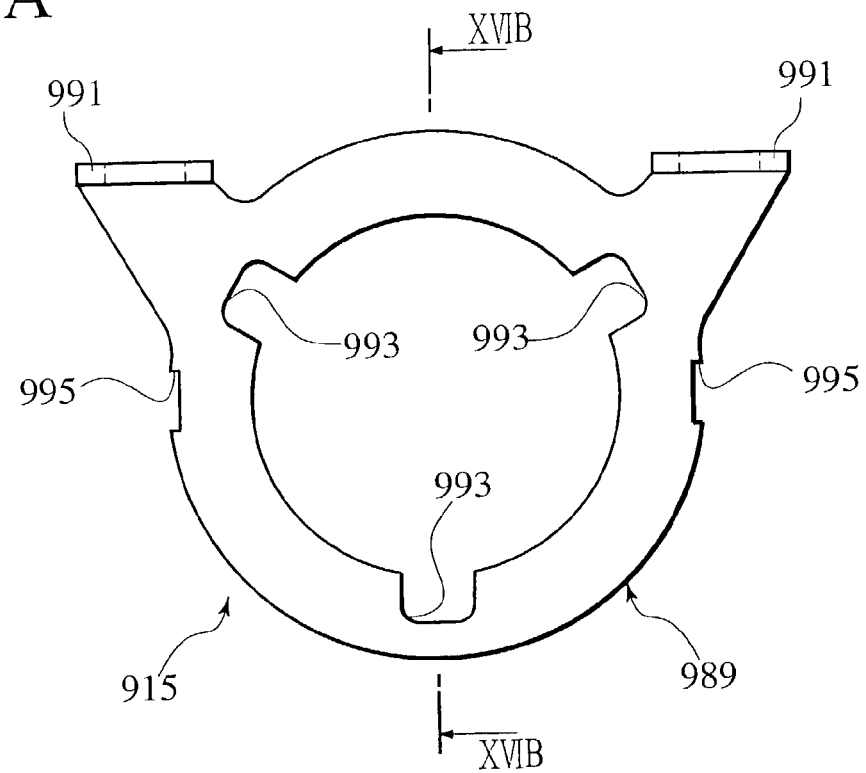
FIG. 16A is a front view of a support plate used in the tenth embodiment.
Figure 16B:
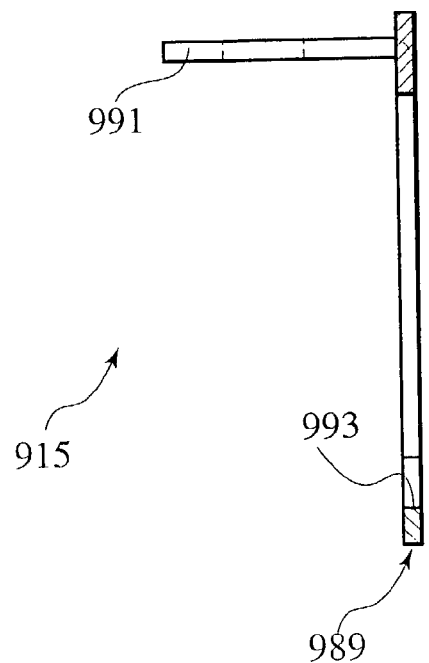
FIG. 16B is a cross sectional view taken on line XVIB—XVIB of FIG. 16A.

The support plate 915 of the actuator 901 is press formed and, as shown in FIG. 16A, includes an annular plate section 989, two stationary plate sections 991 integrally formed with the annular plate section 989, three incorporating concave portions 993 (support-plate-side insertion bores) formed on an inner circumferential periphery of the annular plate section 989 at circumferentially and equidistantly spaced positions thereof, and two guide recess portions 995 formed on an outer circumferential periphery of the annular plate section 989 at circumferentially and equidistantly spaced positions.

Figure 17A:
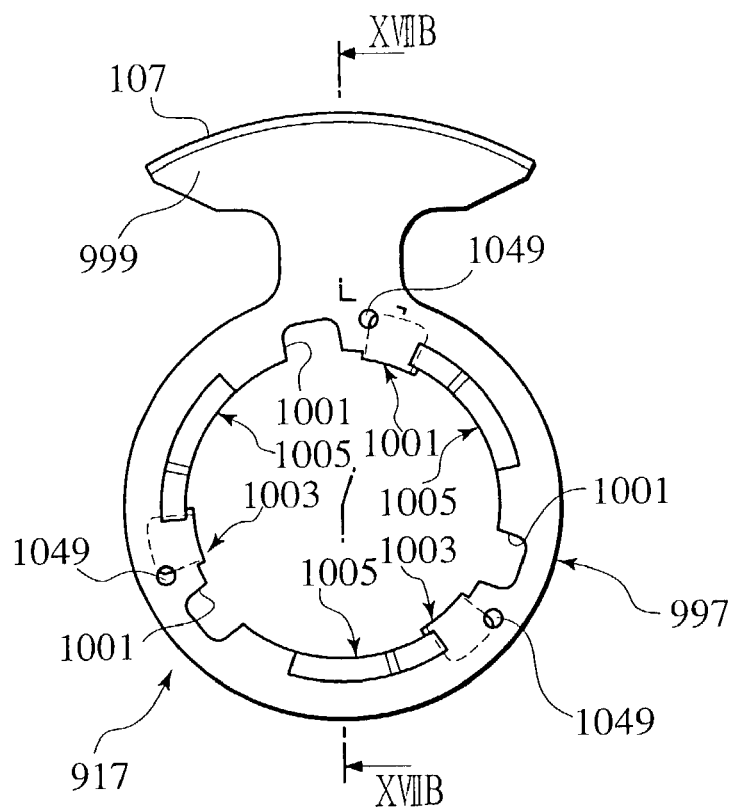
FIG. 17A is a front view of a cam plate used in the tenth embodiment.

The cam plate 917 is press formed and, as shown in FIG. 17A, includes an annular plate section 997, a gear plate 999, three incorporating concave portions 1001 (cam-plate-side insertion bores) formed on an inner circumferential periphery of the annular plate section 997 at circumferentially and equidistantly spaced positions thereof, three supporting protrusions 1003 (cam-plate-side protrusions) disposed in close proximity, in a circumferential direction, to the respective incorporating concave portions 1001, and three cam pieces 1005 formed on the inner circumferential periphery of the annular plate section 997 at circumferentially and equidistantly spaced positions thereof.

The gear plate 999 is integrally formed with the annular plate section 997 and has an outer circumferential periphery formed with a gear 1007. Also, each of the supporting protrusions 1003 is formed of an axial portion 1009 formed on the annular plate section 997, and a radial portion 1011 formed at a distal end of the axial portion 1009.

Figure 17B:
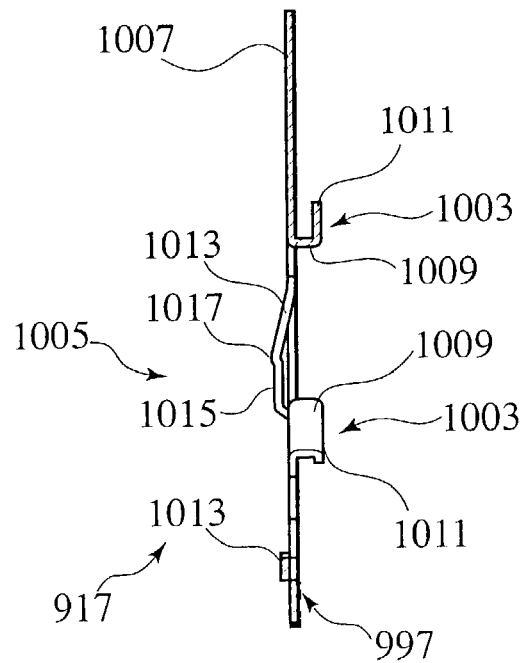
FIG. 17B is a cross sectional view taken on line XVIIB—XVIIB of FIG. 17A.

As shown in FIG. 17B, each cam piece 1003 is formed of a slanted wall 1013, a retainer surface 1015 with no cam angle formed in a radial direction, and a retainer protrusion 1017 formed between the slanted wall 1013 and the retainer surface 1015.

Figure 18A:
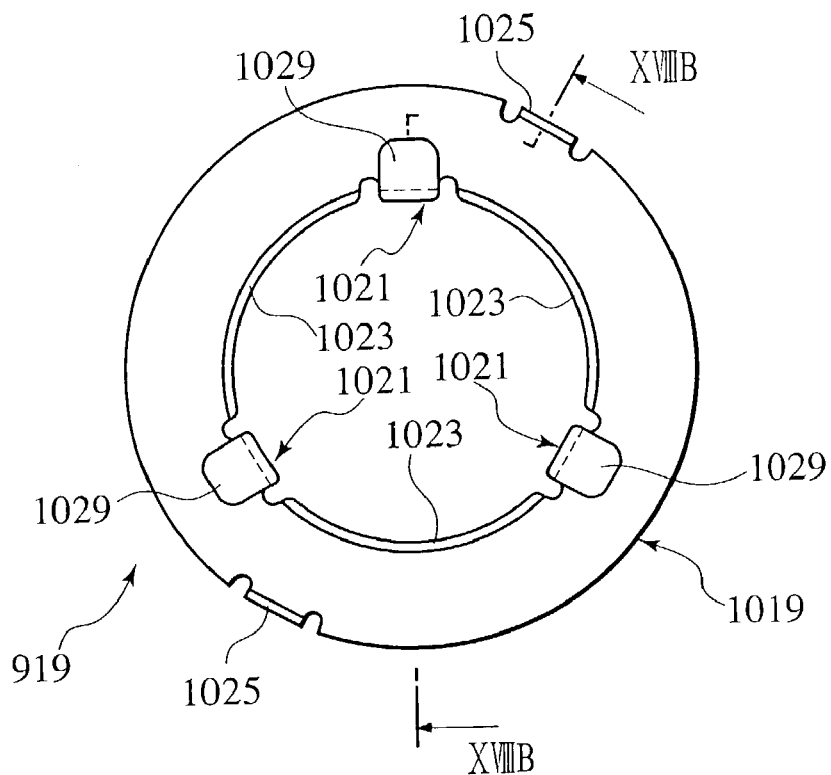
FIG. 18A is a front view of a movable plate used in the tenth embodiment.

The movable plate 919 is press formed and, as shown in FIG. 18A, includes an annular plate section 1019, three cam guide pieces 1021 (movable-plate-sideprotrusions) formed on an inner circumferential periphery of the annular plate section 1019 at circumferentially and equidistantly spaced positions thereof, three inner periphery guide pieces 1023 disposed between the respective guide pieces 1021, and two outer periphery guide pieces 1025 formed on the inner circumferential periphery of the annular plate section 1019 at circumferentially and equidistantly spaced positions thereof.

Figure 18B:
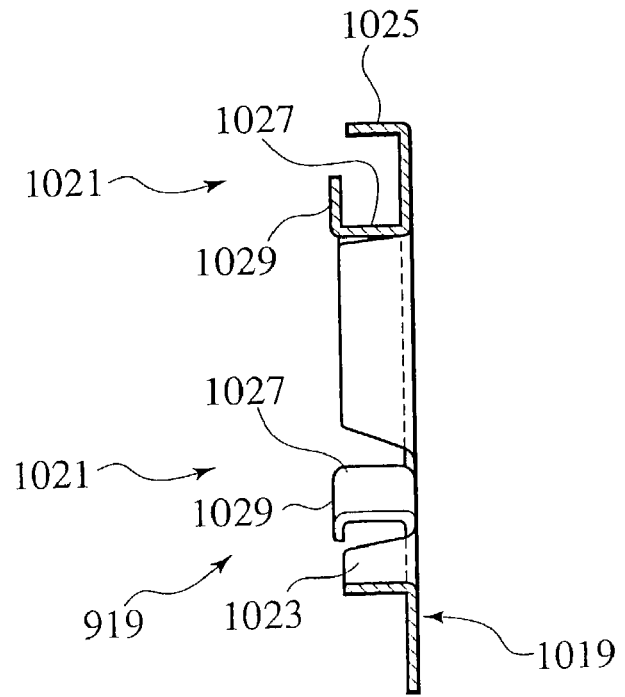
FIG. 18B is a cross sectional view taken on line XVIIIB—XVIIIB of FIG. 18A.

Further, as shown in FIG. 18B, each cam guide piece 1021 is formed of an axial portion 1027 formed on the annular plate section 1019, and a radial portion 1029 formed at a distal end of the axial portion 1027.

Figure 20:
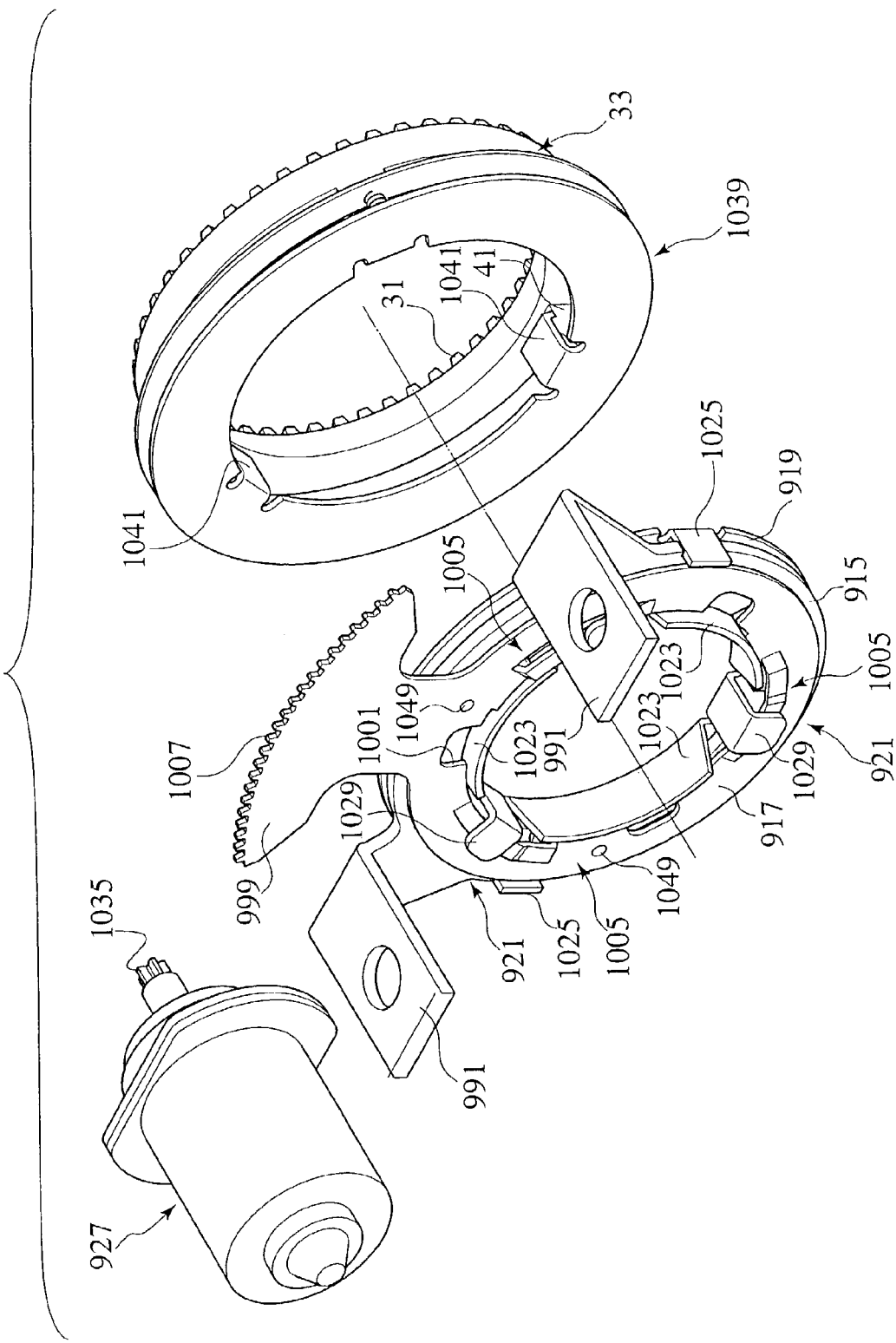
FIG. 20 is a perspective view of the respective members of FIG. 19 remaining in an assembled state.

The support plate 915, the cam plate 917 and the movable plate 919 are assembled in a manner as shown in FIG. 20 in an order as will be described below.

Figure 19:
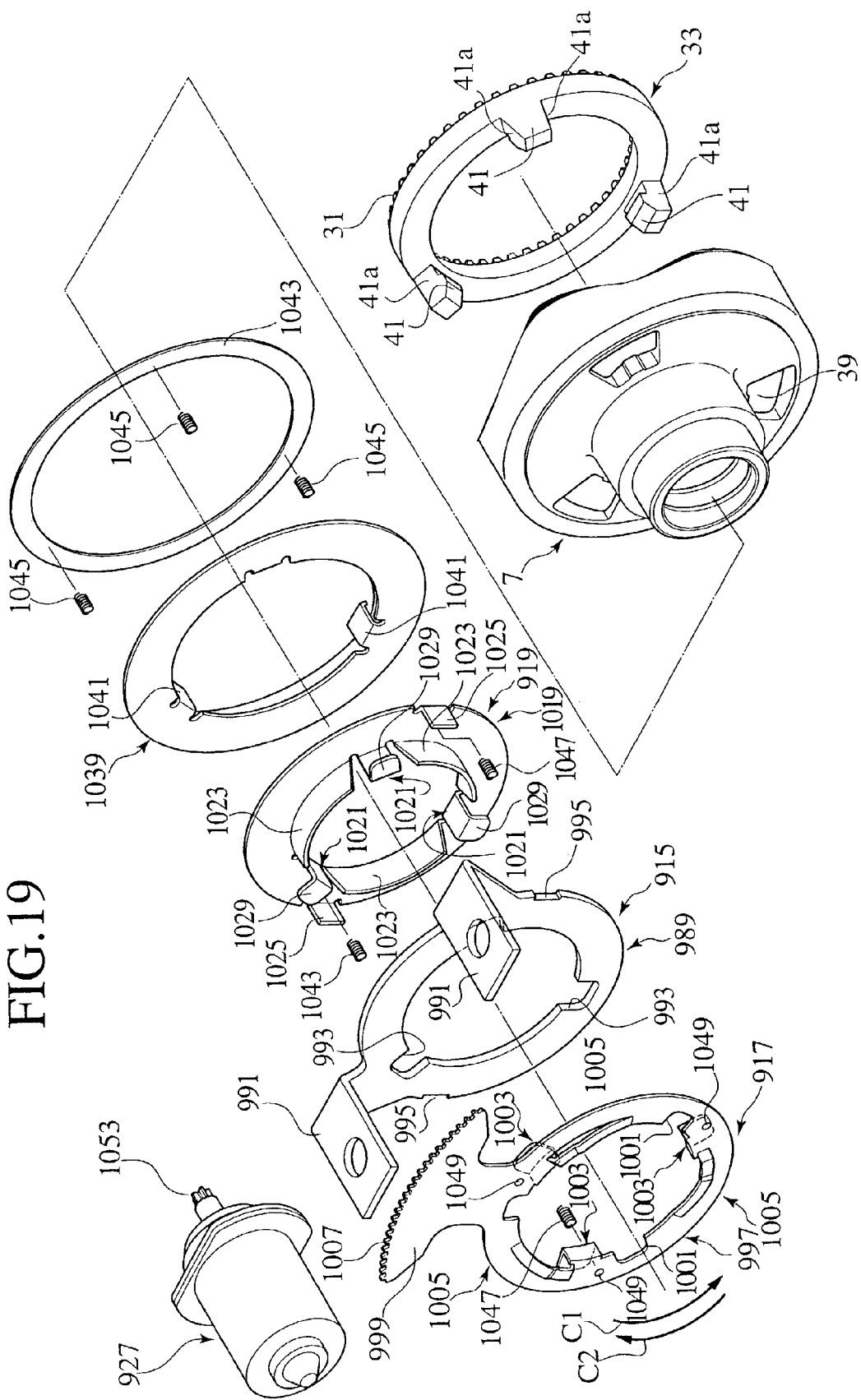
FIG. 19 is an exploded perspective view illustrating the support plate, the cam plate and the movable plate used in the tenth embodiment.

First, after inserting the supporting protrusions 1003 of the cam plate 917 to the incorporating concave portions 993 of the support plate 915 from a right side, respectively, rotating the cam plate 917 in a direction as shown by an arrow C1 in FIG. 19, until the respective incorporating concave portions 1001 of the cam plate 917 are overlapped with the respective incorporating concave portions 993 of the support plate 915, accompanies engagement between the cam plate 917 and the annular plate section 989 of the support plate 915 by means of the radial portion 1011 of the respective supporting protrusions 1003.

Subsequently, after inserting the respective cam guide pieces 1021 of the movable plate 919 to the respective incorporating concave portions 993, 1001 of the support plate 915 and the cam plate 917 from a left side, rotating the cam plate 917 in a direction as shown by an arrow C2 in FIG. 19 accompanies engagement between the movable plate 919 and the annular plate section 997 of the cam plate 917 by means of the radial portions 1029 of the respective cam guide pieces 1021.

And, finally as shown in FIGS. 15, 20, the above-described respective plates 915, 917, 919 and the cam plate 921 are located such that, in an order within an area near the dog clutch 13, the annular plate section 1019 (an operating section to operate the dog clutch 13) of the movable plate 919, the support plate 915, the cam plate 917, the cam 921, and the radial portion 1029 (a guide section that guides the movements of the cam 921 within the operating section) of the cam guide piece 1021 of the movable plate 919.

In such a manner, the respective plates 915, 917, 919 can be assembled in a less number of steps in an extremely easy fashion.

Under a condition in which the assembly has been completed, the respective annular plate sections 989, 997 of the support plate 915 and the cam plate 917 have the inner peripheries guided by the inner periphery guide pieces 1023 of the movable plate 919 such that the support plate 915, the cam plate 917 and the movable plate 919 are mutually centered. Also, the cam plate 917 is rotational with respect to the support plate 915 and the movable plate 919.

As shown in FIG. 15, the respective stationary plate sections 991 of the support plate 915, together with a mount fixture 1035 of the electric motor 927, are fixedly secured to the differential carrier 5 by means of bolts 1037.

Figure 22A:
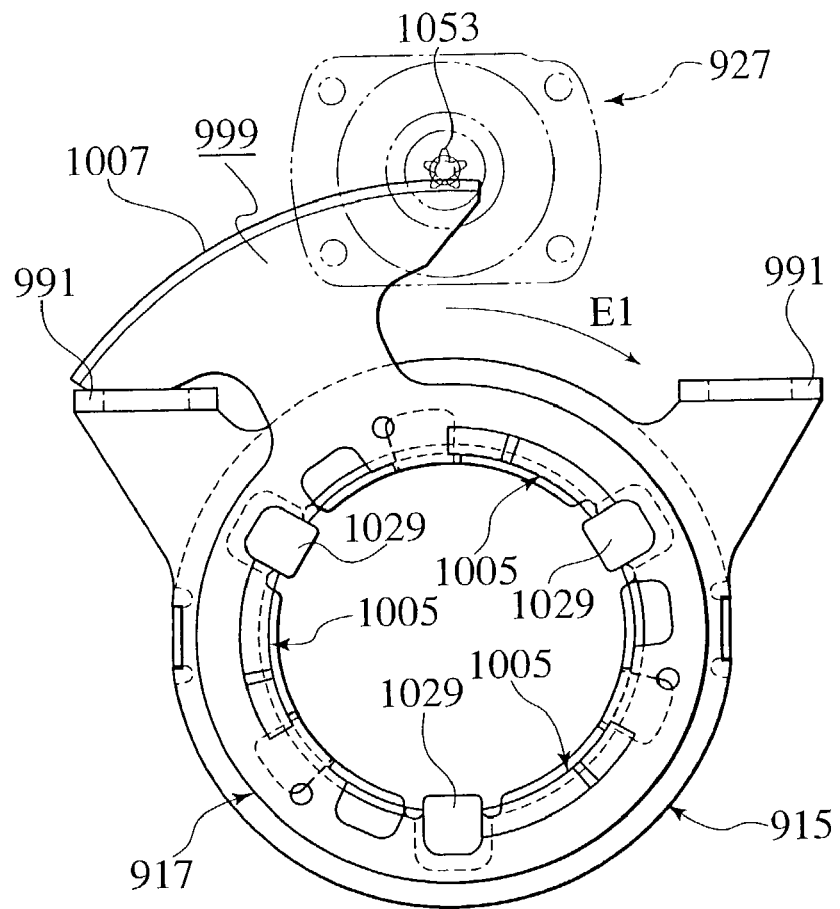
FIG. 22A is a front view illustrating an angle of a cam plate under a four-wheel drive condition of a vehicle.
Figure 22B:
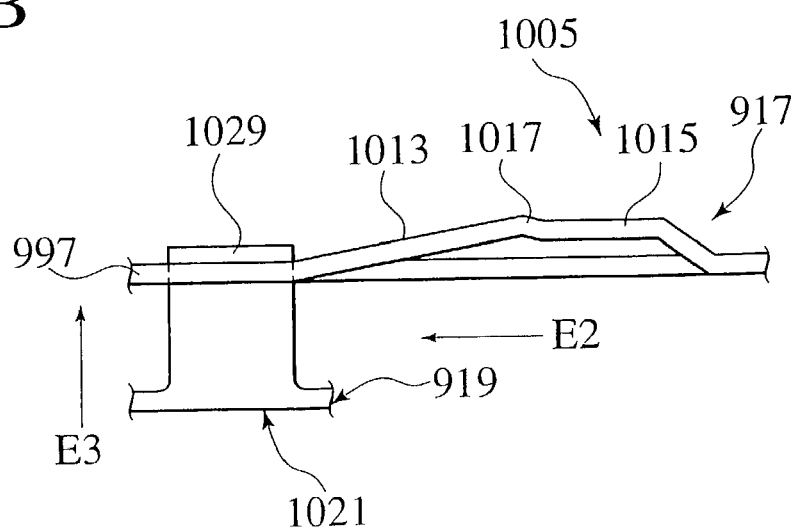
FIG. 22B is a view illustrating the cam plate having a cam formed in an angle of FIG. 22A.

As shown in FIG. 22B, the cam 921 is formed of respective cam pieces 1005 of the cam plate 917, and respective cam guide pieces 1021 (the radial portions 1029) of the movable plate 919.

As shown in FIG. 15, the return spring 925 is integrally formed with a retainer 1039 of the clutch ring 33. As shown in FIGS. 15, 20, arm portions 1041 formed on the retainer 1039 are fixedly secured to the respective leg portions 41 of the clutch ring 33 so as to sandwich the outer differential case 7, and a ring 1043 is disposed between the retainer 1039 (the return spring 925) and the right distal end of the outer differential case 7.

The clutch ring 33 and the retainer 1039 are unitarily movable for a reciprocating capability in the axial direction, and the return spring 925 urges the clutch ring 33 in a direction (rightward) to cause the dog clutch 13 to be out of meshing engagement.

As shown in FIG. 15, the shift spring 923 is integrally formed with the movable plate 919. The shift spring 923 has an urging force selected to be larger than that of the return spring 925 and urges the movable plate 919 and the clutch ring 33 in a direction (leftward) to cause the dog clutch 13 to be brought into meshing engagement.

Moreover, as shown in FIG. 19, the return spring 925 and the shift spring 923 may include coil springs 1045 and coil springs 1047, respectively.

Further, spring seats 1049 for the coil springs 1047 are formed on the cam plate 917 at three circumferentially and equidistantly spaced positions thereof.

The electric motor 927 is fixedly secured to the differential carrier 5 by means of the mounting fixture 1035. The electric motor 927 is rotational in both directions and is connected to an on-vehicle battery through the controller.

The gear set 929 is comprised of a pinion gear 1053 fixedly secured to an output shaft 1051 of the electric motor 927 and the gear 1007 of the cam plate (the gear plate 999), thereby amplifying a rotational torque of the electric motor 927 to rotate the cam plate 917.

The controller operates to perform meshing engagement or disengagement of the dog clutch 13 in a manner as will be described below such that, when shifting the vehicle from the two-wheel drive condition to the four-wheel drive condition, the dog clutch 13 and the 2–4 shift mechanism are simultaneously operated in an interlocked fashion, respectively, whereas when shifting the vehicle from the four-wheel drive condition to the two-wheel drive condition, the dog clutch 13 and the 2–4 shift mechanism are simultaneously operated to effectuate meshing disengagement in the interlocked fashion.

Further, when operating the dog clutch 13 for meshing engagement or disengagement, the controller performs time controls such that the electric motor 927 is rotated in both directions (in one direction and the other direction) for respective time intervals (at respective rotational angles). As the electric motor 927 rotates for the given time interval, the cam plate 917 is operatively rotated at a given angle of rotation in a given direction by means of the gear set 929.

FIG. 22A shows a situation wherein the gear plate 999 is rotated at the maximum angle of rotation in one direction, with the pinion gear 1053 of the gear set 929 being held in meshing engagement with one side edge of the gear 1007. When this occurs, one of the stationary plate sections 991 of the support plate 915 serves as a stopper to which the gear plate 999 is brought into abutting engagement to preclude excessive rotation of the cam plate 917 for thereby preventing the gear 1007 from disengaging from the pinion gear 1053.

FIG. 22B shows a status of the cam 921 corresponding to that of FIG. 22A, with the radial portion 1029 of each cam guide piece (the movable plate 919) being shown in a position prior to sliding on the slanted wall 1013 of each cam piece 1005 (the cam plate 917). When this takes place, the radial portion 1029 is held in pressured contact with the annular plate section 997 by the urging force of the shift spring 923 and the cam 921 remains in its inoperative position. Also, respective arrows (E1 to E3) in FIGS. 22A, 22B show directions in which the cam plate 917 and the cam guide piece 1021 (the movable plate 919) are shifted when rotating the electric motor 927 in the opposite direction from the respective conditions.

Under a condition where the cam 921 remains inoperative, as shown by the lower half section of FIG. 15, the movable plate 919 (the clutch ring 33) is shifted leftward by the action of the shift spring 923 to cause the dog clutch 13 to be held in meshing engagement.

When this takes place, the shift spring 923 takes the form of a waiting mechanism, and the dog clutch 13 is brought into meshing engagement when the meshing teeth 31, 35 are matched in phase.

Upon meshing engagement of the dog clutch 13, as set forth above, the vehicle is brought into the four-wheel drive condition.

Figure 21:
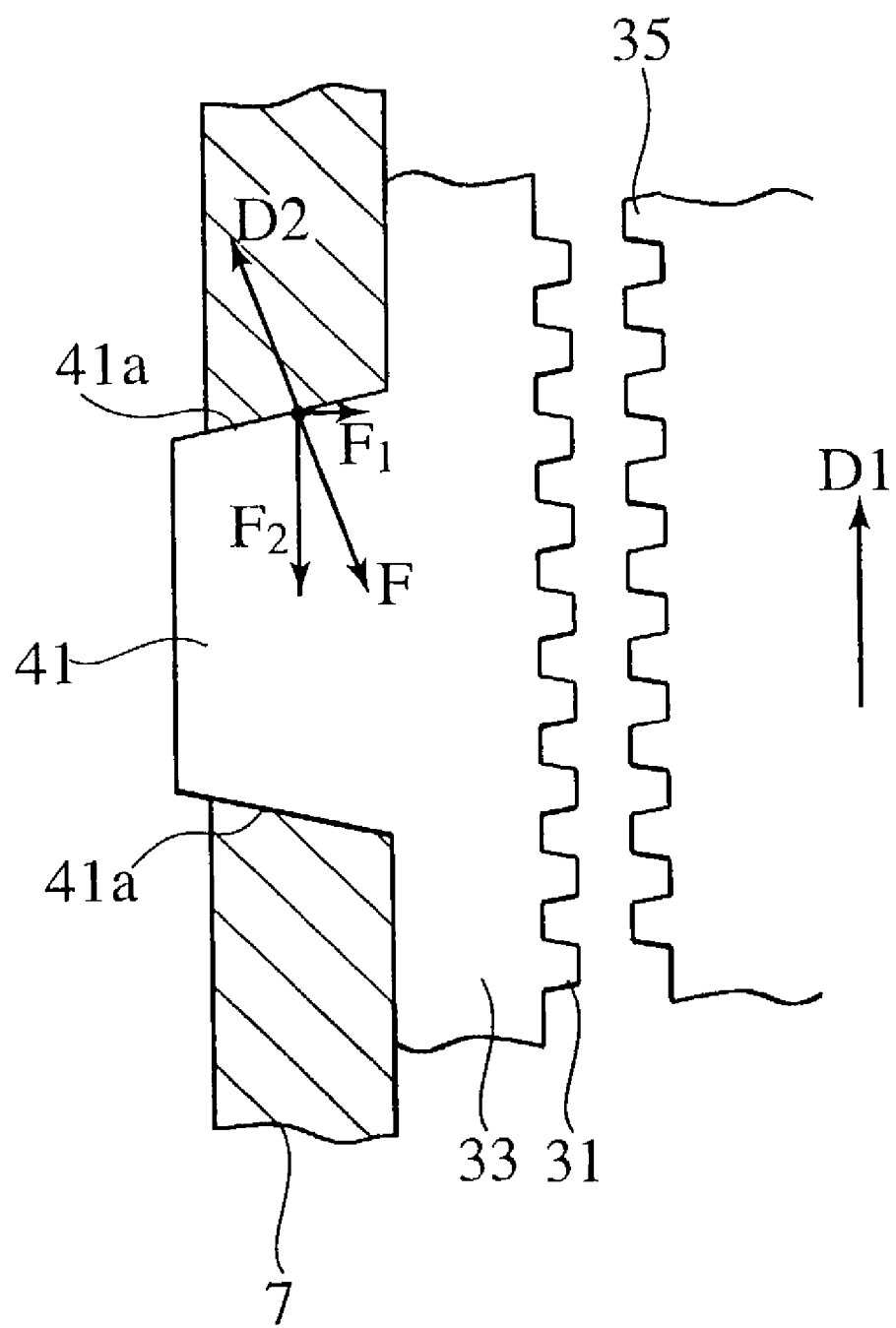
FIG. 21 is a view of a clutch ring and an outer differential case of the tenth embodiment as viewed in an arrow VI in FIG. 19.

FIG. 21 is a view when viewed in an arrow VI in FIG. 19 under the condition (the four-wheel drive condition) with the clutch ring 33 of the presently filed embodiment and the outer differential case 7 being in assembled state.

The ring clutch 33 has three protruding leg portions 41 formed on a distal end opposite to the wall formed with the meshing teeth 31 of the clutch at circumferentially and equidistantly spaced positions. The meshing teeth 31 of the clutch are formed to have tapered inclined shapes, and the leg portions 41 are formed in sector shapes, respectively. Circumferentially facing opposing end faces 41a of each leg portion 41 are tapered in an axially outward direction (leftward) at a given angle of inclination.

On the other hand, sector shaped bores (openings) 39 are formed in a left end wall of the outer differential case 7 at respective positions opposing to the associated leg portions 41 of the clutch ring 33. Thus, the leg portions 41 are brought into meshing engagement with the sector shaped bores 39 in the axial direction and the circumferentially facing end faces 41a of the leg portion 41 is held in contact with a distal edge of the sector shaped bore 39, thereby causing the clutch ring 33 to be unitarily rotated with the outer differential case 7. The distal edge of the sector shaped bore 39 is inclined in parallel to the inclination of the circumferentially facing end face 41a of the leg portion 41.

Accordingly, when the outer differential case 7 drivingly rotates the ring clutch 33 (in a direction as shown by the arrow D1 in FIG. 21), the end edge of the sector shaped bore 39 of the outer differential case 7 bears a force F in a direction as shown by the arrow D2 in FIG. 2 (in a direction perpendicular to the circumferentially facing end wall 41a) due to the inclination of the circumferentially facing end face 41a of the sector shaped leg portion 41 of the ring clutch 33. When this occurs, the circumferentially facing end wall 41a of the sector shaped leg portion 41 of the ring clutch 33 bears a reaction force F in a direction opposite to that of the arrow d2 to bear a component force $F_1$ oriented axially inward (rightward). As a result, the ring clutch 33 is pushed toward the inner differential case 9 (leftward in FIG. 21) to cause the meshing teeth 31, 35 of the dog clutch to be easily brought into meshing engagement for thereby ensuring the clutch to be retained in the meshing engagement.

Thus, the cam mechanism of the presently filed embodiment is comprised of, in addition to the cams 921 (that is, a first cam mechanism adapted to create a first thrust force to cause the dog clutch 13 to move about the rotational axis between a clutch engaging position and a clutch disengaging position due to rotation of the cam plate 917), and a second cam mechanism (comprised of the circumferentially facing end face 41a of the ring clutch 33 and the sector shaped bore 39 of the outer differential case 7) adapted to create a second thrust force to cause the clutch to be retained in meshing engagement bearing the rotational torque created by the dog clutch 13 brought into meshing engagement. The second thrust force created by this second cam mechanism is effective, in addition to the urging force of the shift spring 923, to ensure the clutch to be retained in its meshing engagement.

While the second cam mechanism has been described in conjunction with the various embodiments set forth above, the second cam mechanism is employed in all of the embodiments of the present invention. Accordingly, with a view to omitting redundant description, no statement is made to the second cam mechanism in subsequently described embodiments.

Figure 23A:
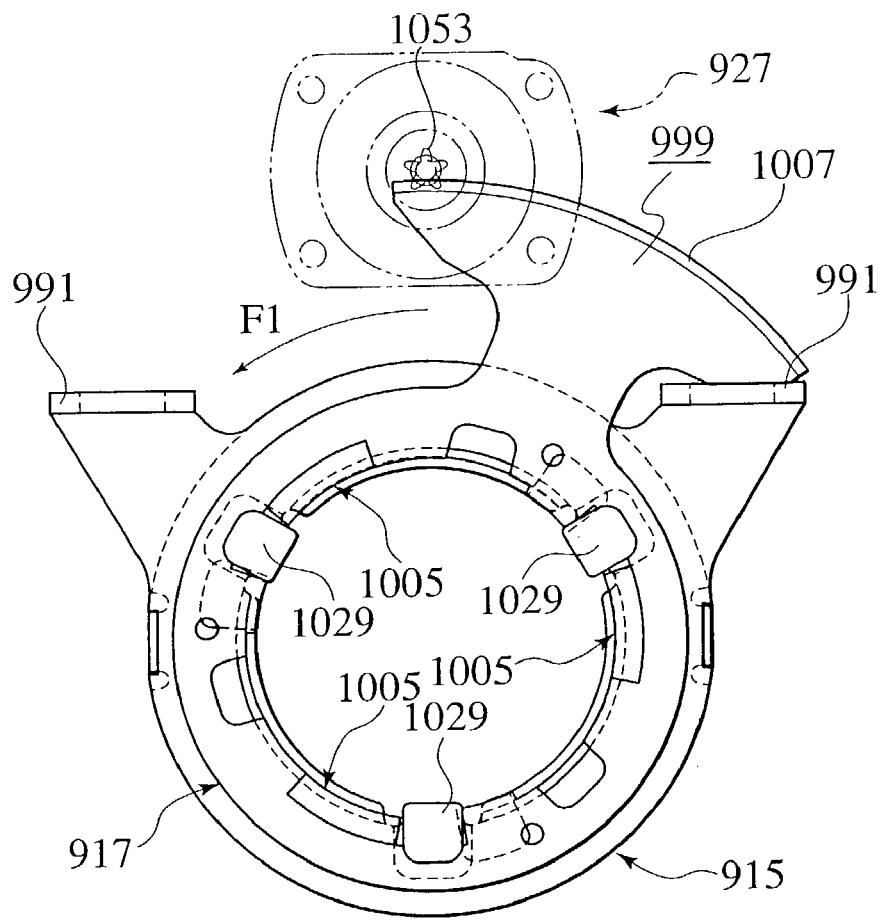
FIG. 23A is a front view illustrating an angle of the cam plate under a two-wheel drive condition of the vehicle.

FIG. 23A shows a situation under which the electric motor 927 is rotated at the maximum angle of rotation in a direction opposite to that of the situation shown in FIG. 22A, with the pinion gear 1053 of the gear set 929 being shown as engaging the other side end of the gear 1007. When this takes place, the other one of the stationary plate sections 991 of the support plate 915 serves as a stopper to which the gear plate 999 is brought into abutting engagement to preclude excessive rotation of the cam plate 917 to avoid the gear 1007 from disengaging the pinion gear 1053.

Figure 23B:
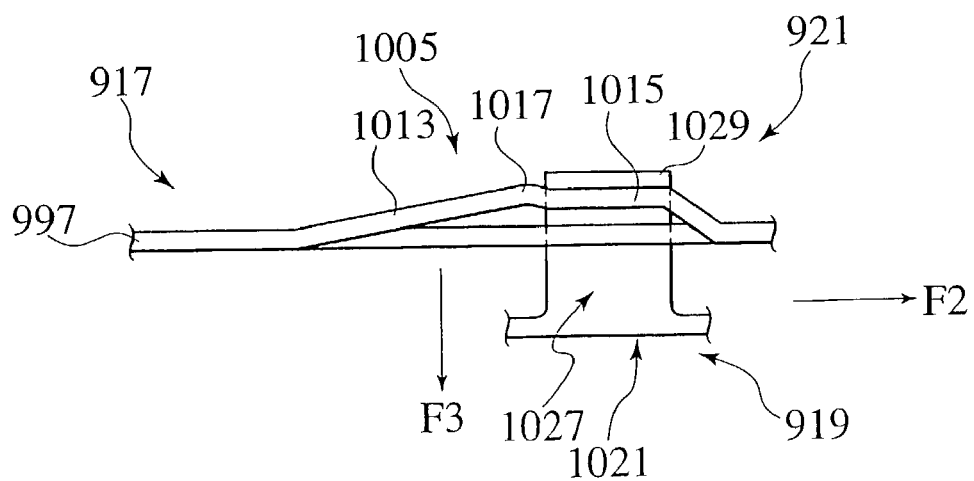
FIG. 23B is a view illustrating the cam plate having the cam formed in an angle of FIG. 23A.

FIG. 23B shows the cam 921 in a situation corresponding to that of FIG. 23A, with the radial portion 1029 of each cam guide piece 1021 sliding over the slanted wall 1013 of each cam piece 1005 to ride across the retainer protrusion 1017 to be retained at the retainer surface 1015 for thereby rendering the cam 921 operative. Also, respective arrows (F1 to F3) in FIGS. 23A, 23B show directions in which the cam plate 917 and the cam guide piece 1021 (the movable plate 919) are shifted when rotating the electric motor 927 in the opposite direction from the respective conditions.

Upon actuation of the cam 921, the resulting cam thrust force causes each cam guide piece 1021 (the movable plate 919) to be moved upward in FIG. 23B, thereby compressing the shift spring 923.

When the shift spring 923 is compressed, as shown in the upper half area of the FIG. 15, the urging force of the return spring 925 causes the movable plate 919 (the clutch ring 33) to move rightward, thereby disengaging the dog clutch 13.

Upon meshing disengagement of the dog clutch 13, the vehicle is brought into the two-wheel drive condition in a manner as described above.

Further, since the retainer protrusions 1017 retain the respective cam guide pieces 1021 on the retainer surfaces 1015 owing to its check function, even in the presence of external factors such as vibrations or impacts occurring on travel under the stopped condition of the electric motor 927, the vehicle is prevented from being shifted from the two-wheel drive condition to the four-wheel drive condition against a driver's will.

Figure 24A:
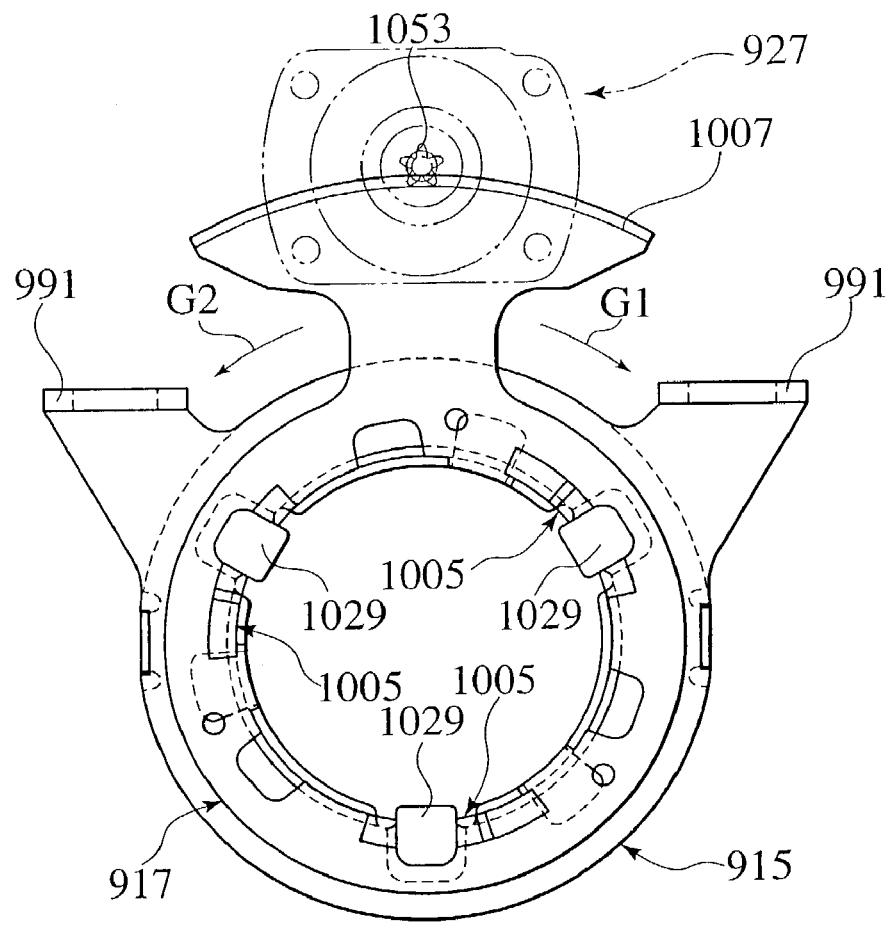
FIG. 24A is a front view illustrating the angle of the cam plate during change-over between the four-wheel drive condition and of the two-wheel drive condition of the vehicle.
Figure 24B:
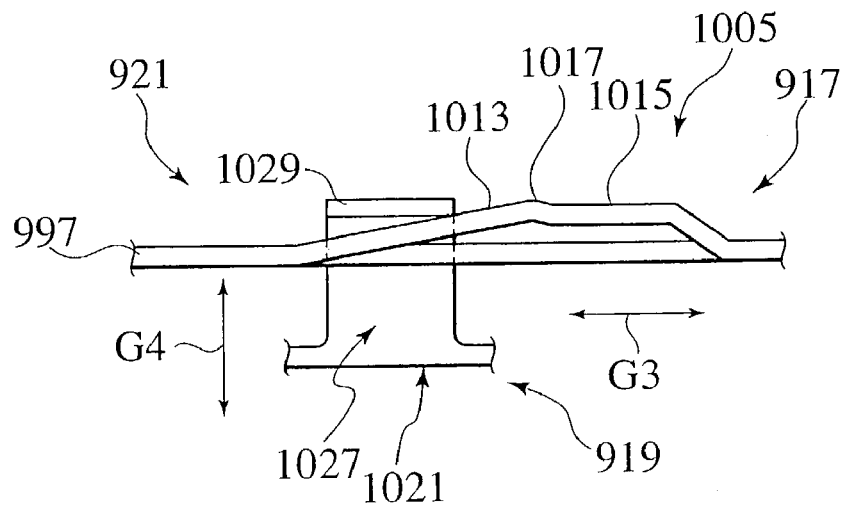
FIG. 24B is a view illustrating the cam plate with the cam being formed in an angle of FIG. 24A.

FIG. 24A shows the pinion gear 1053 being brought into the meshing engagement condition at a central area of the gear 1007 in a midway in which the cam plate 917 is rotated in both directions from the states shown in FIGS. 22A and 23A, and FIG. 24B shows a direction (as shown by an arrow G4) in which each cam guide piece 1021 (of the movable plate 919) is shifted depending on the rotational direction (as shown by an arrow G3) of the cam plate 917 in the state shown in FIG. 24A.

When rotating the cam plate 917 in a counterclockwise direction as shown by an arrow G2 in FIG. 24A, the vehicle assumes the four-wheel drive condition shown in FIG. 22A, and rotating the cam plate 917 in a clockwise direction as shown by an arrow G1 permits the vehicle to assume the two-wheel drive condition shown in FIG. 23A.

Further, since both surfaces of the slanted wall 1013 of the cam piece 1005 are formed with the retainer surfaces (the retainer surfaces 1015 and the annular plate section 997) with no cam angles, no rotational torque is imparted to the cam plate 917 in the presence of the urging force of the shift spring 923 when the cam guide piece 1021 (the radial portion 1029) rides on these retainer surfaces. Accordingly, the cam 921 is retained in its condition both in before and after the actuation and the vehicle is stably retained in the two-wheel drive condition and the four-wheel drive condition, enabling the electric motor 927 to be stopped except for operation of the cam 921.

As set forth above, under the four-wheel drive condition where the dog clutch 13 and the 2–4 shift mechanism are connected, respectively, the drive power of the engine is transmitted from the 2–4 shift mechanism to the outer differential case 7 through the rear wheel drive power transmission system upon which the inner differential case 9 is drivingly rotated through the dog clutch 13. This rotation is distributed from the pinion shafts 949 to the side gears 49, 51 through the pinion gears 947 and transmitted through the wheel shafts to the left and right wheels.

When the vehicle remains in the four-wheel drive condition, a rough-road running capability, a rough-road escaping capability and a stability are improved.

Further, especially, when a difference in driving resistance occurs between the rear wheels during a rough-road traveling, rotation of each pinion gear 947 causes the engine drive power to be differentially distributed to the left and right rear wheels.

During the two-wheel drive condition where the dog clutch 13 and the 2–4 shift mechanism are brought into meshing disengagement, respectively, the drive power delivery line between the inner differential case 9 and the rear wheels is brought into a disconnected condition by the dog clutch 13 to permit the drive power delivery line to remain in a freely rotating condition, and the power train between the 2–4 shift mechanism and the outer differential case 7 is disconnected from both the accompanying rotations caused by the engine drive power and the rear wheels to stop rotation.

Thus, during the two-wheel drive condition where rotation of the rear-wheel drive power transmission system between the 2–4 shift mechanism and the outer differential case 7 is interrupted, vibrations of the vehicle is eliminated to provide an improvement over a comfortable riding property, and wears of various component parts of the rear-wheel drive power transmission system are minimized to improve a durability, with a further resultant decrease in the load of the engine to the extent cause by reduction in rotational resistance to improve fuel consumption.

The outer differential case 7 is formed with, in addition to the openings 37, 39, spiral-shaped oil recessed portions 85, 83 at inner circumferential peripheries of the boss portions 28, 29 and further formed, on areas opposite to the thrust washers 65, 65, with radially extending oil recessed portions 89, 87 in communication with the oil recessed portions 85, 83, respectively.

Since the openings 37, 39 are formed on a radially outward area of the outer differential case 7, these openings are immersed in oil in the oil sump formed in the differential carrier 5 at all times, thereby permitting oil to enter from the openings 37, 39 with accompanying rotation of the outer differential case 7.

Further, oil in the oil sump is splashed up due to rotation of the outer differential case 7 (the ring gear 943), and movement of resulting splashed oil is promoted by screw pump actions of the oil recessed portions 85, 83 such that oil passes through gaps between the oil recessed portions 89, 87 and the thrust washers 65, 65 to enter the interior of the outer differential case 7.

Oil entered the outer differential case 7 is supplied to the meshing portions of the respective gears 67, 69, 71 forming the differential mechanism 11 having the bevel gears, the sliding areas between the pinion shafts 949 and the pinion gears 947, the sliding areas between the outer differential case 7 and the inner differential case 9, the sliding areas between the outer differential case 7 and the clutch ring 33, and the dog clutch 13 (the meshing teeth 31, 35) to lubricate and cool these parts.

Furthermore, the lower part of the actuator 901 is also immersed in the oil sump and, hence, the sliding areas of the cam plate 917, that is operationally rotated, the support plate 915 and the movable plate 919 and the cam 921 are lubricated and cooled.

Moreover, the gear set 929 is also lubricated and cooled by the above-described splashed oil.

Thus, lessened wears result in the above-described various lubricating and cooling areas due to supplied oil, resulting in an improvement over a durability while decreasing frictional resistances in the various sliding areas for thereby improving fuel consumption.

In such a way described above, the actuator 901 and the rear differential 903 are structured.

As set forth above, since assembly of the actuator 901 can be accomplished by allowing the support protrusion 1003 of the cam plate 917 to pass through the incorporating concave portion 993 of the support plate 915 and slightly twisting the same and allowing the cam guide piece 1021 of the movable plate 919 to pass through the incorporating concave portions 993, 1001 of the support plate 915 and the cam plate 917 and slightly twisting the cam plate 917, there is no need for specific tools and less number of steps with a resultant remarkable ease in assembly.

Further, since the actuator 901 can be assembled to the rear differential 903 merely by fixing the support plate 915 to the differential carrier 5 by means of the bolts, fixing the electric motor 927 to the differential carrier 5 by means of the mounting fixtures 1035 and compelling the pinion gear 1053 to mesh with the gear 1007 of the cam plate 917, an extremely easy assembly is provided.

Further, the actuator 901 that converts the rotational torque of the electric motor 927 to the operating force of the dog clutch 13 by means of the cams 921, differs from the related art structure that needs an actuator utilizing fluid pressure and make it possible to allow a high cost pump, the actuator utilizing fluid pressure (for a piston and a cylinder) and an associated converting mechanism to be dispensed with, resulting in reduction in the number of component parts in that extent to a simplified structure at a low cost.

Furthermore, the rear differential 903 using the actuator 901 does not need to prepare a wide application space to install a pressure line, resulting in a light weight and compact structure to improve an on-vehicle installation capability while there is no need for altering the differential carrier 5 to avoid a remarkable increase in cost that would otherwise be caused because of alteration.

Moreover, the actuator 901 and the rear differential 903 become free from adverse affects due to functional degradation and pressure fluctuation caused by a leakage of pressure, resulting in a remarkable improvement in a performance, a stability and a reliability in operation while, additionally, strengthening the sealing properties at various part of the pressure line and avoiding an increase in accompanying costs.

Also, the support plate 915, the cam plate 917 and the movable plate 919 are entirely fabricated by plate works and, thus, formed in light weight in that extent at low costs.

Besides, the cam pieces 1005 of the cam plate 917 can be press formed at low costs.

In addition, before and after the press works, it is possible to adjust the cam angles of the slanted walls 1013 of the cam pieces 1005 depending on the magnitude of the operating force (the cam thrust force to resist the urging force of the shift spring) required for the dog clutch 13 and the output torque of the electric motor 927, and adjusting the cam angle enables the capacity of the electric motor 927 to be reduced for decreasing the loads of the battery and the charging alternator, resulting in an improvement over fuel consumption.

Further, since the retainer surfaces, with no cam angles, formed at both sides of the slanted wall 1013 of the cam piece 1005 avoid the cam piece 1005 (the cam plate 917) from bearing the rotational torque and the state of the cam 921 is retained both before and after the actuation, the electric motor 927 can be stopped in operation after operating the cam 921, resulting in a further decrease in the loads of the battery and the alternator to improve fuel consumption while improving a durability of the electric motor 927.

Furthermore, even when the electric motor 927 is stopped in operation, or in a failure of the electric motor 927, such a retaining function allows the vehicle to be retained in the two-wheel drive condition and the four-wheel drive condition in a stable manner.

Besides, the presence of the support plate 915, the cam plate 917 and the movable plate 919 formed in respective annular shapes enables the actuator 901 to be concentrically located around the rear differential 903 (the boss portion 28), and the rear differential 903 can be formed in a compact structure with a resultant improvement over an on-vehicle installation capability.

In addition, the shift spring 923 takes the form of the waiting mechanism, resulting in reduction in ratcheting and ratchet noise occurring during operation for meshing engagement of the dog clutch 13 while remarkably improving a durability.

Moreover, the presence of the cam plate 917 and the gear plate 999 integrally formed with respect to one another enables reduction in the number of component parts and costs.

[Eleventh Embodiment]

Figure 25:
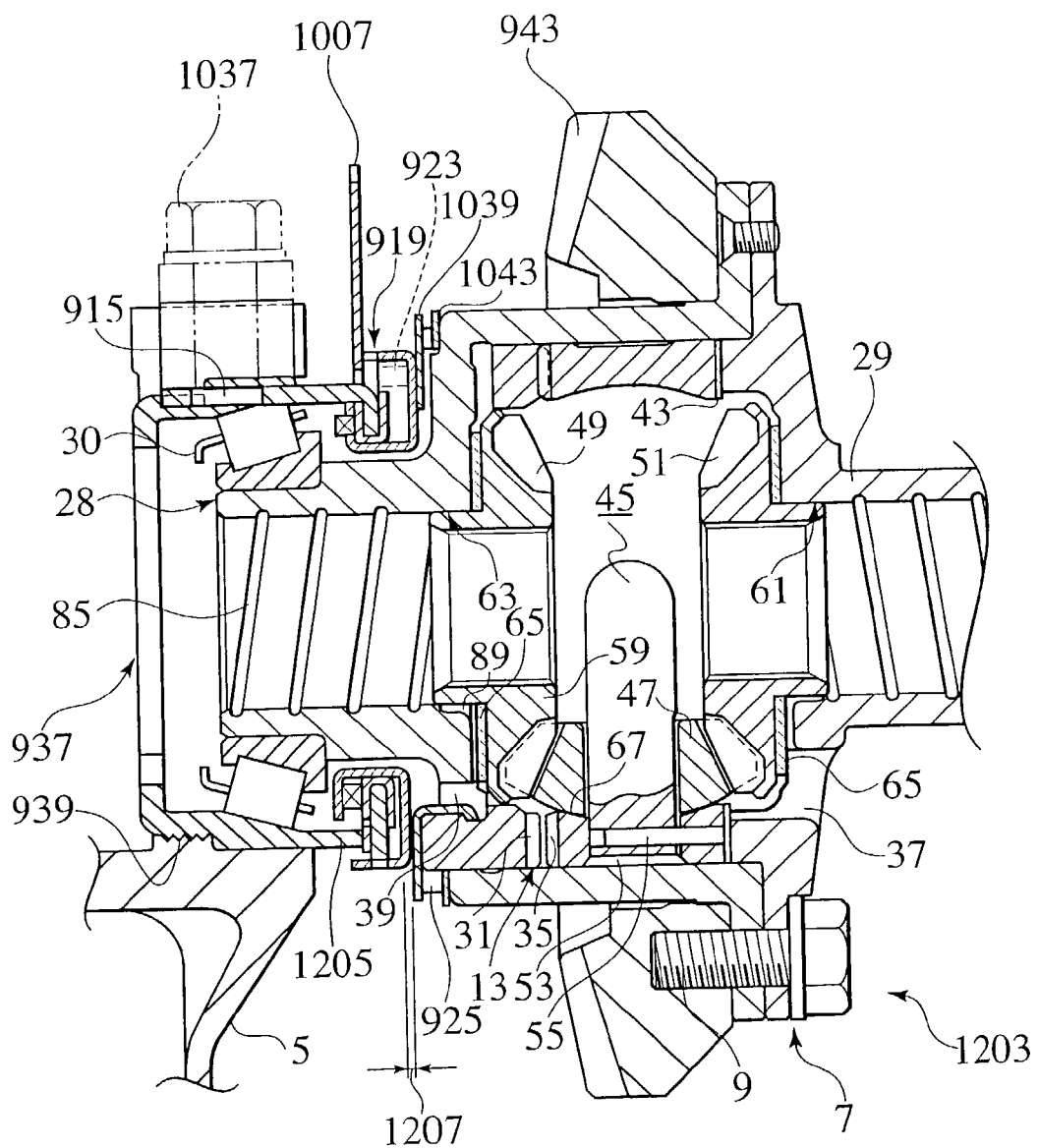
FIG. 25 is a cross sectional view illustrating an actuator of an eleventh embodiment and a front differential using such an actuator.

An actuator 901 of an eleventh embodiment and a rear differential 1203 (a differential unit) using the same are described with reference to FIG. 25.

The rear differential 1203 is used in place of the rear differential 903 in the four-wheel-drive vehicle of the tenth embodiment is used. Hereinafter, the same component parts as those of the rear differential 903 bear the same reference numerals and are referred to herein for description on different points.

Screwed onto the differential carrier 5 by means of screw portions 939 are bearing caps 937, 937, and the boss portions 28, 29 of the outer differential case 7 are supported by the differential carrier 5 by means of the thrust bearings 30 and the bearing caps 937, 937. As shown in FIG. 25, each bearing cap 937 also serves as an outer race of each thrust bearing 30.

Further, each bearing cap 937 is formed with an abutting portion 1205 associated with the cam plate 917.

Rotating these bearing caps 937, 937 by means of the screw portions 939 allows the outer races (the bearing caps 937) of the left and right thrust bearings 30 to move in the axial direction, thereby achieving preload adjustments.

Furthermore, even in the presence of travel of the outer differential case 7 accompanied by the preload adjustment, the cam plate 917 is pressed against the abutting portion 1205 of the bearing cap 937 to cause the support plate 915 to be flexed, thereby causing the cam plate 917 and the movable plate 919 to travel in the same stroke as that of the bearing cap 937 (the outer differential case 7).

As a consequence, before and after the preload adjustment, a space 1207 between the retainer 1039, closer to the dog clutch 13, and the movable plate 919 is maintained at a given value such that the spring force of the shift spring 923 for urging the clutch ring 33 is maintained at an appropriate value to ensure normal operation of the actuator 901.

[Twelfth Embodiment]

Figure 26:
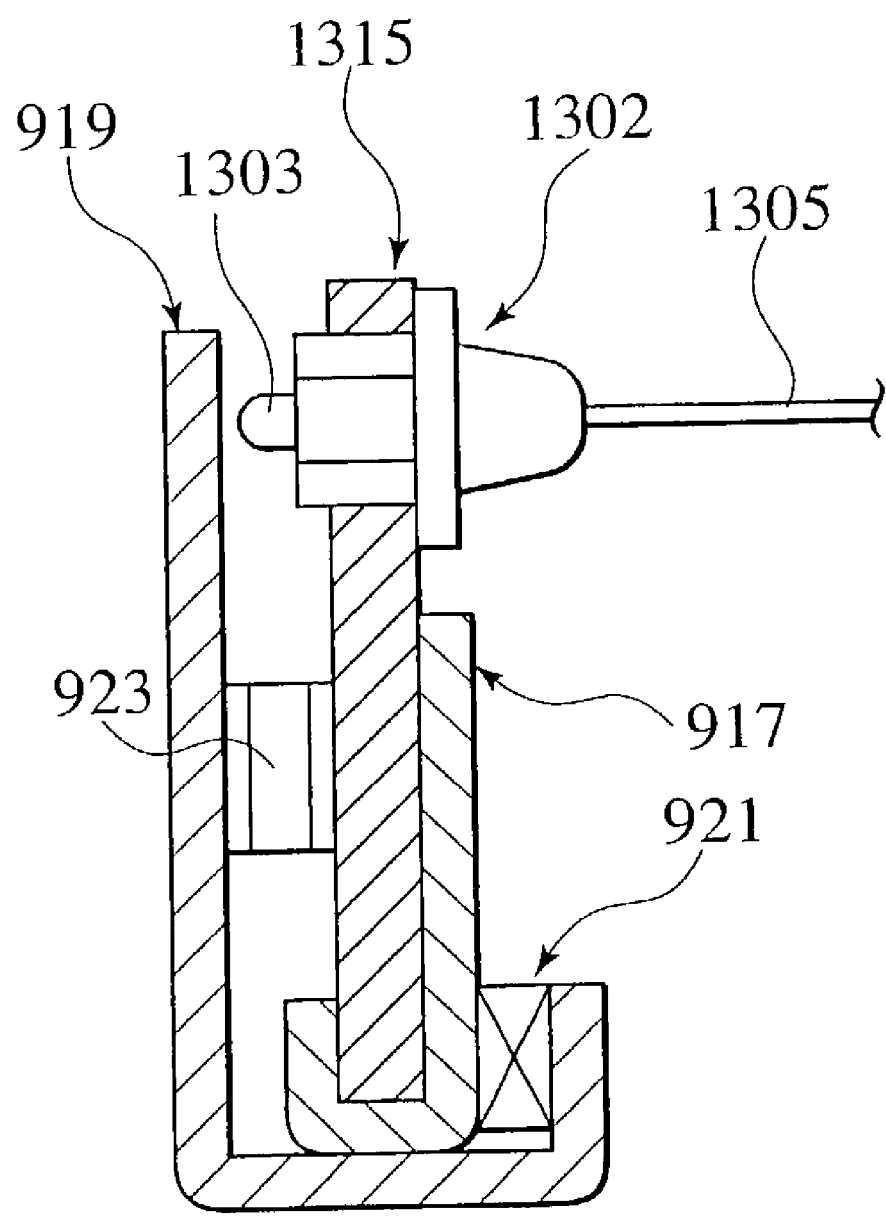
FIG. 26 is a view illustrating a position sensor of a twelfth embodiment and a related mounted state.

An actuator 1301 of a twelfth embodiment is described with reference to FIG. 26.

The actuator 1301 of the twelfth embodiment has a structure in which a position sensor 1302 is added to the actuator 901.

The position sensor 1302 includes a position switch and is screwed to a support plate 1315. Also, a probe 1303 of the position sensor 1302 is held in contact with the movable plate 919, and a signal line 1305 is controlled to the controller.

As set forth above, if the movable plate 919 is operationally moved in both directions by the shift spring 923 and the cam 921 to cause the dog clutch 13 to travel to the coupling position (a four-wheel-drive position) and an uncoupling position (a two-wheel-drive position), the switch is actuated by the probe 1303 accompanying the movable plate 919, with resulting ON-OFF signals being delivered from the signal line 1305 to the controller.

The controller compels the electric motor 927 to be energized to operate the dog clutch 13 and, thereafter, upon detection of the position (i.e., an intended status of the dog clutch 13) of the movable plate 919 responsive to the ON-OFF signal delivered from the position sensor 1302, interrupts the rotation of the electric motor 927.

In such a manner, since it becomes possible to directly know the status of the dog clutch 13 (the meshing engagement or disengagement of the rear differential 903) by the position sensor 1302, the electric motor 927 can be quickly stopped in operation subsequent to the operation of the dog clutch 13, thereby eliminating excessive rotation of the electric motor 927, abutment of the gear set 929 caused by excessive rotation, an over-current of the electric motor 927 caused by abutment of the gear set 929 and a degraded durability of the electric motor 927 while minimizing the load of the battery.

Further, since no relative rotation occurs between the support plate 1315, to which the position sensor 1302 is mounted, and the movable plate 919, wear of the position sensor 1302 (the probe 1303) due to sliding movements thereof is avoided, and there is no need for implementing surface hardening treatments such as carbonizing/hardening or nitriding treatment to improve the wear resistant property, with resultant avoidance in an increase in accompanying costs.

Furthermore, it is also possible to prevent an increase in the loads of the electric motor 927, the battery and the alternator due to the sliding resistance caused in the position sensor 1302, and reduction in fuel consumption is prevented.

Also, there is no need for the position sensor 1302, mounted to the support plate 1315 (on the actuator having the gear plate), to be positioned with respect to the rear differential 903 during assembling, thereby providing an ease of assembly in that extent.

[Thirteenth Embodiment]

Figure 27A:
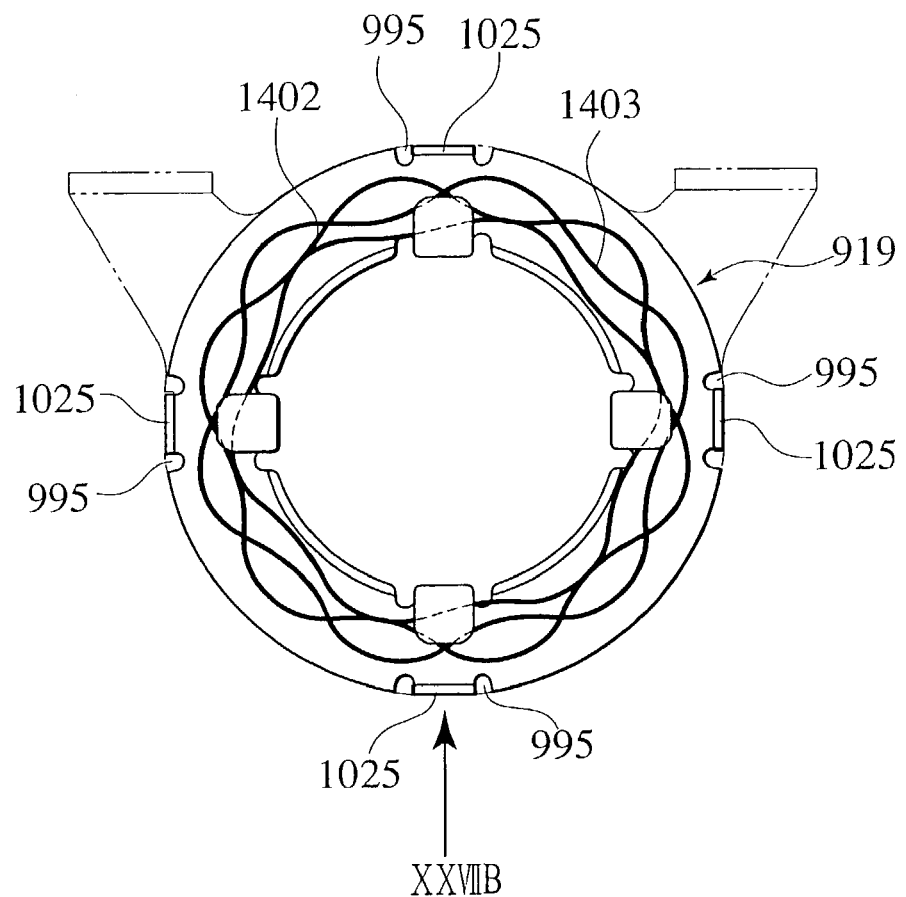
FIG. 27A is a view illustrating a support plate and a movable plate used in a thirteenth embodiment.
Figure 27B:
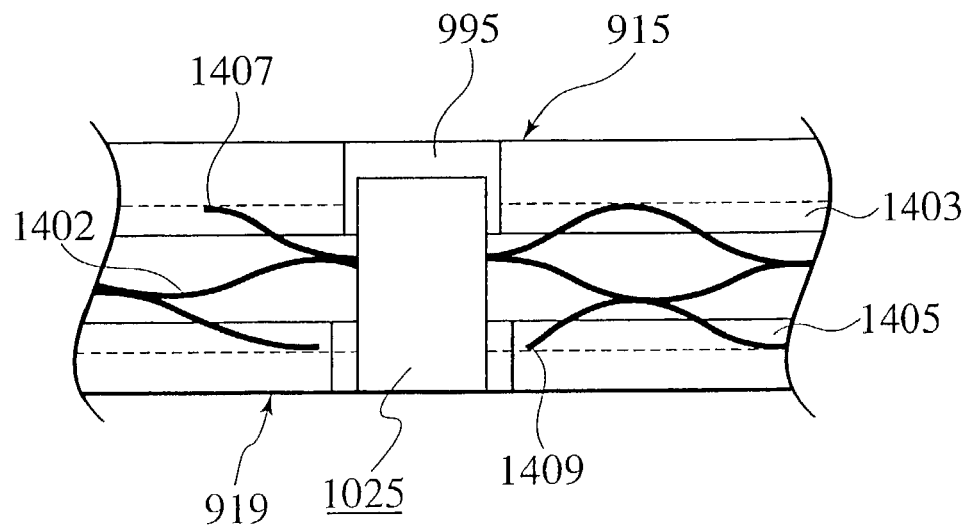
FIG. 27B is a view as viewed in an arrow XXVIIB of FIG. 27A.

An actuator 1401 of a thirteenth embodiment is described with reference to FIGS. 27A, 27B.

The actuator 1401 of the thirteenth embodiment is a modified form of the actuator 901, and a scrolled wave spring 1402 is employed in place of the shift spring 923.

The scrolled wave spring 1402 is disposed between the support plate 915 and the movable plate 919 to urge the clutch ring 33 through the movable plate 919 in a coupling direction. As shown in FIG. 27B, the scrolled wave spring 1402 has distal ends 1407, 1409 that are formed when cutting a spring material.

Further, the support plate 915 and the movable plate 919 are formed at their circumferential peripheries with recessed portions 1403, 1405, respectively, to which the distal ends 1407, 1409 of the scrolled wave spring 1402 are held in abutting engagement.

In such a manner, since the distal ends 1407, 1409 of the scrolled wave spring 1402 a positioned in the recessed portions 1403, 1405 formed in the support plate 915 and the movable plate 919, even when repeated expansion and contraction occurs in the scrolled wave spring 1402 accompanying the travel of the movable plate 919 (for coupling or uncoupling operation of the dog clutch 13), dropouts of the distal ends 1407, 1409 are avoided to allow the scrolled wave spring 1402 to be retained in a given position, thereby ensuring the function of the actuator under a normal condition.

Also, during assembly of the scrolled wave spring 1402, since the scrolled wave spring 1402 is positioned by the recessed portions 1403, 1405, resulting in a ease of assembly.

[Fourteenth Embodiment]

An actuator 1501 of a fourteenth embodiment is described with reference to FIGS. 28A, 28B, 29.

The actuator 1501 is employed in the rear differential 903 in place of the actuator 901 of the tenth embodiment. Hereinafter, the same component parts as those of the actuator 901 bear the same reference numerals and are referred to for description on different points.

Figure 28A:
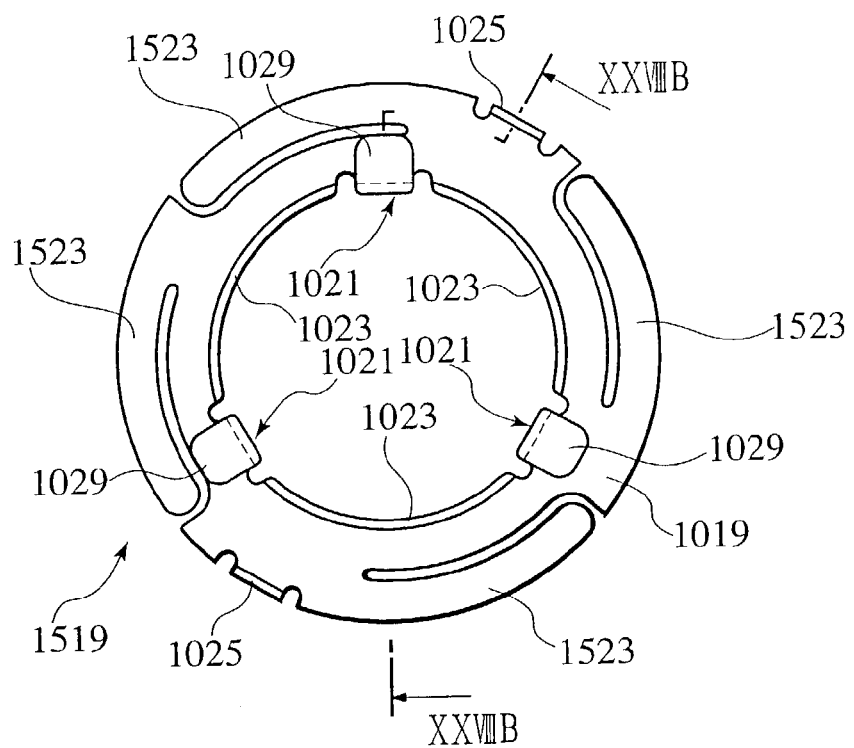
FIG. 28A is a front view illustrating a movable plate used in a fourteenth embodiment.
Figure 28B:
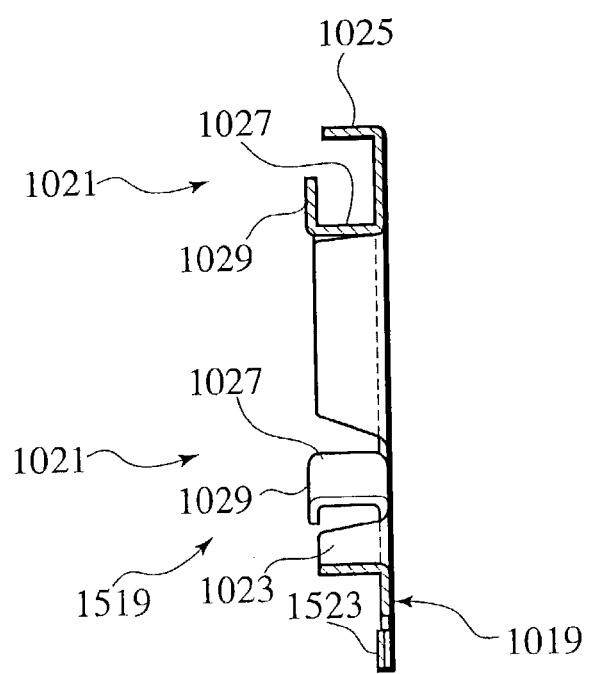
FIG. 28B is a cross sectional view taken on line XXVIIIB—XXVIIIB of FIG. 28A.
Figure 29:
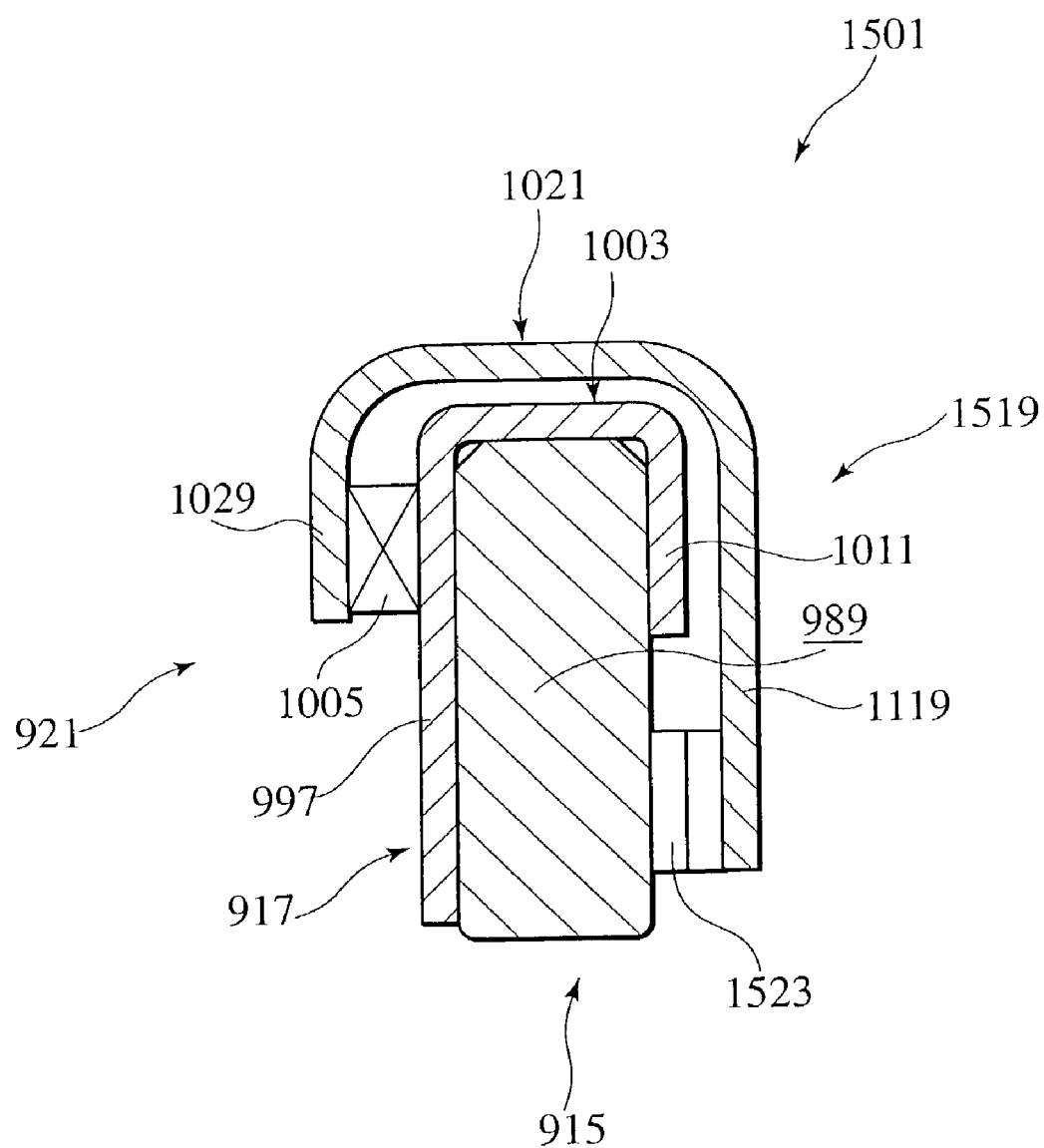
FIG. 29 is a cross sectional view of an essential part of an actuator of the fourteenth embodiment.

A movable plate 1519 is made from a SK material or a plate material equivalent to the SK material by press works and, as shown in FIGS. 28A, 28B, 29, comprised of an annular plate section 1019, three cam guide pieces 1021 (movable-plate-side protrusions) formed on an inner periphery of the annular plate section 1019 at circumferentially and equidistantly spaced positions, three inner peripheral guide pieces 1023 each formed between the adjacent cam guide pieces 1021, two outer peripheral guide pieces 1025 formed on an outer periphery of the annular plate section 1019 at circumferentially and equidistantly spaced positions, and shift springs 1523 formed on the outer periphery at four positions.

Thus, the respective shift springs 1523 are integrally formed with the movable plate 1519 and, as shown in FIG. 29, the respective shift springs 1523 are inclined toward the support plate 915.

Further, each of the shift spring 1523 integrally formed with the movable plate 519 as set forth above has an urging force, selected to be larger than the urging force of the return spring 925, by which the movable plate 1519 and the clutch ring 31 are urged in a direction (leftward) in which the dog clutch 13 is brought into meshing engagement.

Furthermore, the return spring 925 may include a coil spring 1045.

As previously described above in conjunction with the tenth embodiment, under an inoperative condition of the cam 921, like the lower half section of FIG. 15, the movable plate 1519 (the clutch ring 31) is shifted leftward by the shift spring 1523, thereby causing the dog clutch 13 to be brought into meshing engagement.

When this takes place, the shift spring 1523 takes the form of a waiting mechanism such that, until matching takes place in phase in the dog clutch 13 (in the meshing teeth 31, 35), the presence of flexing of the shift spring 1523 per se allows ratcheting and ratcheting noise to be lessened and the dog clutch 13 is brought into meshing engagement when matching takes place in phase.

Further, the presence of reduction in ratcheting between the meshing teeth 31, 35 of the dog clutch 13 allows a durability to be improved.

Due to the respective shift springs 1523 integrally formed with the movable plate 1519, the number of component parts of the actuator 1501 is reduced with a resultant decrease in the number of assembling steps and costs.

Moreover, there is no need for the structure for positioning the respective shift springs 1523 and consideration for assembly thereof, with a resultant further reduction in the number of assembling steps and costs.

Also, since the respective shift springs 1523 can be simultaneously formed by press works when fabricating the movable plate 1519, the actuator 1501 can be manufactured in an extremely low cost.

[Fifteenth Embodiment]

An actuator 1601 of a fifteenth embodiment is described with reference to FIGS. 30A, 30B, 31.

The actuator 1601 is employed in the rear differential 903 in place of the actuator 901 of the tenth embodiment. Hereinafter, the same component parts as those of the actuator 901 bear the same reference numerals and are referred to herein for description on different points.

Figure 30A:
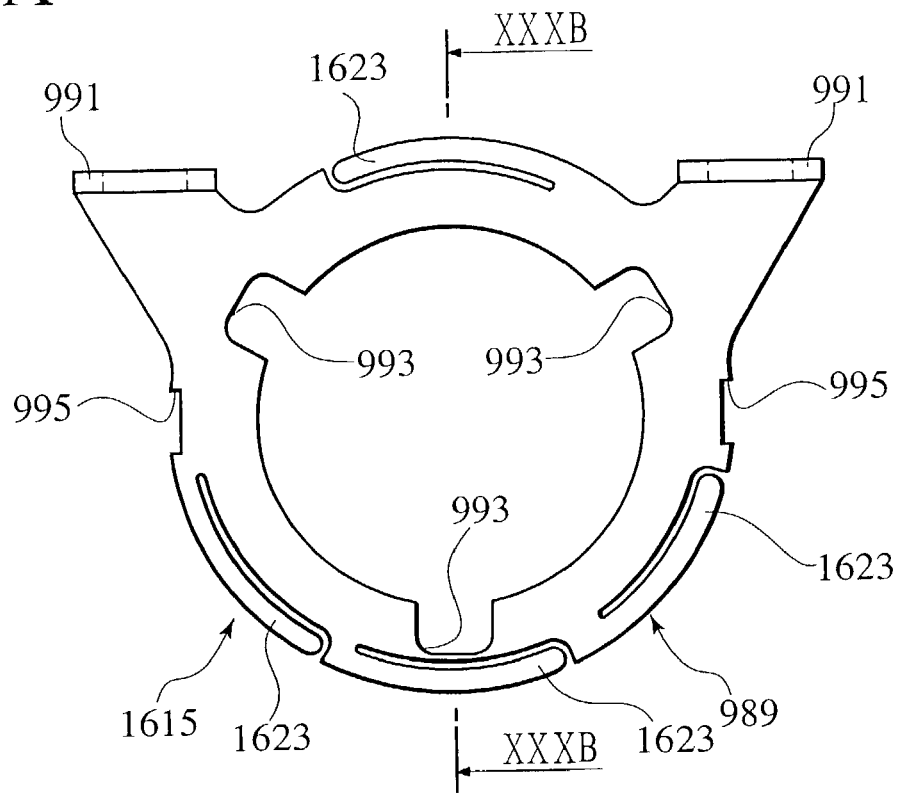
FIG. 30A is a front view illustrating a support plate used in a fifteenth embodiment.
Figure 30B:
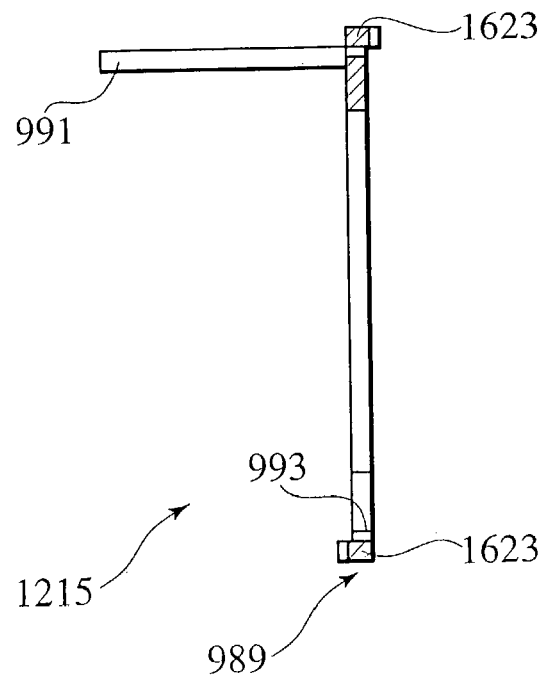
FIG. 30B is a cross sectional view taken on line XXXB—XXXB of FIG. 30A.
Figure 31:
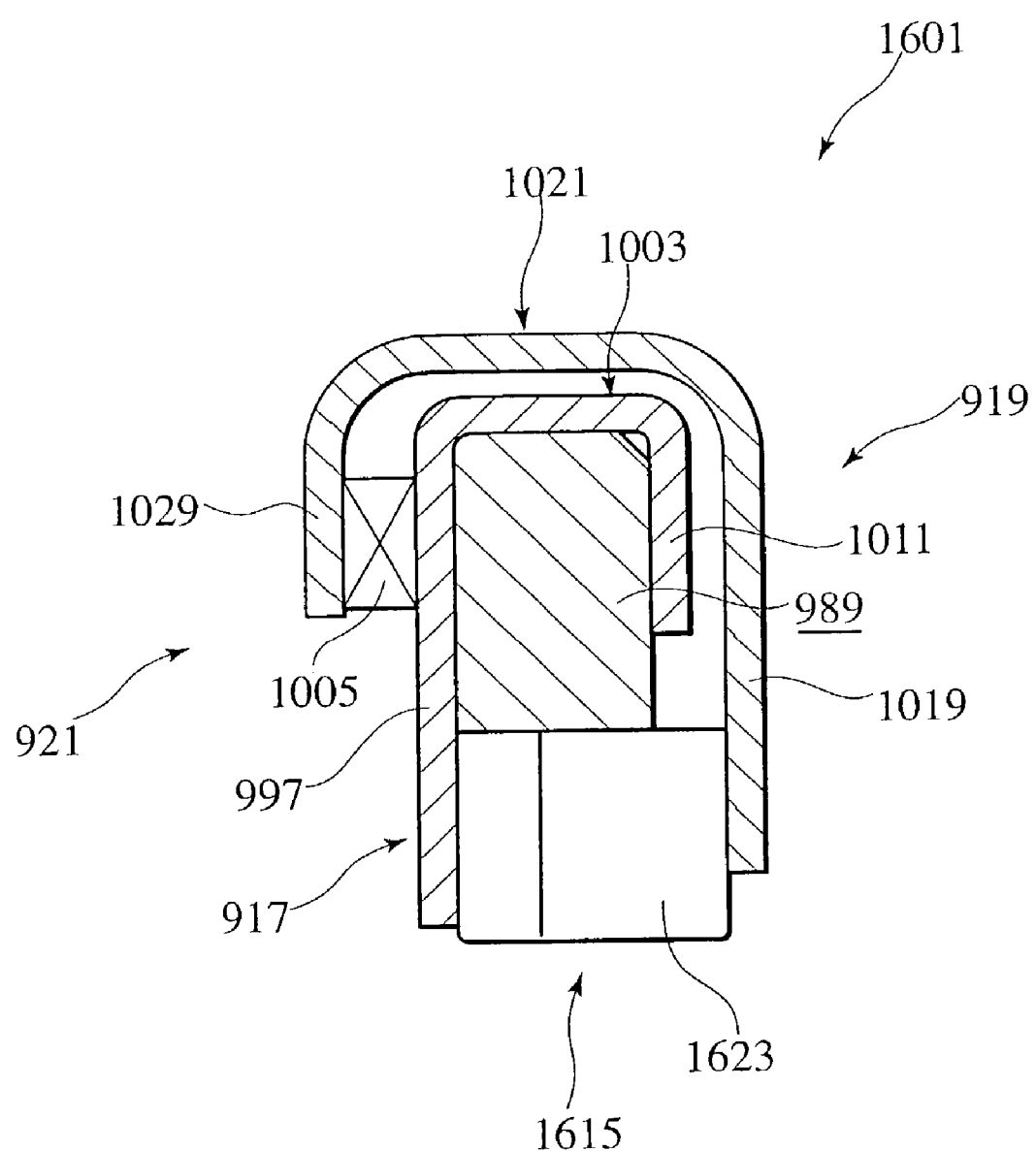
FIG. 31 is a cross sectional view of an essential part of an actuator of the fifteenth embodiment.
Figure 32:
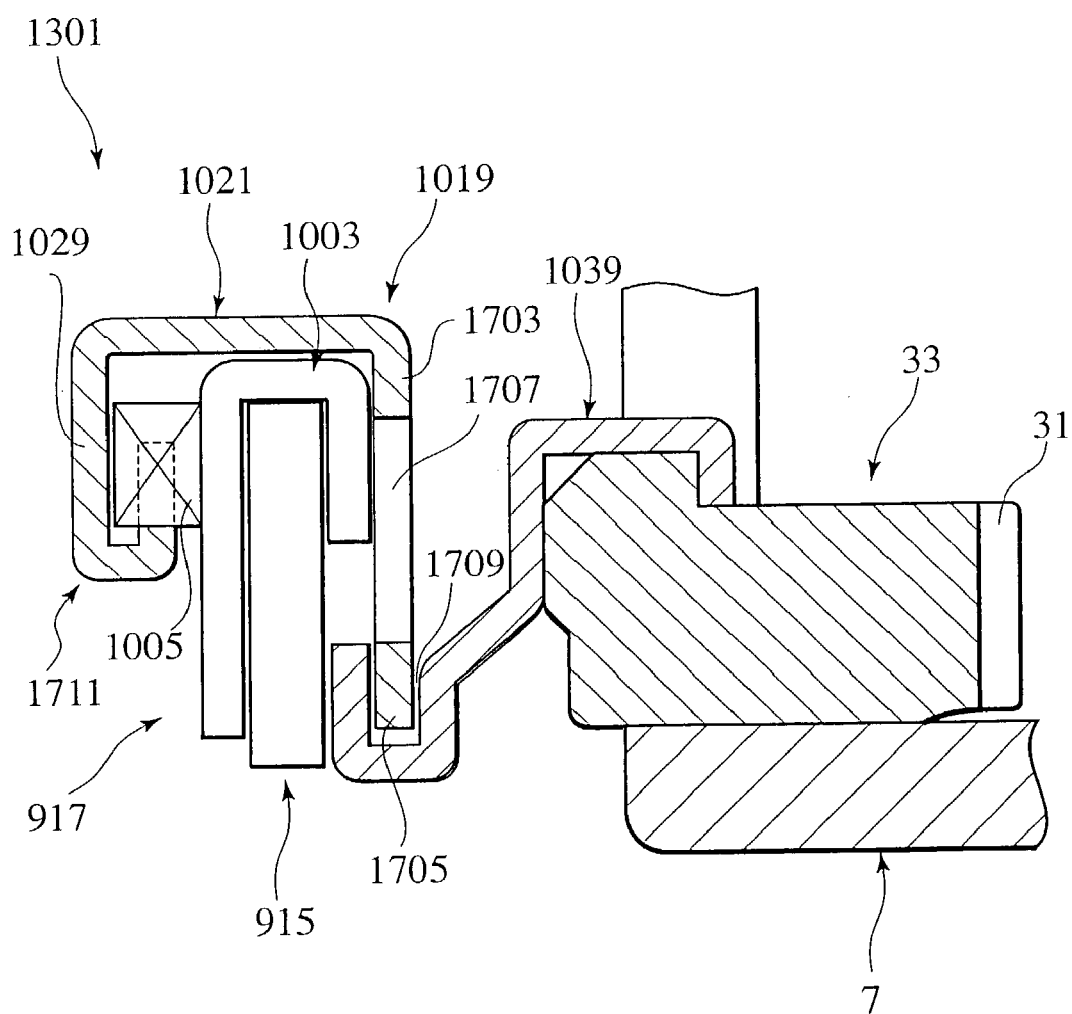
FIG. 32 is a cross sectional view of an essential part of an actuator of an sixteenth embodiment.

A support plate 1615 is made from a SK material or a plate material equivalent to the SK material by press works and, as shown in FIGS. 30A, 30B, 31, comprised of an annular plate section 989, two stationary plate sections 991 integrally formed with the annular plate section 989, three incorporating concave portions 993 formed on an inner periphery of the annular plate section 989 at circumferentially and equidistantly spaced positions, two guide recessed portions formed on an outer periphery of the annular plate section 989 at circumferentially and equidistantly spaced positions, and shift springs 1623 (urging means: circumferential spring segments) formed on the outer periphery at four positions.

Thus, the respective shift springs 1623 are integrally formed with the support plate 1615 and, as shown in FIG. 31, the respective shift springs 1623 are inclined toward the movable plate 919.

The actuator 1501 is an example in which the shift springs 1623 are integrally formed with the support plate 1615 and has advantages equal to those of the actuator 1501 of the fourteenth embodiment.

[Sixteenth Embodiment]

An actuator 1701 of a sixteenth embodiment is described with reference to FIGS. 32 to 35.

The actuator 1701 is employed in the rear differential 903 of the fourteenth embodiment in place of the actuator 1501. Hereinafter, the same component parts as those of the actuator 1501 bear the same reference numerals and are referred to for description on different points.

Figure 34:
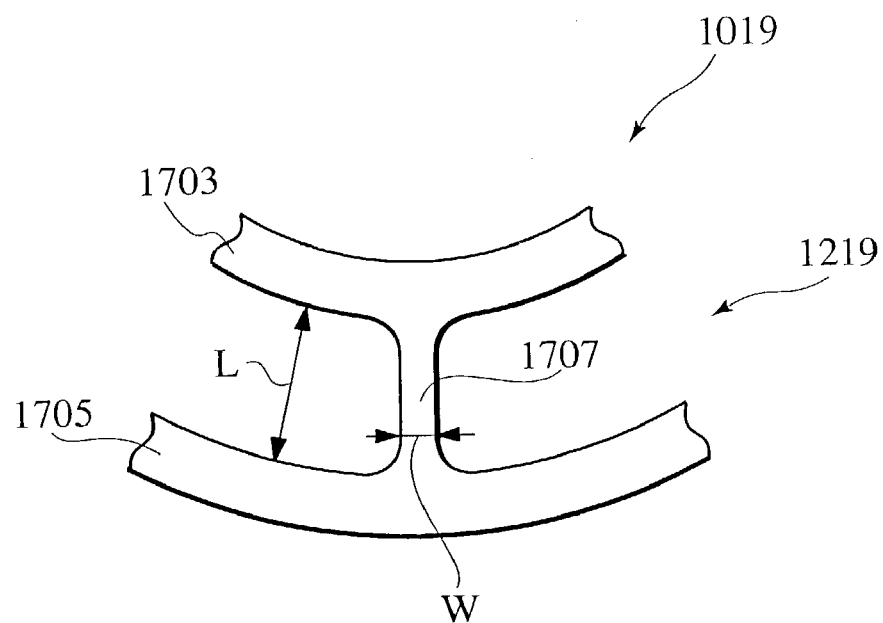
FIG. 34 is a view illustrating a movable plate of a seventeenth embodiment and a spring portion integrally formed with the actuator.

A movable plate 1719 is made from a SK material or a plate material equivalent to the SK material by press works and, as shown in FIG. 34, has an annular plate section 1019 composed of an inner circumferential portion 1703 and an outer circumferential portion 1705 which are connected to one another through a plurality of bridge shaped spring portions 1707 (urging means) formed at circumferentially and equidistantly spaced positions. each spring portion 1707 is substantially formed along a radial direction.

As shown in FIGS. 32 to 35, further, a cam 1711 (a cam mechanism) is comprised of the respective cam pieces 1005 of the cam plate 917 and the respective cam guide pieces 1021 (the radial portions 1029) of the movable plate 1019.

The cam 1711 is formed such that the radial portion 1029 of each cam guide piece 1021 is bent so as to sandwich both sides of each cam piece 1005 and generates a cam thrust force acting in one side and the other side in an axial direction depending on the electric motor 927 rotating in both directions.

Accordingly, if the cam plate 917 is rotated in one direction, then the movable plate 1719 is caused to travel to the one side in the axial direction and, on the contrary, if the cam plate is rotated in the opposite direction, the movable plate 1719 is caused to travel to the other side in the axial direction.

Figure 33A:
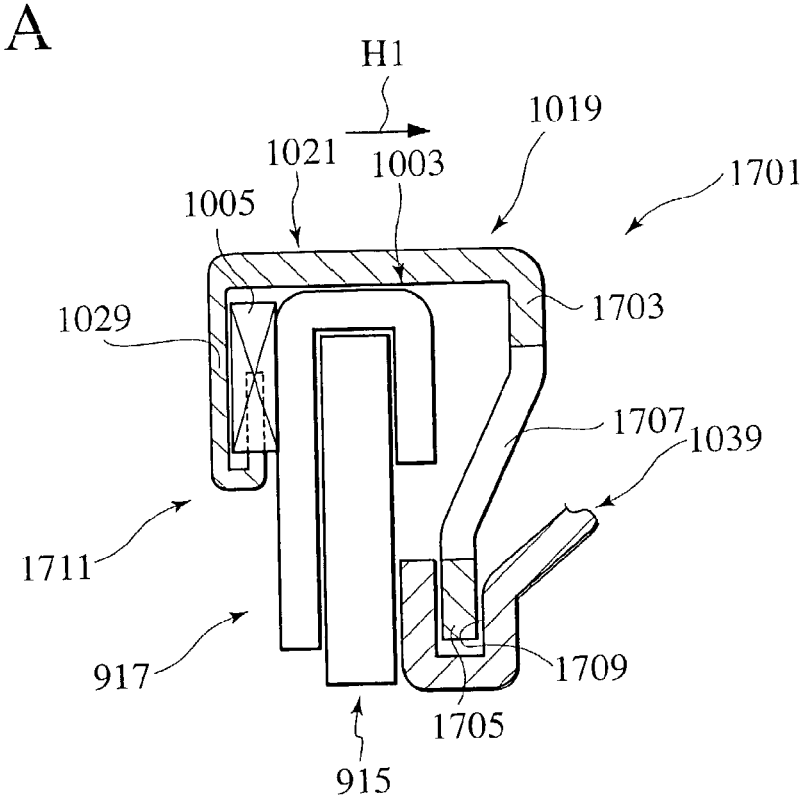
FIG. 33A is a cross sectional view illustrating an actuator of a seventeenth embodiment in a state operated in a four-wheel drive mode of a vehicle.

FIG. 33A shows a state under which, during two-wheel-drive traveling of a vehicle, the cam plate 917 is rotated in one direction to cause the movable plate 1719 to be operationally shifted in a direction as shown by an arrow H1.

When this takes place, the respective spring portions 1707 of the movable plate 1719 serve as the shift springs such that, until matching takes place in phase in the dog clutch 13 (in the meshing teeth 31, 35), the presence of flexing of the spring portions per se provides a waiting mechanism (a check mechanism) to allow ratcheting and ratcheting noise to be lessened and the dog clutch 13 is brought into meshing engagement when matching takes place in phase.

Figure 33B:
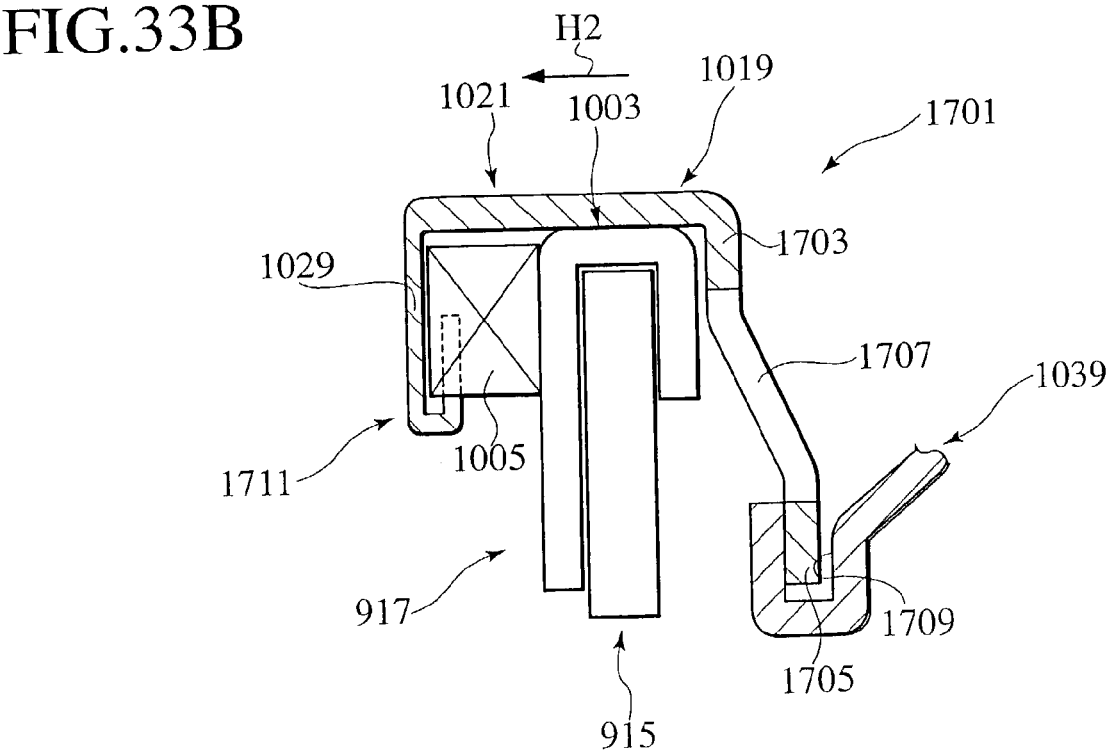
FIG. 33B is a cross sectional view illustrating the actuator remaining in a state operated in a two-wheel drive mode.

FIG. 33B shows a state under which, during four-wheel-drive traveling of the vehicle, the cam plate 917 is rotated in the opposite direction to cause the movable plate 1719 to be operationally shifted in a direction as shown by an arrow H2.

When this takes place, the respective spring portions 1707 serve as the shift springs each of which bears a frictional resistance created by the meshing teeth 31, 35 during a torque transfer and is flexed such that, when the spring force exceeds this frictional resistance, the dog clutch 13 is brought out of meshing engagement.

Further, in order to increase the check force of each spring portion 1707 when the waiting mechanism takes place, the actuator 1701 may be located in a position (a position related to the dog clutch 13) to cause the amount of flexing of each spring portion 1707 during meshing engagement of the dog clutch 13 to become larger than the amount of flexing to be caused during meshing disengagement.

Figure 35:
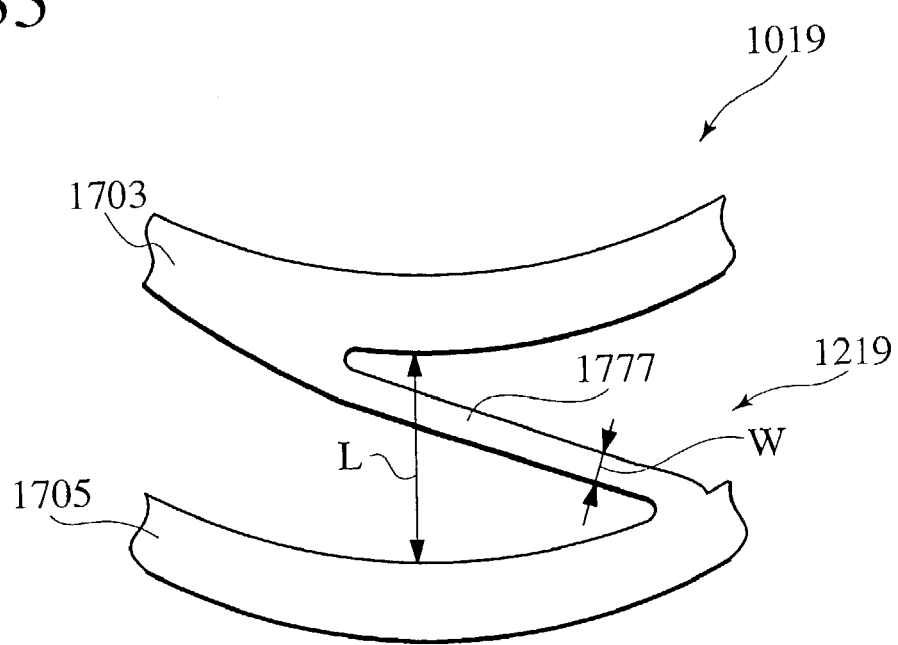
FIG. 35 is a view illustrating another example of the movable plate of the seventeenth embodiment with the spring portion integrally formed with the actuator.

Also, FIG. 35 shows a spiral-shaped spring portion 1777 (an urging means) that is integrally formed with a movable plate 1719. The spiral-shaped spring portion 1777 has a larger length (L) than that of the spring portion 1707 extending in the radial direction set forth above to provide an increased amount of flexing and, hence, the radial spring portion 1707 and the spiral-shaped spring portion 1777 may be selected depending on the amount of flexing required for the operation of the dog clutch 13.

Furthermore, for the purpose of adjusting the spring forces of the respective spring portions 1707, 1777, widths (W) of the respective spring portions 1707, 1777 may be varied.

This actuator 1701 has advantages equal to those of the actuators 1501, 1601.

In addition, since the actuator 1701 features that the respective spring portions 1707, 1777 formed in the movable plate 1019 serve as the shift spring and the return spring, not only the number of component parts, assembling steps and costs are decreased, but also there is no need for a structure for positioning the return spring and consideration for an assembly, resulting in a further reduction in the number of assembling steps and costs.

Further, unlike the related art structure wherein the shift spring and the return spring are separately formed, since there is no need for the spring force of the shift spring to be larger than that of the return spring, an operational loss of the electric motor 927 caused by the shift spring can be remarkably minimized.

For the same reason, since the spring forces of the spring portions 1707, 1777 can be decreased to an irreducible minimum of demand, the frictional resistances to be exerted to the respective plates 915, 917, 1019 are reduced in that extent, resulting in an improvement over the actuator 1701.

Furthermore, since the capacity of the electric motor 927 can be minimized to the extent that the frictional resistance is decreased, it is possible to decrease the loads of the battery to drive the electric motor 927 and the alternator for charging the battery, resulting in an improvement over fuel consumption which drives the alternator.

Besides, since the electric motor 927 can be formed in a small size and a light weight, the actuator 1701 and the rear differential 903 are miniaturized to be light in weight in that extent, resulting in an improvement over an on-vehicle installation capability.

In addition, an advantage of reducing the operational loss of the electric motor 927 by decreasing the spring forces of the respective spring portions 1707, 1777 is found to be more remarkable in the actuator 1701 of the present invention employing the electric motor 927 with a smaller operating force than the actuator using the fluid pressure.

Also, with the actuator of the present invention, the operating unit to be actuated may not be limited to the clutch.

Further, such a clutch may include not only the meshing clutch (the dog clutch) like the various embodiments, but also a frictional clutch such as a multi-plate clutch and a cone clutch.

Moreover, with the differential unit of the present invention, the differential mechanism is not be limited to the differential mechanism having the bevel gear and may include a differential mechanism having a planetary gear, a differential mechanism wherein output side gears are connected by pinion gears rotationally supported in accommodating bores of the differential case, and a differential mechanism employing a worm gear.

[Seventeenth Embodiment]

An actuator of the present invention and various examples, having vehicle power transmission systems to which a differential unit employing such an actuator is applied, is described with reference to FIGS. 36,37.

Figure 36:
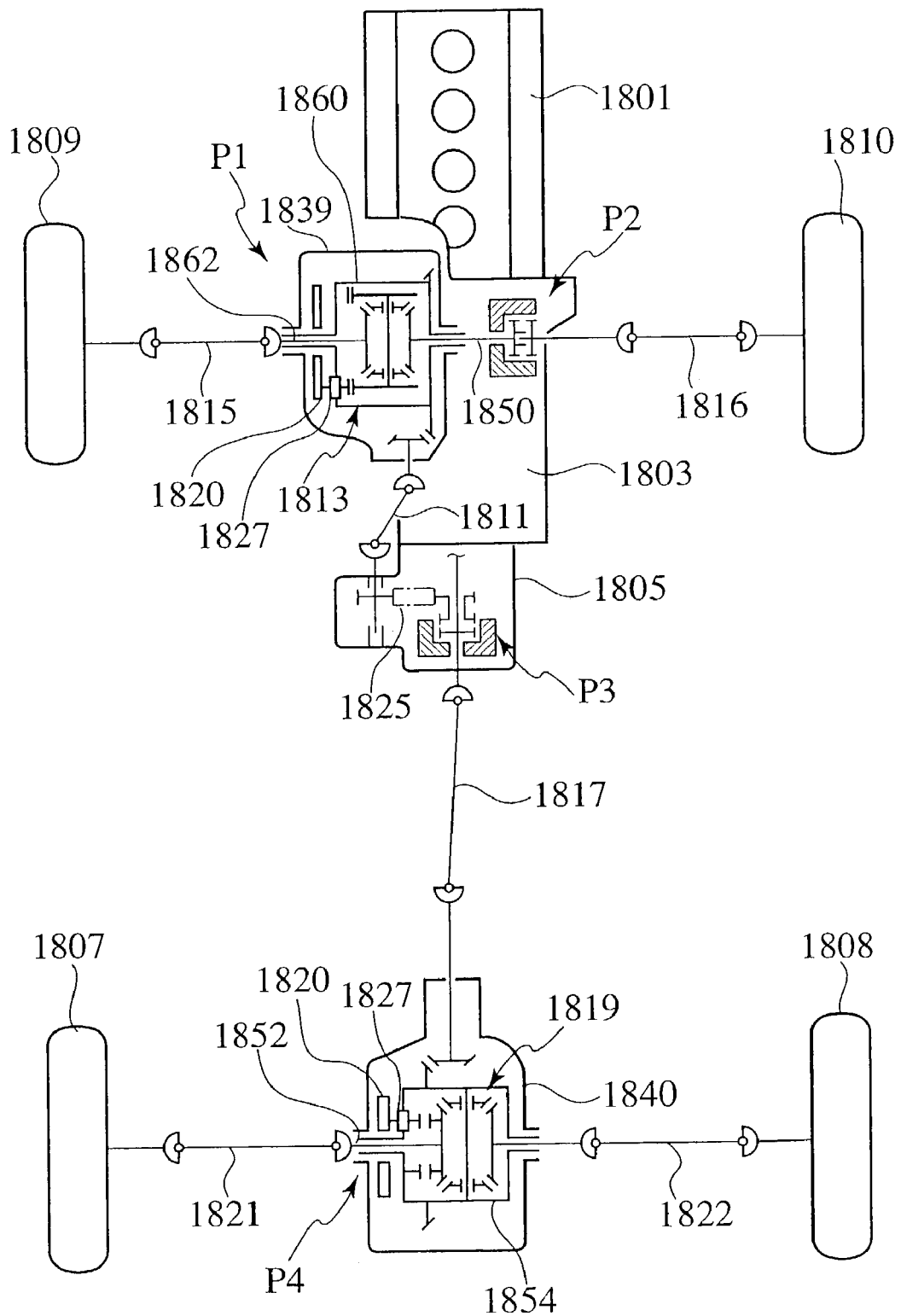
FIG. 36 is a skeleton mechanical view of a power transmission system of a vehicle illustrative of an example in which the actuator of the present invention and the differential unit using such an actuator are applied.

FIG. 36 is a skeleton mechanical view of the vehicle power transmission system illustrating an example to which the actuator of the present invention and the differential unit employing such an actuator are applied.

In FIG. 36, a front differential 1813 (a differential unit adapted to distribute an engine drive power to left and right front wheels) forms a differential unit equipped with a drive-power connecting and disconnecting mechanism mounted to a differential mechanism at an input side thereof and is used in a four-wheel drive vehicle wherein, during a two-wheel drive condition, the drive power to the front wheels is disconnected.

The power transmission system of the four-wheel drive vehicle is comprised of a longitudinally mounted engine (a prime mover) 1801, a transmission 1803, a transfer 1805, an actuator 1820, a cam mechanism 1827, a chain drive unit 1825 (a drive unit adapted to deliver the drive power to the front side), a propeller shaft 1811 for the front wheels, a front differential 1813, a front differential carrier 1839, front wheel axles 1815, 1816, left and right front wheels 1809, 1810, a rear wheel propeller shaft 1817, a rear differential 1819 (a differential unit adapted to distribute the engine drive power to the left and right rear wheels), a rear differential carrier 1840, rear wheel axles 1821, 1822, and left and rear wheels 1807, 1808.

In the presently filed embodiment, the actuator 1820 and the cam mechanism 1827 are arranged to control the drive-power connecting and disconnecting mechanism and 2–4 shift mechanism. The actuator 1820 may include any one of the actuators of the first to sixteenth embodiments set forth above. Also, reference numerals P1 to P4 designate actual areas to which the actuator 1820 and the cam mechanism 1827 (hereinafter referred to as a drive power control mechanism).

Firstly, connection and disconnection of the drive power in a case where the drive power control mechanism is applied to the area P1 are described below.

The drive power of the engine is transferred from the transmission 1803 to the transfer 1805, from which the drive power is distributed to the front wheels and the rear wheels through the chain drive unit 1825.

During a time interval in which the drive-power control mechanism and the front differential 1813 are connected, the drive power distributed to the front wheels through the chain drive unit 1825 is transferred from the drive power control mechanism and the front wheel propeller shaft 1811 to the front differential 1813, from which the drive power is distributed to the left and right front wheels 1807, 1808 through the front wheel axles 1815, 1816 to cause the vehicle to be brought into a four-wheel drive condition.

Further, if the drive-power control mechanism and the front differential 13 are disengaged, respectively, the front wheel side is disconnected from the longitudinally mounted engine 1 and the vehicle is brought into a two-wheel drive condition.

That is, in such a case, the drive power control mechanism operates in a drive path between a differential case 1860 of the front differential 1813 and one front wheel output gear 1862 (output member: an output side torque transmitting member) to connect or disconnect the drive power to the front wheels (in a part-time four-wheel drive mechanism).

Furthermore, in a case where the drive power control mechanism is applied to the area P2, the drive power control mechanism is disposed in a drive power transfer line at the other output side gear 1850 between the front differential 1813 and the front axle 1816, thereby performing connection or disconnection of the drive power to the front side (in the part-time four-wheel drive mechanism).

Moreover, in a case where the drive power control mechanism is applied to the area P3, the drive power control mechanism is disposed in the above-described drive power transfer line at an inlet side of the chain drive unit 1825, thereby performing connection or disconnection of the drive power to the front side (in the part-time four-wheel drive mechanism).

Also, in a case where the drive power control mechanism is applied to the area P4, the drive power control mechanism is disposed in the above-described drive power transfer line at a location between a differential case 1854 of a rear differential 1819 and a rear wheel output gear 1852 (an output member: an output side torque transmitting member), thereby performing connection or disconnection of the drive power to the rear side (in a def lock mechanism).

Figure 37:
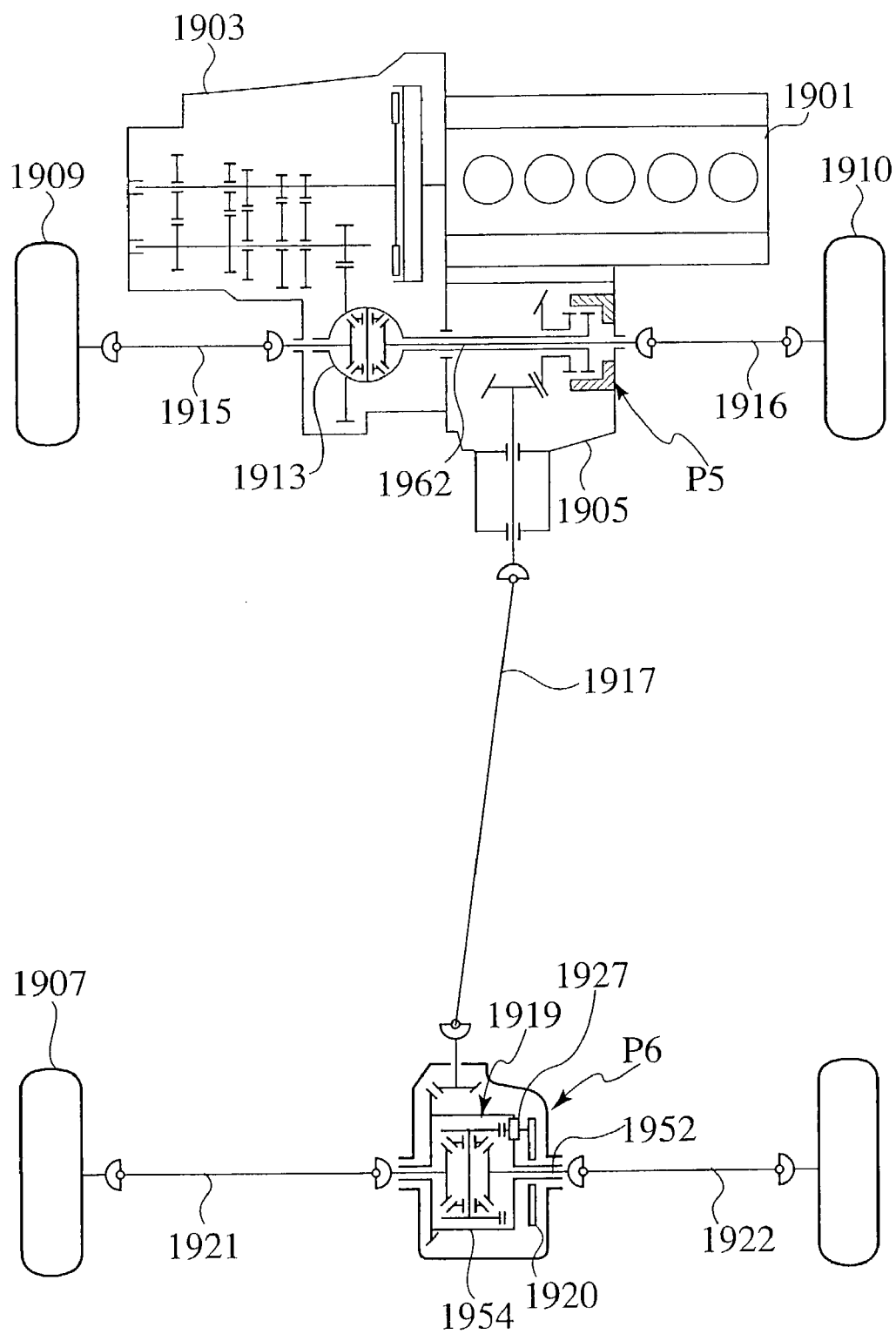
FIG. 37 is a skeleton mechanical view of a power transmission system of a vehicle illustrative of another example in which the actuator of the present invention and the differential unit using such an actuator are applied.

FIG. 37 is a skeleton mechanical view of the vehicle power transmission system illustrating another example to which the actuator of the present invention and the differential unit employing such an actuator are applied.

In FIG. 37, a rear differential 1919 (a differential unit adapted to distribute the engine drive power to left and right rear wheels) forms a differential unit equipped with a drive-power connecting and disconnecting mechanism mounted to a differential mechanism at an input side thereof and is used in a four-wheel-drive vehicle wherein, during a two-wheel drive condition, the drive power to the rear wheels is disconnected.

The power transmission system of the four-wheel-drive vehicle is comprised of a transversely mounted engine (a prime mover) 1901, a transmission 1903, a transfer 1905, an actuator 1920, a cam mechanism 1927, a front differential 1913 (a differential unit adapted to distribute the engine drive power to left and right front wheels), front wheel axles 1915, 1916, left and right front wheels 1909, 1910, a rear wheel propeller shaft 1917, a rear differential 1919, rear wheel axles 1921, 1922, and left and rear wheels 1907, 1908.

Firstly, connection and disconnection of the drive power in a case where the drive power control mechanism is applied to the area P5 are described below.

The drive power of the engine is transferred from the transmission 1903 to the transfer 1905, from which the drive power is distributed to the front wheels and the rear wheels through the transfer 1905.

The drive power distributed to the front wheel side is further distributed from the front differential 1913 to the left and right front wheels 1909, 1910 through the front wheel axles 1915, 1916.

During a time interval in which the drive-power control mechanism and the rear differential 1919 are connected, the drive power is transferred from the drive power control mechanism and the rear wheel propeller shaft 1917 to the rear differential 1919, from which the drive power is distributed to the left and right rear wheels 1907, 1908 through the rear wheel axles 1921, 1922 to cause the vehicle to be brought into a four-wheel drive condition.

Further, if the drive-power control mechanism and the rear differential 1919 are disengaged, respectively, the rear wheel side is disconnected from the transversely mounted engine 1901 and the vehicle is brought into a two-wheel drive condition.

That is, in such a case, the presence of the drive power control mechanism located in a drive path between the front differential 1913 and the front wheel axle 1916 at a front wheel output gear 1962 (an output member: an output side torque transmitting member) allows connection and disconnection of the drive power to the rear wheels (in a part-time four-wheel drive mechanism).

Furthermore, in a case where the drive power control mechanism is applied to the area P6, the drive power control mechanism is disposed in a drive power transfer line at the other output side gear 1850 between the front differential 1813 and the front axle 1816, thereby performing connection or disconnection of the drive power to the front side (in the part-time four-wheel drive mechanism).

Moreover, in a case where the drive power control mechanism is applied to the area P6, the drive power control mechanism connects or disconnects the drive power to the rear wheels in the above-described drive power transfer line between the differential case 1854 of the rear differential 1919 and the rear wheel (in the part-time four-wheel drive mechanism).

Also, in a case where the drive power control mechanism is applied to the area P4, the drive power control mechanism is disposed in the above-described drive power transfer line at a location between a differential case 1954 of a rear differential 1919 and a rear wheel output gear 1952, thereby performing connection or disconnection of the drive power to the rear side (in the part-time four-wheel drive mechanism). Also, it is possible for the area P6 to adopt the def lock mechanism applied to the area P4 shown in FIG. 36.

As set forth above, the actuator of the present invention is comprised of the stationary member, the rotational member disposed for rotating movement with respect to the stationary member, the movable member disposed to be shifted between the first position and the second position in the axial direction with respect to the rotational member, the drive source for rotating the rotational member, and the converting mechanism for converting the rotational force to the operating force of the operation unit to be operated, or comprised of the stationary member, the rotational member disposed for rotating movement with respect to the stationary member, the drive source for rotating the rotational member, and the converting mechanism for converting the rotational force to the operating force of the operation unit to be operated.

Thus, the actuator of the present invention takes the structure wherein the output power of the drive source is converted to the operating force of the operative unit through the rotational member using the converting mechanism and, therefore, the high cost pump, the actuator (the piston and the cylinder) using the fluid pressure and the converting mechanism can be dispensed with, resulting in a simplified structure that can be manufactured at a low cost.

Further, the actuator of the present invention becomes free from influences caused by functional degradation resulting from an unavoidable pressure leakage and pressure fluctuations experienced in the actuator having the fluid pressure for thereby providing remarkable improvements in a performance, stability and a reliability, while making it possible to strengthen sealing properties of various areas of the pressure lines and to avoid an increase in costs.

Furthermore, since there is no need for the actuator of the present invention to have the pressure lines and associated wide spaces, to permit the same to be distributed, that are required in the actuator using the fluid pressure, the actuator and the operative unit become light weight and compact to improve an on-vehicle installation capability, and there is no need for the casing, that accommodates the actuator and the operative unit, to be modified, thereby precluding the costs from increasing accompanied by modification.

Moreover, unlike the actuator using the fluid pressure that requires the high cost pump and the associated converting mechanism, the actuator of the present invention has no limitation in the kinds of drive sources, resulting in an increased freedom when structuring a whole system.

Also, since the actuator of the present invention has an ability to freely select the drive source and the transmitting mechanism, it is possible to form the actuator and the operative unit in a further compact structure for thereby improving an on-vehicle installation capability.

In particular, when using the electric motor as the drive source, unlike the actuator, using the fluid pressure, whose mechanism for transmitting the operating force of the actuator to the operative unit is limited to the converting mechanism, the transmitting mechanism between the electric motor and the converting mechanism is enabled to be freely selected among the gear reduction mechanisms such as the worm gear mechanism and the spur gear set, with a resultant increased freedom in structuring the whole system to provide a further improved on-vehicle installation capability.

In addition, by locating the principal component parts of the actuator such that, in an order from the operative unit with respect to the axial direction of the rotational member, the operating unit of the movable member, the stationary member, the rotational member, the converting mechanism and the guide portion of the movable member are sequentially disposed, it becomes extremely easy to perform assembly of the various members and to form the actuator in a further compact configuration, resulting in an improvement in an on-vehicle installation capability.

Further, in a case where the cam mechanism is employed as the converting mechanism, the metal works can be employed and the cam mechanism can be manufactured at a low cost in that degree.

Furthermore, since the cam mechanism of the present invention includes the first cam mechanism adapted to create the first thrust force that enables the rotation of the rotational member to shift the operative unit from the first position to the second position in the axial direction, and the second cam mechanism adapted to create the second thrust force that enables the operating unit to bear the rotational torque caused by coupling of the operating unit in one position to allow the operating unit be retained in one position among the first and second positions, the retaining (a position (status) retaining function) of the coupling engagement of the operating unit can be ensured by the second thrust force of such a second cam mechanism.

Moreover, in a case where the screw mechanism is employed as the converting mechanism, by locating the principal component parts of the actuator such that, in an order from the operative unit with respect to the axial direction of the rotational member, the rotational member and the stationary member are sequentially disposed and such that, in an order from the inward area with respect to the radial direction of the rotational member, the stationary member, the screw mechanism and the rotational member are sequentially disposed, the rotational member is enabled to be shifted between the first and second positions even with respect to the axial direction owing to the screwing action of the screw mechanism and, hence, the shifting members can be dispensed with, resulting in reduction in the number of component parts and costs.

Besides, this screw mechanism may have a minimized lead of screw thread per one turn to enable precise adjustment of the operating force, and the drive source can be miniaturized while strengthening the operating force of the operative unit.

Also, even when the screw mechanism suffers from the thrust reaction from the rotational member (of the operative unit), since the screw mechanism has the position retaining function (the status retaining function) resulting from the increased frictional resistance caused in the screw portion, in the presence of the drive source being stopped or in the presence of a failure in the drive source, the rotational member is retained at its required angular position, thereby permitting the actuator and the operative unit to be retained as they are.

Accordingly, if the coupling, configured to connect or disconnect the clutch using the actuator of the present invention, is located in the power transmission system on the wheel side that is disconnected during the two-wheel drive traveling mode in the four-wheel drive vehicle, especially, when a failure occurs in this coupling during the four-wheel drive traveling mode, the vehicle is retained in the four-wheel drive condition, resulting in a favorable failure mode.

Further, with the structure in which the operative unit is operated by the urging member like in the present invention, the use of the urging member with its urging force being varied enables free adjustment in the operating force and the amount of operation (the stroke) of the operative unit.

Furthermore, in a case where the meshing clutch is employed as the operative unit, the urging member takes the form of the waiting mechanism and reduces ratchet noise that would occur when the meshing clutch is brought into meshing engagement, thereby remarkably improving a durability.

Moreover, with the worm mechanism of the present invention, since an increased resistance occurs due to the friction with respect to the input delivered from the worm wheel side (the rotational member side: the operating unit side to be operated) and performs the position retaining function (the status retaining function), even when the drive source is stopped or in a failure of the drive source, the angular position of the rotational member is retained, thereby permitting the actuator and the operative unit to be retained as they are.

Consequently, with the four-wheel drive vehicle wherein the coupling, configured to connect or disconnect the clutch using the actuator of the present invention, is located in the power transmission system on the wheel side that is disconnected during the two-wheel drive traveling mode in the four-wheel drive vehicle, especially, when a failure occurs in this coupling during the four-wheel drive traveling mode, the vehicle can be retained in the four-wheel drive condition.

Besides, due to the provision of the transmitting mechanism comprised of the gear set, located at the area closer to the drive source, and the worm gear mechanism located at the area closer to the rotational member, the drive source can be located in the area closer to the worm gear mechanism as viewed from the gear set and, therefore, an assembly of the drive source and the transmitting mechanism becomes compact in structure. Thus, this assembly is enabled to be supported not on the casing for accommodating the operative unit but on the stationary member and supporting the assembly on the stationary member enables the actuator to be formed in a unit structure (in a packaged structure), resulting in a remarkable improvement in an assembling capability and an on-vehicle installation capability of the actuator.

In addition, the presence of the gear set, comprised of the gear reduction mechanism, enables the drive source to be miniaturized and light in weight in the extent provided by an increased torque function (the gear reducing function), the operative unit can be miniaturized and light in weight. Specifically, in a case where the electric motor is employed as the drive source, it becomes possible to reduce the load of the battery, and in a case where the operative unit includes an on-vehicle unit, it becomes possible to improve fuel consumption of the engine which drives the alternator for charging the battery.

According to the present invention, further, the actuator is arranged to include the principal component elements (the stationary member, the rotational member, the movable member and the converting mechanism): more particularly, the annular support plate, the cam plate disposed on the support plate at the one side thereof in the axial direction for rotating capabilities in clockwise and counterclockwise directions, the movable plate disposed on the support plate at the other side thereof in the axial direction for axial movement capabilities, the gear set with the structure involving the gear unitarily rotational with the cam plate, the electric motor for rotating the cam plate through the gear set in the clockwise and counterclockwise direction, and the cam mechanism disposed between the cam plate and the movable plate for converting the rotational force of the cam plate to the shifting operating force of the movable plate.

Further, the support plate is formed with the support-plate-side insertion bore and the cam plate is formed with the cam-plate-side insertion bores and the support-plate insertion bores, the cam plate has the cam-plate-side protrusions, formed at the circumferentially spaced positions different from those of the support-plate-side insertion bores, to engage the support plate, and the movable plate is formed with the respective support-plate-side insertion bores and the cam-plate-side insertion bores and has the movable-plate-side protrusions, formed at the circumferentially spaced positions different from those of the cam-plate-side insertion bores, to engage the cam plate.

Thus, such an arrangement has the following advantages in addition to those set forth above.

Firstly, when assembling the support plate, the cam plate and the movable plate, the protrusions of the cam plate are inserted through the insertion bores of the support plate and, subsequently, rotating the cam plate at an appropriate angle allows the cam plate to engage the support plate due to the protrusions of the cam plate. Under such a condition, then, the protrusions of the movable plate are inserted through the respective insertion bores of the support plate and the cam plate and, thereafter, rotating the cam plate in the opposite direction allows the movable plate to engage the cam plate due to the protrusions of the movable plate.

In this manner, no specific tools are required for assembling the support plate, the cam plate and the movable plate, enabling assembly with reduced number of steps in an extremely easy manner.

Furthermore, in order for the actuator of the present invention to be assembled to the operative unit, it is suffice for the support plate to be fixedly secured to the casing of the operative unit by means of the bolts, and this step is extremely easy to implement.

Moreover, all of the support plate, the cam plate and the movable plate may be formed by press works (i.e., by plate forming) and, hence, these component parts can be formed in light weight at a low cost.

Also, unlike the related art structure employing the actuator using the fluid pressure, with the actuator employing the gear plate of the present invention with the structure wherein the rotational torque of the electric motor is converted to the operating force of the operative unit using the cam mechanism, the high cost pump, the actuator (involving the piston and the cylinder) employing the fluid pressure and the shift mechanism can be dispensed with, resulting in further reduction in the number of component parts to provide a simplified structure at a low cost.

Further, since the cam mechanism is comprised of the movable-plate-side protrusions and the cam surface formed on the cam plate and, additionally, the cam surface is formed of the slanted cam surface, that allows the movable plate to travel in the axial direction by means of the movable-plate-side protrusions with the accompanied rotation of the cam plate, and the retainer surface, with no cam angle, that allows the movable-plate-side protrusions traveled on the slanted cam surface to be retained at the traveled position, when forming the cam plate by the press works, the cam surface (the cam piece) can be concurrently formed by press works at a low cost.

Furthermore, before and after the press works, the cam angle of the cam slanted surface can be adjusted to a value depending on the magnitude of the operating force required for the operative unit and the torque of the electric motor and adjustment of the cam angle allows the capacity of the electric motor to be decreased to cause the device to be light in weight while enabling the load of the battery to be reduced. In a case where the operative unit forms the on-vehicle unit, it is possible to improve fuel consumption to drive the alternator for charging the battery.

Moreover, forming the retainer surfaces, with no cam angles, on both sides of the slanted cam surface enables the cam mechanism to remain in an stable condition before and after the operation even in the stoppage of the electric motor and, therefore, by interrupting the operation of the electric motor except when actuating the cam mechanism, the loads of the battery and the alternator can further be decreased, resulting in further decrease in fuel consumption.

Also, the presence of the retainer protrusions formed between the cam slanted surface and the retainer surface allows the retainer protrusion and the movable-plate-side protrusion to be brought into abutting engagement during the non-operating mode of the electric motor, thereby preventing the movable-plate-side protrusion from being shifted from the slanted cam surface to the retainer surface and from being shifted from the retainer surface to the slanted cam surface.

With such an arrangement, since it is possible to obtain the check function due to the retainer protrusion, even when the actuator is subject to the external factors such as the vibrations or the impacts under the stoppage condition of the electric motor as described above, it is possible to avoid the occurrence wherein the cam mechanism shifts from the operative condition to the inoperative condition or the occurrence where the cam mechanism shifts from the inoperative condition to the operative condition.

Accordingly, in a case where the differential unit, that enables the actuator of the present invention to operate the clutch for connecting and disconnecting the drive power, is located in the four-wheel drive vehicle at the area closer to the wheels to be disconnected during the two-wheel drive traveling mode, even when the actuator is subject to the external factors such as the vibrations or the impacts during traveling of the vehicle, it is possible to avoid the occurrence wherein shift occurs from the four-wheel drive condition to the two-wheel drive condition or vice versa against the driver's will.

Further, due to the structure wherein the support plate and the cam plate are formed in respective annular shapes, the actuator is enabled to be coaxially disposed around the operative unit, and a whole of an assembled structure of the actuator and the operative unit becomes compact in structure, resulting in an improvement in an on-vehicle installation capability.

Furthermore, since the actuator of the present invention is comprised of the return spring, for urging the operative unit in the inoperative condition, and the shift spring for rendering the operative unit operative against the force of the return spring and the cam thrust force of the cam mechanism acts in the direction to cause the shift spring to be compressed (in the direction to render the operative unit inoperative), even if a failure occurs in the electric motor, the operative unit is rendered operative due to the shift spring.

Consequently, in a case where the differential unit, adapted to operate the clutch for connecting and disconnecting the drive power using the actuator of the present invention, is located at the area closer to the wheels that are disconnected during the two-wheel drive traveling mode in the four-wheel drive vehicle, or in a case where the drive power connecting and disconnecting unit, arranged to connect and disconnect the clutch using the actuator having the gear plate of the present invention, is located in the drive power transmission system at the area closer to the wheels that are disconnected during the two-wheel drive traveling mode, even when a failure occurs in the electric vehicle during the four-wheel drive traveling mode, the shift spring is effective to retain the vehicle in the four-wheel drive condition, resulting in a favorable failure mode.

Moreover, the presence of the support plate and the movable plate both of which are formed the recessed portions, respectively, prevents the shift spring from being dropping off, thereby maintaining the actuator in its normal function.

Besides, the presence of the recessed portion allows the spring to be positioned during assembly, improving an assembling capability.

Additionally, due to the arrangement wherein the position sensor for detecting the position of the movable plate is disposed between the support plate and the movable plate, since the position sensor makes it possible to detect the position of the movable plate (the state of the operative unit) whereby it becomes possible to directly know the status of the operative unit (such as the clutch), stopping the electric motor just after the electric motor has operatively moved the movable plate allows the electric motor to be prevented from being continuously rotated for a time interval more than required.

Accordingly, the excessive rotation of the electric motor, the abutting engagement of the gear set, the over-current of the electric motor caused by the abutting engagement of the gear set and the degraded durability of the electric motor can be avoided, resulting in a decrease in the load of the battery.

Further, unless the structure wherein the position sensor is disposed between the cam plates, since no relative rotation occurs while sandwiching the position sensor between the support plate, in which the position sensor is disposed, and the movable plate, the wear of the position sensor caused by the vibrations is avoided and there is no need for implementing the surface hardening treatment such as carbonizing/quenching or nitriding treatment, thereby preventing an increase in cost accompanied by such treatment.

Furthermore, it is possible to preclude an increase in the loads of the electric motor, the battery and the alternator that would be caused by the sliding resistance of the position sensor, thereby preventing a decrease in fuel consumption.

Moreover, the presence of the position sensor mounted to the support plate (i.e., to the actuator having the gear plate) provides no need for positioning the operative unit during assembly, providing an ease of assembly in that extent.

Besides, the presence of the cam portion a portion of which is integrally formed with the gear portion allows the number of component parts and costs to be reduced.

Further, with the actuator of the present invention, due to an arrangement wherein the urging means for transferring the shifting operating force to the operative unit are integrally formed with the movable plate and the support plate, the number of component parts and costs are reduced and the specific structure for positioning the urging means and the consideration of assembling capabilities are dispensed with, resulting in a further reduction in the number of assembling steps and costs.

In a case where the operative unit is comprised of the meshing clutch, using the urging means as the shift spring allows the urging means to serve as the waiting mechanism such that ratcheting and ratcheting noise are minimized before the meshing teeth are matched in phase, resulting in an improvement in a durability.

Furthermore, since the urging means according to the present invention can be concurrently formed with the movable plate or the support plate in an easy manner at a low cost when performing press works, the manufacturing costs become extremely low.

Moreover, with such a structure wherein the cam mechanism creates the shifting operating forces in one and the other directions depending on the rotational direction of the cam plate, the urging means serves as the shift spring when the shifting operating force is exerted to the operative unit in one direction whereas, when the shifting operating force is exerted to the operative unit in the other direction, the urging means serves as the return spring.

In such a way, with the structure wherein the urging means serves both as the shift spring and the return spring, the number of component parts and the costs are further reduced, and there is no need for the specific structure for positioning the return spring and the consideration of assembling capabilities, resulting in a further reduction in assembling steps and costs.

In addition, with the structure wherein the urging means serves both as the shift spring and the return spring, unlike the related art structure wherein the shift spring and the return spring are separately formed, since there is no need for providing the shift spring with the spring force larger than that of the return spring, the operational loss of the electric motor due to the shift spring can be reduced in that extent.

Also, since the spring force of the urging means (the shift spring) can be minimized to the irreducible minimum of demand, the frictional resistance occurring between the respective plates can be remarkably decreased to increase the durability of the actuator having the gear plate. Thus, the capacity of the electric motor can be reduced in the extent caused by reduction in the frictional resistance and, in a case where the operative unit forms the on-vehicle unit, it is possible to decrease the loads of the battery for driving the electric motor and the alternator for charging the battery, resulting in an improvement in fuel consumption of the engine for driving the alternator.

Beside, since the electric motor can be minimized and light in weight, the actuator and the operative unit can be miniaturized and light in weight in that extent, improving the on-vehicle installation capability.

Further, the actuator of the present invention, which employs the electric motor with a lower operating force than that of the actuator using the fluid pressure, especially has remarkable reduction in the operational loss because of the urging means enabled to have the minimized spring force.

Furthermore, due to an arrangement wherein the actuator of the present invention is mounted in the deferential unit for connecting and disconnecting the drive power at the inlet side of the differential mechanism, this differential unit is located in the drive power transmission system at the area closer to the wheels that are connected or disconnected during the two-wheel drive traveling mode in the four-wheel drive vehicle such that, if the actuator operates to couple the clutch, the vehicle is brought into the four-wheel drive condition whereas, when the clutch is uncoupled, the vehicle is brought into the two-wheel drive condition.

Moreover, due to an arrangement wherein the actuator of the present invention is mounted in the deferential unit for connecting and disconnecting the drive power at the outlet side of the differential mechanism, this differential unit is located in the drive power transmission system of the four-wheel drive vehicle such that, if the actuator operates to couple the clutch, the vehicle is brought into the directly connected drive condition whereas, when the clutch is uncoupled, the drive power is transmitted to the wheels through the differential mechanism.

Also, since the present invention provides the structure that enables concurrent change-over between the actuator for connecting or disconnecting the drive power of the differential unit and the 2–4 shift mechanism for interrupting the drive power of the engine (prime mover) in the drive power transmission system at the area closer to the wheels to be changed over, the actuator and the 2–4 shift mechanism can be operated by the common operating system and the operating system is simplified in structure in that extent, resulting in reduction in costs.

Additionally, if the clutch is coupled by the actuator of the present invention, differential movements of the differential mechanism is limited and, if the clutch is coupled, free differential movements can be obtained.

Besides, by applying the actuator of the present invention to these differential units, it is needless to implement the positioning of the urging means, thereby providing advantages such as an extremely easy assembly, a simplified structure with light weight, low costs and an increased reliability.

Further, with the differential unit to which the actuator of the present invention is applied, due to an arrangement wherein the torque transmitting member, the outer differential case or the differential case are supported on the stationary members through the thrust bearings and the bearing caps and the bearing caps are screwed to the stationary members by means of the screw portions while the bearing cap is formed with the abutting engagement portion which the cam plate, the movable plate and the support plate engage, when adjusting the preload of the thrust bearing by rotating the bearing cap by means of the screw portions, it is structured that the cam plate, the movable plate or the support plate are pushed by the abutting engagement portion of the bearing cap to move in the same stroke as that of the bearing cap.

Accordingly, even when the torque transmitting member, the outer differential case and the inner differential case move before and after the adjustment in preload, the space between each of the plates (the cam plate, the movable plate and the support plate) and the torque transmitting member, the outer differential case or the inner differential case can be maintained at a given value, the spring force of the shift spring urging the clutch is maintained at an appropriate value, thereby ensuring a normal operation of the actuator having the gear plate.

The entire contents of Japanese Patent Application No. P2002-89670 with a filing date of Mar. 27, 2002, No. P2002-97894, Mar. 29, 2002, and No. P2002-97827, Mar. 29, 2002 are herein incorporated by reference.

Although the present invention has been described above by reference to certain embodiments of the invention, the invention is not limited to the embodiments described above and modifications will occur to those skilled in the art, in light of the teachings. The scope of the invention is defined with reference to the following claims.

What is claimed is:

1. An actuator comprising:
a stationary member;
a rotational member disposed on the stationary member for rotating movement with respect thereto;
a movable member disposed on the rotational member to be axially movable between first and second positions;
a drive source rotating the rotational member; and
a converting mechanism disposed between the rotational member and the movable member to convert a rotational force of the rotational member to an operating force of an operative unit,
wherein the movable member comprises an operating portion for operating the operative unit, and a guide portion guiding the converting mechanism to move in the operating portion, and the operating portion of the movable member, the stationary member, the rotational member, the converting mechanism and the guide portion of the movable member being located in an order from an area closer to the operative unit along an axial direction of the rotational member.

2. The actuator according to claim 1, further comprising:
a worm gear mechanism including a worm wheel closer to the rotational member and a worm closer to the drive source and transmitting rotational force of the drive source to the rotational member.

3. The actuator according to claim 1, further comprising:
a worm gear mechanism including a gear set located at a side of the drive source and a worm wheel closer to the rotational member, and wherein
the drive source is disposed in area closer to the worm gear mechanism as a basis of the gear set and supported to the stationary member.

4. The actuator according to claim 1, wherein
the operative unit comprises a clutch included in a differential unit, including a differential case rotating in response to a drive power of a prime mover and a differential mechanism distributing rotation of the differential case to wheels through a pair of output members, and disposed between either one of the output members and one of the wheels, and wherein
the actuator is operative to couple and uncouple the clutch to connect and disconnect a torque between the output member and the wheel.

5. The actuator according to claim 4, wherein
the differential unit further comprises a 2–4 shift mechanism adapted to interrupt the drive power of the prime mover in a drive power transmission system closer to the wheel that is disconnected during a two-wheel drive condition in a four-wheel drive vehicle, and wherein
the actuator is operative to be concurrently changed over with the 2–4 shift mechanism.

6. The actuator according to claim 1, wherein
the operative unit comprises a clutch included in a differential unit, including an input-side torque transmitting member rotating in response to a drive power of a prime mover and a differential mechanism distributing rotation of the input-side torque transmitting member to wheels through a pair of output-side torque transmitting members, and disposed in either one of the input-side torque transmitting member and the output-side torque transmitting members to limit a differential movement of the differential mechanism, and wherein
the actuator is operative to couple or uncouple the clutch to limit the differential movement of the differential mechanism.

7. An actuator comprising:
a stationary member;
a rotational member disposed on the stationary member for rotating movement with respect thereto;
a movable member disposed on the rotational member to be axially movable between first and second positions;
a drive source rotating the rotational member; and a converting mechanism disposed between the rotational member and the movable member to convert a rotational force of the rotational member to an operating force of an operative unit, wherein the converting mechanism comprises a cam mechanism and the cam mechanism comprises a first cam mechanism creating a first thrust force to axially move the operative unit from the first position to the second position depending on rotation of the rotational member, and a second cam mechanism bearing a rotational torque occurring when the operative unit is coupled in either one of the first and second positions and creating a second thrust force to retain the operative unit in the one position.

8. An actuator comprising:

a stationary member;

a rotational member disposed on the stationary member for rotating movement with respect thereto;

a movable member disposed on the rotational member to be axially movable between first and second positions;

a drive source rotating the rotational member; and a converting mechanism disposed between the rotational member and the movable member to convert a rotational force of the rotational member to an operating force of an operative unit, an urging member disposed between the movable member and the stationary member to exert an urging force to operate the operative unit through the movable member in either one of the first and second positions.

9. The actuator according to claim 8, further comprising:

an operating force transmitting member to transmit an operating force of the converting mechanism to the operative unit, wherein the urging member has an urging force to operate the operative unit through the operating force transmitting member.

10. An actuator comprising:

a stationary member;

a rotational member disposed on the stationary member for rotating movement with respect thereto;

a movable member disposed on the rotational member to be axially movable between first and second positions;

a drive source rotating the rotational member; and a converting mechanism disposed between the rotational member and the movable member to convert a rotational force of the rotational member to an operating force of an operative unit, wherein the operative unit comprises a clutch included in a differential unit, including an outer differential case rotating in response to a drive power of a prime mover, an inner differential case disposed in the outer differential case for a relative rotation capability and a differential mechanism connected to the inner differential case, to connect and disconnect the outer differential case and the inner differential case with respect to one another, and wherein the actuator is operative to couple and uncouple the clutch to connect and disconnect a torque between the outer differential case and the inner differential case.

11. The actuator according to claims 10, wherein the differential unit further comprises a 2–4 shift mechanism adapted to interrupt the drive power of the prime mover in a drive power transmission system closer to the wheel that is disconnected during a two-wheel drive condition in a four-wheel drive vehicle, and wherein the actuator is operative to be concurrently changed over with the 2–4 shift mechanism.

12. An actuator comprising:

a stationary plate;

a cam plate disposed on one side of the stationary plate in an axial direction for clockwise and counterclockwise rotating capabilities;

a movable plate disposed on the other side of the stationary plate in the axial direction to be axially movable to operatively move an operative unit;

a gear set having a gear unitarily rotating with the cam plate;

an electric motor rotating the cam plate through the gear set in a clockwise and counterclockwise direction; and a cam mechanism disposed between the cam plate and the movable plate and converting a rotational force of the cam plate to an operating shift force of the movable plate.

13. The actuator according to claim 12, wherein the movable plate comprises an operating portion operating the operative unit and a guide portion guiding the cam mechanism to move in the operating portion, and the operating portion of the movable plate, the stationary plate, the cam plate, the cam mechanism and the guide portion of the movable plate being located in an order from an area closer to the operative unit along an axial direction of the cam plate.

14. The actuator according to claim 12, wherein the cam mechanism comprises a first cam mechanism creating a first thrust force to axially move the operative unit from the first position to the second position depending on rotation of the rotational member, and a second cam mechanism bearing a rotational torque occurring when the operative unit is coupled in either one of the first and second positions and creating a second thrust force to retain the operative unit in the one position.

15. The actuator according to claim 12, wherein the stationary plate comprises a stationary-plate-side insertion bore portion, the cam plate comprises a cam-plate-side insertion bore portion and a cam-plate-side protrusion adapted to be inserted through the stationary-plate-side insertion bore portion to engage the stationary plate at a circumferential position displaced from the stationary-plate-side insertion bore portion, the movable plate comprises a movable-plate-side protrusion adapted to be inserted through the respective insertion bore portions of the stationary plate and the cam plate to engage the cam plate at a circumferential position displaced from the respective insertion bore portions of the stationary plate and the cam plate, and wherein under a condition where the stationary plate, the cam plate and the movable plate are assembled, the cam plate engages the stationary plate by means of the cam-plate-side protrusion inserting through the stationary-plate-side insertion bore portion and the movable plate engages the cam plate by means of the movable-plate-side protrusion inserting through the respective insertion bore portions of the stationary plate and the cam plate.

16. The actuator according to claim 15, wherein the stationary-plate-side insertion bore portion has a plurality of insertion bores formed at circumferentially and equidistantly spaced positions, the cam-plate-side insertion bore portion has a plurality of insertion bores formed at circumferentially and equidistantly spaced positions, the movable-plate-side protrusion has a plurality of protrusions formed at circumferentially and equidistantly spaced positions, and the cam-plate-side protrusion has a plurality of protrusions formed at circumferentially and equidistantly spaced positions.

17. The actuator according to claim 15, wherein the stationary plate, the cam plate and the movable plate have annular shapes, respectively, and wherein the stationary-plate-side insertion bore portion is formed at an inner periphery of the stationary plate in a concave portion, and the cam-plate-side insertion bore portion is formed at an inner periphery of the cam plate in a concave portion, which concave portions are concentrically disposed around a periphery of the operative unit.

18. The actuator according to claim 12, wherein the cam mechanism comprises a movable-plate-side protrusion, and a cam surface formed on the cam plate, and wherein the cam surface comprises a slanted cam surface adapted to axially move the movable plate through the movable-plate-side protrusion with rotation of the cam plate, and a retainer surface with no cam angle and retaining the movable-plate-side protrusion, that has traveled on the slanted cam surface, in a traveled position.

19. The actuator according to claim 18, wherein a retainer protrusion is disposed between the slanted cam surface of the cam surface and the retainer surface, and wherein during inoperative condition of the electric motor, the retainer protrusion and the movable-plate-side protrusion are brought into abutting engagement to prevent the movable-plate-side protrusion from moving to the retainer surface from the slanted cam surface and to the slanted cam surface from the retainer surface.

20. The actuator according to claim 18, wherein the movable-plate-side protrusion comprises an axial portion formed at a base portion, and a radial portion formed at an end of the axial portion, and wherein the cam mechanism comprises the radial portion and the cam surface of the cam plate.

21. The actuator according to claim 12, further comprising:

a return spring urging the operative unit in an inoperative condition; and a shift spring rendering the operative unit operative against a force of the return spring; and wherein the cam mechanism has a thrust force acting in a direction in which the shift spring is compressed.

22. The actuator according to claim 21, wherein the stationary plate and the movable plate further comprise recessed portions which end of the shift spring engage to preclude drop-out of the shift spring.

23. The actuator according to claim 12, further comprising:

a position sensor disposed between the stationary plate and the movable plate to detect a position of the movable plate.

24. The actuator according to claim 12, wherein a portion of the cam plate is integrally formed with a gear portion.

25. The actuator according to claim 12, further comprising:

urging means for transmitting the operating shift force to the operative unit;

the urging means being integrally formed with the movable plate or the stationary plate.

26. The actuator according to claim 25, wherein the urging means comprises a circumferential spring segment formed in the movable plate or the stationary plate.

27. The actuator according to claim 25, wherein the urging means is formed in the movable plate, and the cam mechanism creates the operating shift force in one and the other directions depending on rotations of the cam plate in one and the other directions, the movable plate being operative to transmit the operating shift force to the operative unit in the one and the other directions through the urging means.

28. The actuator according to claim 12, wherein the operative unit comprises a clutch disposed between a pair of torque transmitting members, and wherein the actuator is operative to connect and disconnect the clutch for thereby connecting and disconnecting a torque between the torque transmitting members.

29. The actuator according to claim 28, wherein the torque transmitting members, the outer differential case or the differential case are supported on a stationary member through a thrust bearing and a bearing cap, and wherein the bearing cap is screwed into the stationary member by means of a screw portion, the bearing cap is formed with an abutting engagement portion with which the cam plate, the movable plate or the stationary plate are brought into abutting engagement whereby when rotating the bearing cap by means of the screw portion to adjust a preload of the thrust bearing, the cam plate, the movable plate or the stationary plate are pushed by the abutting engagement portion of the bearing cap to move in the same stroke as that of the bearing cap.

30. The actuator according to claim 12, wherein the operative unit comprises a clutch, included in a differential unit including an outer differential case rotating due to a drive power of a prime mover, an inner differential case disposed internally of the outer differential case for relative rotation capability thereto, and a differential mechanism connected to the inner differential case, for connecting and disconnecting a coupling between the outer differential case and the inner differential case, and wherein the actuator is operative to connect and disconnect the clutch for connecting and disconnecting a torque between the outer differential case and the inner differential case.

31. The actuator according to claim 12, wherein the operative unit comprises a clutch included in a differential unit, including a differential case rotating in response to a drive power of a prime mover and a differential mechanism distributing rotation of the differential case to wheels through a pair of output members, and disposed between either one of the output members and one of the wheels, and wherein the actuator is operative to couple and uncouple the clutch to connect and disconnect a torque between the output member and the wheel.

32. The actuator according to claim 12, wherein the operative unit comprises a clutch included in a differential unit, including a differential case rotating in response to a drive power of a prime mover and a differential mechanism distributing rotation of the differential case to wheels through a pair of output members, and disposed between either one of the differential case and the output members to limit differential movement of the differential mechanism, and wherein the actuator is operative to couple and uncouple the clutch to limit the differential movement of the differential mechanism.

* * * * *